United States Patent
Udell

(10) Patent No.: US 11,158,011 B2
(45) Date of Patent: Oct. 26, 2021

(54) METHODS AND SYSTEMS FOR FACILITATING THE MANAGEMENT OF ON-PREMISES ACCOMMODATIONS

(71) Applicant: Dun.Today LLC, Lewes, DE (US)

(72) Inventor: Ty Udell, Raleigh, NC (US)

(73) Assignee: DUN.TODAY LLC, Lewes, DE (US)

( * ) Notice: Subject to any disclaimer, the term of this patent is extended or adjusted under 35 U.S.C. 154(b) by 281 days.

(21) Appl. No.: 16/051,422

(22) Filed: Jul. 31, 2018

(65) Prior Publication Data

US 2019/0057466 A1 Feb. 21, 2019

Related U.S. Application Data

(60) Provisional application No. 62/539,492, filed on Jul. 31, 2017.

(51) Int. Cl.
*G06Q 50/16* (2012.01)
*G06Q 10/00* (2012.01)
(Continued)

(52) U.S. Cl.
CPC ......... *G06Q 50/163* (2013.01); *G06F 16/245* (2019.01); *G06Q 10/1097* (2013.01); *G06Q 10/20* (2013.01); *G06Q 30/012* (2013.01)

(58) Field of Classification Search
CPC .............. G06Q 50/163; G06Q 30/012; G06Q 10/1097; G06Q 10/06; G06Q 50/08; G06F 16/245
See application file for complete search history.

(56) References Cited

U.S. PATENT DOCUMENTS

| | | | | |
|---|---|---|---|---|
| 2007/0033108 A1* | 2/2007 | Luhr | ................... | G06Q 20/203 705/22 |
| 2008/0246597 A1* | 10/2008 | Carlson | ................... | G04F 1/005 340/500 |

(Continued)

OTHER PUBLICATIONS https://www.biggerpockets.com/blog/free-app-home-maintenance (Year: 2017).*

*Primary Examiner* — Aryan E Weisenfeld
(74) *Attorney, Agent, or Firm* — Bekiares Eliezer LLP

(57) ABSTRACT

Disclosed is a method of facilitating maintenance of an accommodation, such as, but not limited to, a building (residential and/or official). The method may include receiving, using a communication device, an accommodation identifier associated with the accommodation from an electronic device. Further, the method may include transmitting, using the communication device, a query comprising the accommodation identifier to at least one builder database. Furthermore, the method may include receiving, using the communication device, a response to the query. Further, the response may include warranty data associated with the accommodation. Additionally, the method may include generating, using a processing device, at least one maintenance schedule based on the warranty data. Further, the maintenance schedule corresponds to at least one of a user of the accommodation, a builder of the accommodation and at least one contractor associated with the accommodation. Furthermore, the method may include transmitting, using the communication device, the at least one maintenance schedule to at least one electronic device associated with at least one of the user, the builder and the at least one contractor.

10 Claims, 64 Drawing Sheets

(51) Int. Cl.
  *G06Q 30/00* (2012.01)
  *G06Q 10/10* (2012.01)
  *G06F 16/245* (2019.01)

(56) References Cited

U.S. PATENT DOCUMENTS

2010/0250393 A1* 9/2010 Pandian ................. G06Q 10/10
                                            705/26.1
2015/0278971 A1* 10/2015 Moon .................... G06Q 30/06
                                            705/313
2016/0357876 A1* 12/2016 Ali ....................... G06F 16/907

* cited by examiner

300

┌─────────────────────────────────────────────────────────────┐
│ RECEIVING, USING A COMMUNICATION DEVICE, ACCOMMODATION DATA ASSOCIATED │
│ WITH THE ACCOMMODATION FROM AN ELECTRONIC DEVICE ASSOCIATED WITH AT │ 302
│ LEAST ONE OF A BUILDER AND A CONTRACTOR OF THE ACCOMMODATION, WHEREIN │
│ THE ACCOMMODATION DATA COMPRISES AN ACCOMMODATION IDENTIFIER ASSOCIATED │
│ WITH THE ACCOMMODATION AND AT LEAST ONE OF A BUILDER IDENTIFIER OF THE │
│ BUILDER AND A CONTRACTOR IDENTIFIER OF THE CONTRACTOR │
└─────────────────────────────────────────────────────────────┘
                              ↓
┌─────────────────────────────────────────────────────────────┐
│ STORING, USING A STORAGE DEVICE, THE ACCOMMODATION DATA │ 304
└─────────────────────────────────────────────────────────────┘
                              ↓
┌─────────────────────────────────────────────────────────────┐
│ RECEIVING, USING THE COMMUNICATION DEVICE, AT LEAST ONE WARRANTY CLAIM │ 306
│ FROM AN ELECTRONIC DEVICE ASSOCIATED WITH A USER OF THE ACCOMMODATION, │
│ WHEREIN THE AT LEAST ONE WARRANTY CLAIM COMPRISES THE ACCOMMODATION │
│ IDENTIFIER AND A MAINTENANCE REQUEST │
└─────────────────────────────────────────────────────────────┘
                              ↓
┌─────────────────────────────────────────────────────────────┐
│ IDENTIFYING, USING THE PROCESSING DEVICE, AT LEAST ONE OF THE BUILDER AND THE │ 308
│ CONTRACTOR BASED ON A COMPARISON OF THE AT LEAST ONE WARRANTY CLAIM WITH │
│ THE ACCOMMODATION DATA │
└─────────────────────────────────────────────────────────────┘
                              ↓
┌─────────────────────────────────────────────────────────────┐
│ TRANSMITTING, USING THE COMMUNICATION DEVICE, THE AT LEAST ONE WARRANTY │ 310
│ CLAIM TO THE ELECTRONIC DEVICE ASSOCIATED WITH AT LEAST ONE OF THE BUILDER │
│ AND THE CONTRACTOR │
└─────────────────────────────────────────────────────────────┘
                              ↓
┌─────────────────────────────────────────────────────────────┐
│ RECEIVING, USING THE COMMUNICATION DEVICE, ONE OF AN APPROVAL AND A │ 312
│ REJECTION OF THE AT LEAST ONE WARRANTY CLAIM FROM THE ELECTRONIC DEVICE │
└─────────────────────────────────────────────────────────────┘
                              ↓
┌─────────────────────────────────────────────────────────────┐
│ TRANSMITTING, USING THE COMMUNICATION DEVICE, THE MAINTENANCE REQUEST TO │ 314
│ AT LEAST ONE OF THE CONTRACTOR AND A SERVICE PROVIDER BASED ON RECEIPT OF │
│ THE APPROVAL │
└─────────────────────────────────────────────────────────────┘

| 502 | RECEIVING, USING A COMMUNICATION DEVICE, A WARRANTY CLAIM COMPRISING AN IMAGE AND A LOCATION ASSOCIATED WITH AN ACCOMMODATION, WHEREIN THE IMAGE REPRESENTS AT LEAST ONE ITEM IN THE ACCOMMODATION |

↓

| 504 | ANALYZING, USING A PROCESSING DEVICE, THE IMAGE TO IDENTIFY THE AT LEAST ONE ITEM IN THE IMAGE |

↓

| 506 | IDENTIFYING, USING THE PROCESSING DEVICE, AT LEAST ONE OF A BUILDER AND A CONTRACTOR ASSOCIATED WITH AT LEAST ONE OF THE ACCOMMODATION AND THE AT LEAST ONE ITEM BASED ON EACH OF THE LOCATION AND IDENTIFICATION OF THE AT LEAST ONE ITEM |

↓

| 508 | ANALYZING, USING THE PROCESSING DEVICE, WARRANTY DATA ASSOCIATED WITH THE AT LEAST ONE ITEM |

↓

| 510 | TRANSMITTING, USING THE COMMUNICATION DEVICE, THE WARRANTY CLAIM TO AN ELECTRONIC DEVICE ASSOCIATED WITH AT LEAST ONE OF THE BUILDER AND A GENERAL CONTRACTOR |

↓

| 512 | RECEIVING, USING THE COMMUNICATION DEVICE, ONE OF AN APPROVAL AND A REJECTION OF THE WARRANTY CLAIM FROM THE ELECTRONIC DEVICE |

↓

| 514 | TRANSMITTING, USING THE COMMUNICATION DEVICE, A MAINTENANCE REQUEST TO AT LEAST ONE OF A CONTRACTOR AND A SERVICE PROVIDER BASED ON RECEIPT OF THE APPROVAL |

< Back

| Refrigerator | > |
| Range | > |
| Microwave | > |
| Ice Maker | > |
| Dishwasher | > |
| Insinkerator | > |
| Washer | > |
| Dryer | > |
| Water Heater | |

< Back

| | |
|---|---|
| AC/Heat | > |
| Appliances | > |
| Drywall | > |
| Flooring | > |
| Garage Door | > |
| Plumbing | > |
| Roofing | > |

_1600_
< Back    AC/Heat Repair
JOB TITLE
[ Broken AC Unit ]
ADDRESS
[ 3525 Turnbridge Dr. Raleigh, NC 27609 ]
BRIEF DESCRIPTION
[ AC Unit will not come on when the thermostat is turned on ]
URGENT?    [ Yes | No ]
[ Morning | Afternoon | Evening ]
(Optional) Add Photos
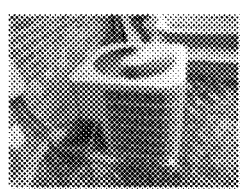  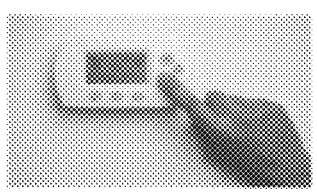
SUBMIT SERVICE TO CONTRACTOR
[ Accept and Schedule ]
*FIG. 16*

_1700_
< Back    SUBMITTED CLAIMS
AC Repair 
Clogged Vent 
Broken Thermostat 
*FIG. 17*

*1800*
< Back     AC/Heat Repair
JOB TITLE
[ Broken AC Unit ]
ADDRESS
[ 3525 Turnbridge Dr. Raleigh, NC 27609 ]
BRIEF DESCRIPTION
[ AC Unit will not come on when the thermostat is turned on ]
URGENT?          [ Yes | No ]
[ Morning | Afternoon | Evening ]
(Optional) Add Photos
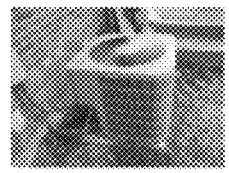 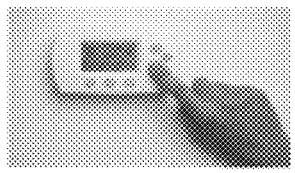
SUBMIT SERVICE TO CONTRACTOR
[ Cancel Request ]
*FIG. 18*

*FIG. 51*

METHODS AND SYSTEMS FOR FACILITATING THE MANAGEMENT OF ON-PREMISES ACCOMMODATIONS

RELATED APPLICATION

Under provisions of 35 U.S.C. § 119(e), the Applicant claims the benefit of U.S. provisional application No. 62/539,492, filed Jul. 31, 2017, which is incorporated herein by reference. It is intended that each of the referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to management of accommodations, such as, but not limited to, buildings or other structures. More specifically, the disclosure relates to methods and systems of facilitating maintenance of accommodations.

BACKGROUND

Buying a home or building, whether new or used, is one of the most important investments that a person can make. Upon purchasing, a package including one or more warranty cards, brochures and/or manuals for appliances and other functions installed in the home or building is provided to the owner. However, the owner must then browse the package to identify the warranty cards that are present, and then fill and send the warranty cards to the appropriate manufacturers (or parties administering the warranties). Some of these warranty cards may require the owner to provide information, such as a serial number, model number, etc., that may be acquired from the devices themselves. This requires the owner to search the home to locate the correct article and information needed. This may be a cumbersome task for the owner. In addition, once the owner has located the information and supplied the warranty cards to the respective manufacturers, the owner must then retain the paper documents for each warranty card submitted. For a new home or building purchase, no warranty may be required for many years and, during this period, these documents may be lost, making it difficult for the homeowner to file a claim under the warranty.

Further, when buying a used home or building, the owner may not receive any information from the house or building vendor concerning the items included in the structure, such as appliances, heating, ventilation and air conditioning (HVAC), etc. that are under warranty. This may prevent the owner from obtaining warranty coverage on certain items in the home or building, even if these items are covered by the manufacturer's warranty. In addition, owners who purchase used homes or building may not receive information about maintenance done on the structure by the previous owner, for example, when the roof was last replaced, how old is the water heater, and so on. So, the owner may not know if the items in the house are potentially under warranty, can be replaced soon, and so on.

Additionally, builders and/or contractors associated with the building may also face several challenges in managing the building. For example, the builder may be required to conduct inspections and perform any required maintenance activities on the building at regular times as per the warranty. However, the builder and/or the contractors may be responsible for a large number of buildings. As a result, sifting through warranty data of all the buildings and scheduling inspection and/or maintenance activities becomes cumbersome even when performed on a computer. For example, coordinating with multiple contractors or service providers in order to carry out the maintenance activities is difficult. Further, currently, these inspections and/or maintenance activities are not prioritized according to contextual conditions due to lack of availability of such information.

Accordingly, there is a need for methods and systems for facilitating maintenance of accommodations, such as, but not limited to, buildings, while overcoming one or more of the aforementioned drawbacks.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Disclosed is a first method of facilitating warranty or maintenance of an accommodation, such as, but not limited to, a building (residential and/or official). The first method may include receiving, using a communication device, an accommodation identifier associated with the accommodation from an electronic device. Further, the first method may include transmitting, using the communication device, a query comprising the accommodation identifier to at least one builder database. Furthermore, the first method may include receiving, using the communication device, a response to the query. Further, the response may include warranty data associated with the accommodation. Additionally, the first method may include generating, using a processing device, at least one maintenance schedule based on the warranty data. Further, the maintenance schedule corresponds to at least one of a user of the accommodation, a builder of the accommodation and at least one contractor associated with the accommodation. Furthermore, the first method may include transmitting, using the communication device, the at least one maintenance schedule to at least one electronic device associated with at least one of the user, the builder and the at least one contractor.

Further disclosed is a second method of facilitating warranty or maintenance of an accommodation. The second method may include receiving, using a communication device, accommodation data associated with the accommodation from an electronic device associated with at least one of a builder and a contractor of the accommodation. Further, the accommodation data may include an accommodation identifier associated with the accommodation and at least one of a builder identifier of the builder and a contractor identifier of the contractor. Furthermore, the second method may include storing, using a storage device, the accommodation data. Additionally, the second method may include receiving, using the communication device, at least one warranty claim from an electronic device associated with a user of the accommodation. Further, the at least one warranty claim may include the accommodation identifier and a maintenance request. Furthermore, the second method may include identifying, using the processing device, at least one of the builder and the contractor based on a comparison of the at least one warranty claim with the accommodation data. Further, the second method may include transmitting, using the communication device, the at least one warranty claim to the electronic device associated with at least one of the builder and the contractor. Additionally, the second method may include receiving, using the communication device, one of an approval and a rejection of the at least one warranty claim from the electronic device. Further, the second method may include transmitting, using the communication device, the maintenance request to at least one of the contractor and a service provider based on receipt of the approval.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 3 illustrates a flowchart of a second method 300 of facilitating maintenance of an accommodation, in accordance with some embodiments.

FIG. 5 illustrates a flowchart of a method 500 of facilitating maintenance of an accommodation based on image analysis, in accordance with some embodiments.

FIG. 8 illustrates a screenshot of user-information page 800 of the software application (e.g. mobile app) for facilitating the user to enter personal information for maintenance of the accommodation, in accordance with some embodiments.

FIG. 11 illustrates a screenshot of an appliances page 1100 of the software application (e.g. mobile app) for facilitating maintenance of the accommodation, in accordance with some embodiments.

FIG. 13 illustrates a screenshot of an amenities page 1300 of the software application (e.g. mobile app) for facilitating maintenance of the accommodation, in accordance with some embodiments.

FIG. 14 illustrates a screenshot of a warranty claim page 1400 of the software application (e.g. mobile app) for facilitating maintenance of the accommodation, in accordance with some embodiments.

FIG. 16 illustrates a screenshot of a maintenance scheduling page 1600 of the software application (e.g. mobile app) for facilitating maintenance of the accommodation, in accordance with some embodiments.

FIG. 17 illustrates a screenshot of a claims status page 1700 of the software application (e.g. mobile app) for facilitating maintenance of the accommodation, in accordance with some embodiments.

FIG. 18 illustrates a screenshot of a maintenance cancellation page 1800 of the software application (e.g. mobile app) for facilitating maintenance of the accommodation, in accordance with some embodiments.

FIG. 19C illustrates a flow diagram of a software application (e.g., mobile app) for providing the user with pre-selected options in accordance with some embodiments.

FIG. 51 depicts a job input interface for a platform administrator to have detailed insight into each job and asset associated with the various accommodations in accordance with some embodiments.

DETAILED DESCRIPTION

Figure 1:
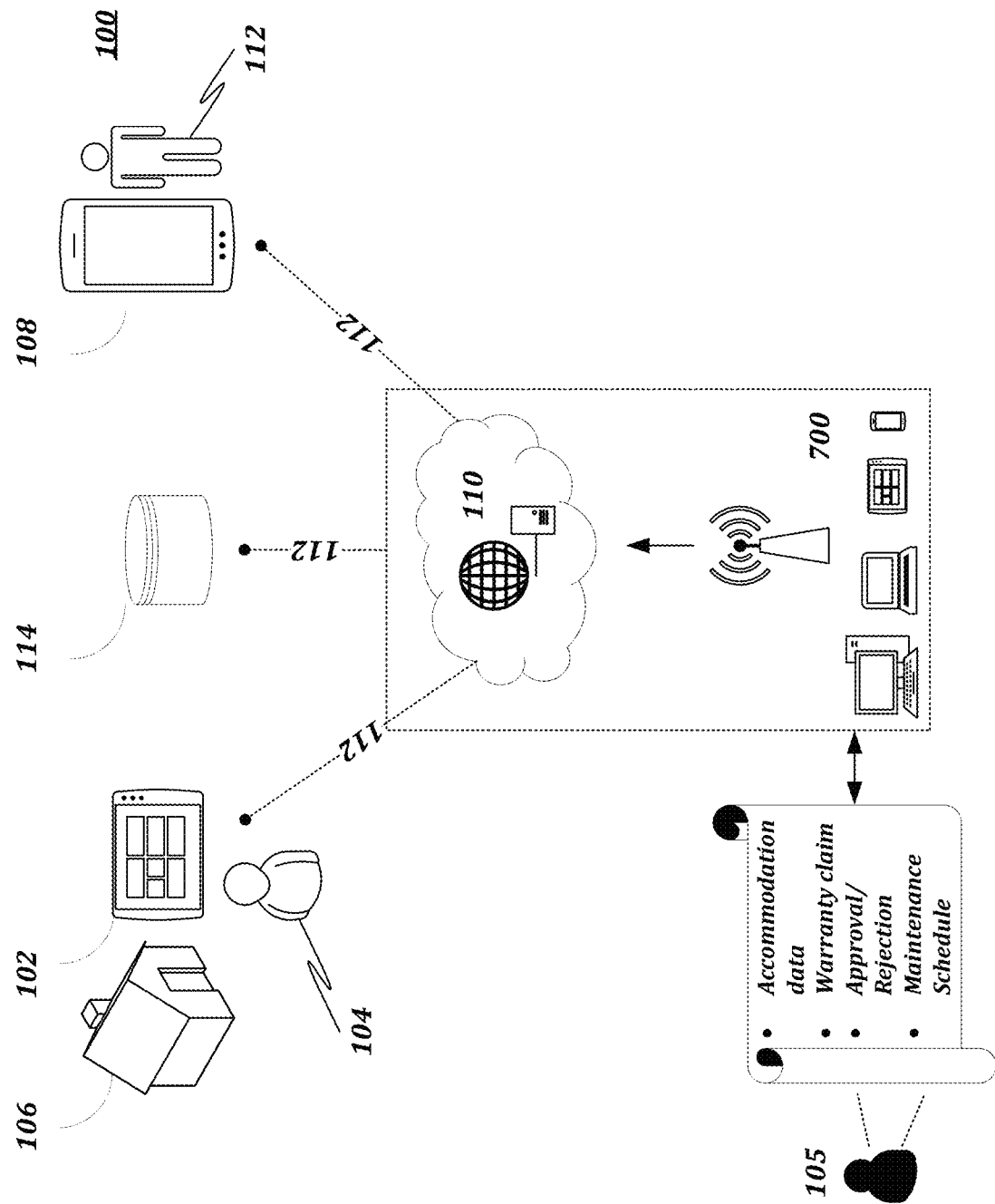
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of buildings, embodiments of the present disclosure are not limited to use only in this context. For example, the methods and systems disclosed herein may be applied to manage maintenance of structures such as, but not limited to, cars, recreational vehicles, cruise liners, aircrafts, etc.

I. Platform Overview

Consistent with embodiments of the present disclosure, an online platform (also referred to herein as "platform" or building maintenance platform) for facilitating maintenance of a premises (e.g., a building) and an accommodation within the building (e.g., a building, its floor plans, appliances, and other assets) may be provided. This overview is provided to introduce a selection of concepts in a simplified form that are further described below. This overview is not intended to identify key features or essential features of the claimed subject matter. Nor is this overview intended to be used to limit the claimed subject matter's scope. The online platform may be used by individuals (home owners, tenants etc.) or companies (builders, contractors, service provider etc.) to facilitate maintenance of the accommodation.

The present disclosure provides a software application (hereinafter referred to as Dün.today™) in the form of a single application (a "platform") to perform, for example, at least a plurality of the following: create, manage, organize and maintain all aspects of structural components (including but not limited to: appliances, floor plans, paint codes, building materials, light bulbs, any replaceable maintenance part). The application may be configured to accommodate at least three user types: a homeowner, a builder, and a contractor/service provider (may be used interchangeably).

Furthermore, embodiments of the present disclosure may be configured to enable warranty and insurance providers (referred to 'service providers' herein) to process, for example, but not limited to insurance claims and home warranty claims made by homeowners. In this way, users of the platform may be provided with a way to easily handle warranty claims, compare price, certifications, and availability of a service or professional.

Accordingly, the platform may be enabled to facilitate service requests across multiple different verticals of professional service, realtor referrals, mortgage refinance referrals, and insurance referrals. The software application may be an end-to-end platform, which drives efficiency, effectiveness, customer satisfaction, and ultimately revenue. Additionally, users (e.g., homeowners, builders, and contractors) may also be provided with a way to easily process transactions by digital wallet for services facilitated through the platform.

Moreover, with regard to builders and service providers, the present disclosure provides a way to easily transition to the digital/social marketplace. Additionally, the present disclosure provides a way to grow revenue by increasing customer reach and availability. Further, the present disclosure provides a means for increasing productivity—shifting the paradigm from process to engagement.

In some instances, the software application may digitize all aspects of the home into a platform. Accordingly, the mobile platform may include a Home Inventory Manager for displaying appliances (model numbers, serial numbers, manuals, filter models etc.), Floor plan, Paint Codes, Home component information (carpet brands/model/color, faucets brand/model, toilet brand/model) and so on. Additionally, in some instances, based on product information (e.g., a picture, a serial number and/or model number), additional product information (e.g., maintenance schedule, replacement parts, approved contractors, etc.) may be automatically retrieved from the Internet and populated into the platform.

Further, the platform may include a Home Maintenance manager that Gives guidance on MFG recommended maintenance schedules with alerts. Further, the Home Maintenance manager may include workflow path to reorder maintenance items (filters, light bulbs, garage door openers, etc.). Additionally, in some instances, data may be pulled from the Internet to get reminder schedule in place.

Furthermore, the mobile platform may include a Home Warranty and Service Scheduler that can enables scheduling warranty services from builders/contracts (during warranty period) and ultimately 2nd party service organizations (plumbers HVAC, roofers, drywall, paint, electrical, appliance repair, etc.). Further, Service Provider details associated with the job may also be sent to the user.

A sample user flow of the software application(app) may be as follows:

1. New Home Buyer closes on home (App is downloaded at closing).
2. Buyer may put in their primary key (unique code for their house) and the app may download all information from the builder.
3. Any home warranty scheduling (90 day punch list, 1 year punch list, or any other defect/issue during warranty period may be submitted via the app claim creation) and scheduling may be done in app with contractors etc.
4. During the duration of owning the home, the maintenance schedule may be pushed to the owner inside the app. An example would be air filters every 90 days. When this notification comes up, there may be a button that may link the reorder of the air-filters (size, model, etc. to ecommerce spaces such as Amazon™, Lowes™, Home Depot™, etc.).
5. After warranty period expiration the home services scheduling converts to an "in-network" of service professionals that can provide work (plumbers, HVAC, electrical, general contractors, painters, garage door repair, etc.).
6. Home Owner would be able to see current mortgage rates (and have a button to refinance their mortgage which would be sent to mortgage brokerages).
7. Home Owner may be able to click a button to list their home (application would send home info to realtor network, Zillow, realtor.com, etc.).

A sample builder/contractor work flow may be as follows:

1. Builder and Sub-Contractors sign up for service and download the application.
2. As builder builds the homes, they may input the data on the materials, floor plan, appliances, etc. into the software backend.
3. Once home is sold, the warranty becomes active and the builder as well as sub-contractors get notification of warranty claims submitted by home owners.
4. General Contractor/Builder get to approve or deny the claim before it is sent to the sub-contractor for scheduling.
5. Once approved, the application schedules the warranty/service work directly with the home owner and the sub-contractor.
6. The General Contractor and Builder can run reporting off the software of warranty claims to help improve quality control, customer reviews, and manage their sub-contractor relationships.

It should be noted that the platform may enable the direct interaction between homeowners and sub-contractors without the middle builder layer. In some embodiments, it may be more effective to enable the builder of an accommodation to input the various asset data associated with the accommodation, as well as preferred sub-contractors for such assets. Although the platform may further enable a builder to subsequently manage any claims to the accommodation, it may not be required, as the platform may be enabled to operate the claims process without builder involvement. For example, the homeowner may be empowered to select their preferred contractor through the platform. In other embodiments, the builder or general contractor associated with managing the homeowners premises may be responsible for processing all claims.

Still embodiments with the present disclosure, the builder or general contractor may use the platform to manage various properties and the building of said properties. The builder may employ the platform to specify the projects associated with each property and assign contractors, track their progress, and transact a payment for the completion. In this way, the builder may oversee a plurality of properties and a plurality of contractors working on the plurality of properties. Once complete, the builder may transmit the property data, and its assets, to a homeowner, who may then be subsequently empowered to do the same.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 is an illustration of a platform consistent with various embodiments of the present disclosure. By way of non-limiting example, the online platform 100 for facilitating maintenance of the accommodation may be hosted on a centralized server 110, such as, for example, a cloud computing service. The centralized server may communicate with other network entities, such as, for example, a mobile device (such as a smartphone, a laptop, a tablet computer etc.) and other electronic devices (such as desktop computers, etc.) over a communication network 112, such as, but not limited to, the Internet. Further, users of the platform may include one or more relevant parties such as, a home owner, a tenant, a builder, a contractor and a service provider (e.g. electrician, plumber, technician and so on). Accordingly, electronic devices operated by the one or more relevant parties may be in communication with the platform. For example, the platform may be in communication with an electronic device 102 operated by a user 104 of a building 106. Similarly, an electronic device 108 operated by a builder 112 (and/or a contractor).

A user 105, such as the one or more relevant parties (e.g. homeowner, builder, contractor, service provider), may access platform 100 through a software application. The software application may be embodied as, for example, but not be limited to, a website, a web application, a desktop application, and a mobile application compatible with a computing device 600. Illustrations associated with the various platform interfaces are provided in FIGS. 20-61. One possible embodiment of the software application may be provided by Dün.Today™ products and services.

Accordingly, in an instance, the user 105 may be home owner who may submit a maintenance request (e.g. an inspection request and/or a repair request) and/or a warranty claim. Further, in another instance, the user 105 may be the builder, the contractor or the service provider. For example, the builder may enter accommodation data comprising information regarding the building (floor plan, appliances installed, warranty data corresponding to one or more items in the building, preferred service providers, preferred contractors etc.) and so on. Additionally, the builder (or a general contractor) may also provide a decision (one of approval and rejection) on a warranty claim. In addition, the builder (or the general contractor) may also provide a maintenance schedule indicating each of a maintenance activity, a time at which the maintenance activity should be performed and any other contextual information associated with the maintenance activity (e.g. location of the building, cost constraints, quality constraints, preferences of the home owner).

In accordance to the embodiments disclosed herein, the builder may be enabled to select a contractor and assign the contractor to a manage a particular claim. The process of handling and executing the claim may be facilitated by the platform. The builder may review the progress and history of the contractor for each claim, and, as such, make the appropriate assignments. In some embodiments, the payment of for the assigned claim may be facilitated through the platform.

In addition, the online platform 100 may also be configured to communicate with one or more databases 114, such as for example, a building database 114. The building database 114 may include information corresponding to the accommodation, for example, builder data (name of builder, location of builder, contact details of builder), accommodation data (name of accommodation, location of accommodation, floor plan of the accommodation, warranty data of one or more items in the accommodation etc.) and contractor data (list of contractors, vendors, suppliers of materials/products, service providers etc.) and so on.

As will be detailed with reference to FIG. 6 below, the computing device through which the online platform may be accessed may comprise, but not be limited to, for example, a desktop computer, laptop, a tablet, or mobile telecommunications device. As will be detailed with reference to FIG. 6 below, the computing device through which the platform may be accessed may comprise, but not be limited to, for example, a desktop computer, laptop, a tablet, or mobile telecommunications device. Though the present disclosure is written with reference to a mobile telecommunications device, it should be understood that any computing device may be employed to provide the various embodiments disclosed herein.

III. Platform Operation

Although methods 200 to 500 have been described to be performed by platform 100, it should be understood that computing device 600 may be used to perform the various stages of methods 200 to 500. Furthermore, in some embodiments, different operations may be performed by different networked elements in operative communication with computing device 600. For example, server 110 may be employed in the performance of some or all of the stages in methods 200 to 500. Moreover, server 110 may be configured much like computing device 600.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 200 to 500 will be described in greater detail below.

Figure 2:
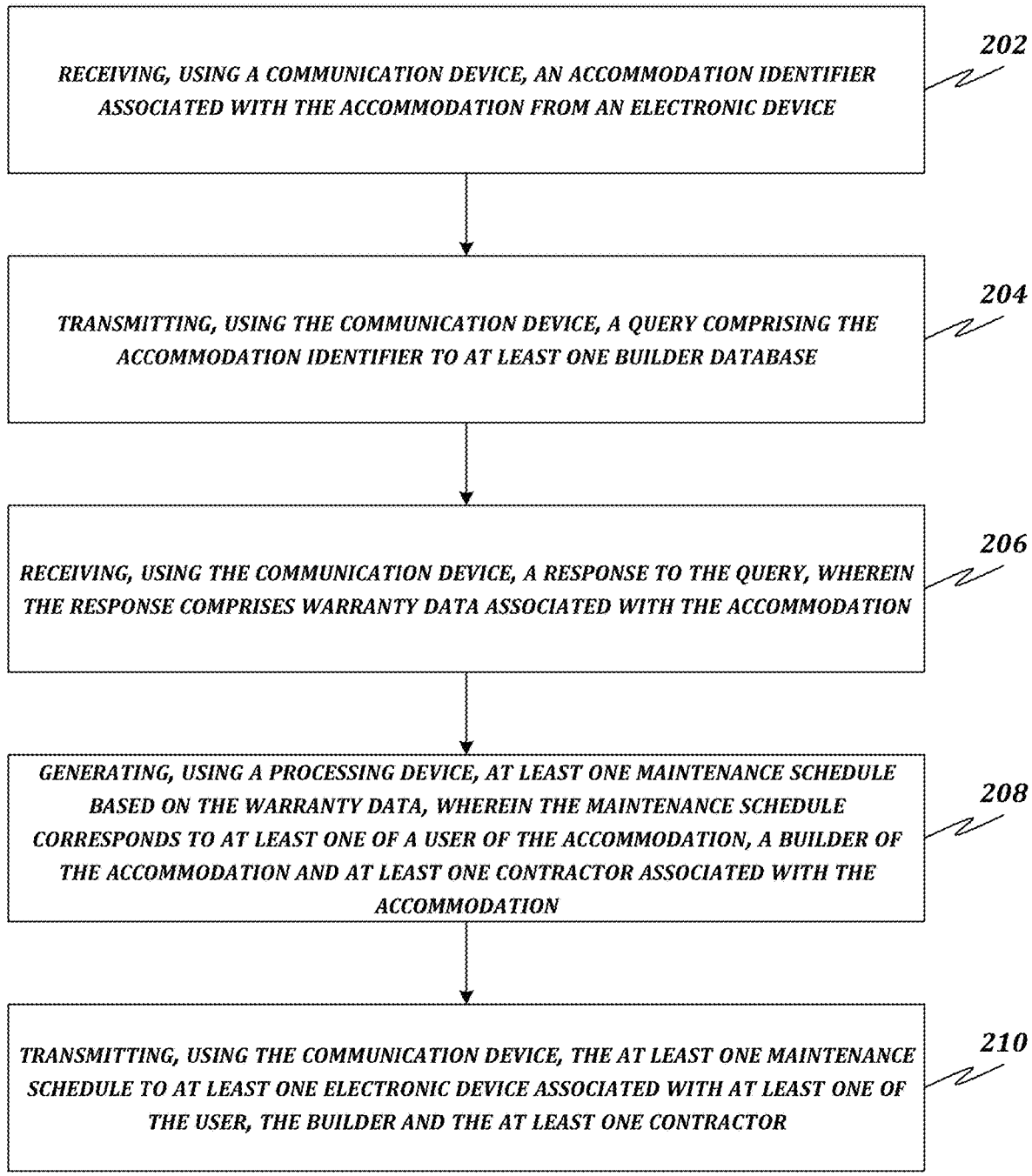
FIG. 2 illustrates a flowchart of a first method 200 of facilitating maintenance of an accommodation, in accordance with some embodiments.

FIG. 2 illustrates a flowchart of a first method 200 of facilitating maintenance of an accommodation, in accordance with some embodiments. The first method 200 may include a stage 202 of receiving, using a communication device, an accommodation identifier associated with the accommodation from an electronic device. Further, the first method 200 may include a stage 204 of transmitting, using the communication device, a query comprising the accommodation identifier to at least one builder database. The accommodation identifier may comprise, but not be limited, a premises and an asset on the premises associated with, for example, a claim. The claim, although used through the present disclosure in the context of a warranty claim, may be used to refer to any service request associated with a premises (a building) or an asset on premises (e.g., an appliance), Furthermore, the first method 200 may include a stage 206 of receiving, using the communication device, a response to the query. Further, the response may include warranty data associated with the accommodation. In some embodiments, the warranty data may be provided by an entity associated with the accommodation. The warranty data may include, for example, the maintenance schedule associated with the accommodation and various assets associated therewith.

Additionally, the first method 200 may include a stage 208 of generating, using a processing device, at least one maintenance schedule based on the warranty data. Further, the maintenance schedule corresponds to at least one of a user of the accommodation, a builder of the accommodation and at least one contractor associated with the accommodation. Thus, in some embodiments, the maintenance schedule may be designed to ensure that a service provider associated with the claim and accommodation is available, as is the homeowner. Such operation may be performed by an automated calendaring function, while in other embodiments, the operation may be coordinated by a platform administrator (e.g., a builder assigned to the claim and responsible for ensuring the fulfillment of the claim).

In some embodiments, the at least one maintenance schedule indicates a maintenance activity performable by the user of the accommodation and a time associated with performing the maintenance activity. The user of the accommodation may be, for example, but not limited to, a contractor assigned to the claim, a contractor that bids for the claim, or a builder responsible for the claim.

Further, the at least one maintenance schedule may be transmitted prior to expiration of a warranty period associated with the accommodation. Additionally, the time may include a predetermined number of days. Further, the maintenance activity may be required to be performed regularly after lapse of the predetermined number of days.

In some embodiments, the at least one maintenance schedule may further indicate at least one source of procuring at least one of a consumable product and a recurring service associated with the maintenance activity. For example, the consumable product may include an air filter.

Furthermore, the first method 200 may include a stage 210 of transmitting, using the communication device, the at least one maintenance schedule to at least one electronic device associated with at least one of the user, the builder and the at least one contractor.

In some embodiments, the first method 200 may further include receiving, using the communication device, at least one maintenance request from an electronic device associated with the user. Further, the at least one maintenance schedule may be transmitted to at least one of the builder and the at least one contractor based on the at least one maintenance request. In some embodiments, the first method 200 may further include transmitting, using the communication device, the at least one maintenance request to an electronic device associated with at least one of the builder and a general contractor.

The maintenance request may comprise, but not be limited, a premises and an asset on the premises associated with, for example, the request. The request, although used through the present disclosure in the context of accommodation maintenance, may be used to refer to any service request associated with a premises (a building) or an asset on premises (e.g., an appliance), Further, the platform may be configured to receive one of an approval and a rejection of the at least one claim or maintenance request from at least one of the builder and the general contractor. Additionally, the first method 200 may include receiving one of the approval and the rejection. Further, the at least one maintenance schedule may be transmitted to the at least one contractor based on receipt of approval. Furthermore, the at least one contractor may be capable of resolving the at least one maintenance request.

Still consistent with embodiments of the present disclosure, the builder or general contractor (which may be used, at times, interchangeably) may be enabled to assign the appropriate contractor or service provider to a claim through management solutions provided by the platform. In other embodiments, the builder or general contractor may not be a party to the platform, and thus, claims and requests may be distributed to contractors directly without the operation of the builder or general contractor.

In some embodiments, the first method 200 may further include analyzing, using the processing device, each of the warranty data and the at least one maintenance request. Further, the method 200 may include generating, using the processing device, one of an approval and a rejection of the at least one maintenance request based on the analysis. Accordingly, the at least one maintenance schedule may be transmitted to the at least one contractor based on generation of the approval. Further, the at least one contractor may be capable of resolving the at least one maintenance request.

Although the aforementioned disclosure has been presented in the context of a claim or request associated with an asset on a premises, the same functions and features of the platform could be configured to process, for example, financing or refinancing request associated with an accommodation. Thus, in some embodiments, the first method 200 may further include determining, using the processing device, a current mortgage rate associated with the accommodation. Additionally, the first method 200 may include transmitting, using the communication device, the current mortgage rate to an electronic device associated with the user. In some embodiments, the first method 200 may further include transmitting, using the communication device, indication of at least one mortgage broker to the electronic device in order to facilitate refinancing of a mortgage of the accommodation. In some embodiments, the first method 200 may further include transmitting, using the communication device, indication of at least one realtor network in order to facilitate listing the accommodation on the at least one realtor network.

Accordingly, rather than the platform connecting the homeowner with a contractor (via, at times, a builder), the platform may connect the homeowner with a service provider (mortgage broker, insurance broker, and the like). The platform may provide all the details of the accommodation and its assets to enable the contractor or service provider to effectively operate, and the platform may further, in some embodiments, facilitate the scheduling and payment processes of the operation.

FIG. 3 illustrates a flowchart of a second method 300 of facilitating maintenance of an accommodation, in accordance with some embodiments. The second method 300 may include a stage 302 of receiving, using a communication device, accommodation data associated with the accommodation from an electronic device associated with at least one of a builder and a contractor of the accommodation. Further, the accommodation data may include an accommodation identifier associated with the accommodation and at least one of a builder identifier of the builder and a contractor identifier of the contractor. Furthermore, the second method 300 may include a stage 304 of storing, using a storage device, the accommodation data.

Additionally, the second method 300 may include a stage 306 of receiving, using the communication device, at least one warranty claim from an electronic device associated with a user of the accommodation. Further, the at least one warranty claim may include the accommodation identifier and a maintenance request. Furthermore, the second method 300 may include a stage 308 of identifying, using the processing device, at least one of the builder and the contractor based on a comparison of the at least one warranty claim with the accommodation data. Further, the second method 300 may include a stage 310 of transmitting, using the communication device, the at least one warranty claim to the electronic device associated with at least one of the builder and the contractor. Additionally, the second method 300 may include a stage 312 of receiving, using the communication device, one of an approval and a rejection of the at least one warranty claim from the electronic device. Further, the second method 300 may include a stage 314 of transmitting, using the communication device, the maintenance request to at least one of the contractor and a service provider based on receipt of the approval. As mentioned above, in instances where the platform facilitates a direct connection between a homeowner and a sub-contractor, the homeowner may act in the capacity to approve or decline a sub-contractors bid to work on a claim.

Further, in some embodiments, the second method 200 may further include generating, using the processing device, a report based on a plurality of warranty claims. Additionally, the second method 200 may include transmitting, using the communication device, the report to the electronic device associated with at least one of the builder and the contractor. As mentioned above, in instances where the platform facilitates a direct connection between a homeowner and a sub-contractor, the homeowner may receive the report directly.

Figure 4:
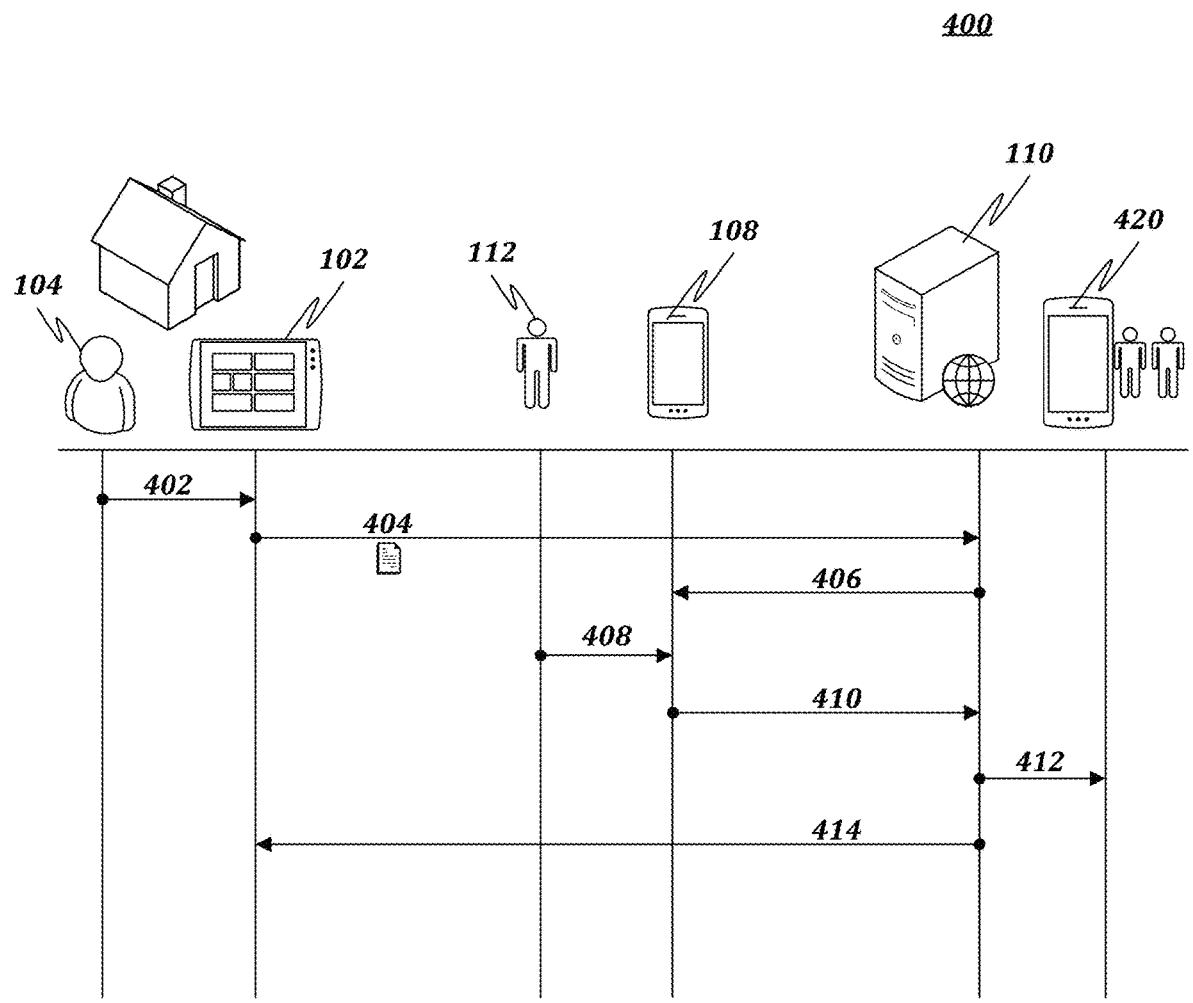
FIG. 4 illustrates a sequence diagram 400 corresponding to a method of facilitating maintenance of an accommodation, in accordance with some embodiments.

FIG. 4 illustrates a sequence diagram 400 corresponding to a method of facilitating maintenance of an accommodation, in accordance with some embodiments. At step 402, the user 104 may interact with the electronic device 102 embodying the software application associated with the platform 100. For example, the user 104 may be an owner of the accommodation 106, such as, for example, a home. In an instance, the user 104 may interact with the electronic device 102 in order to create a maintenance request.

The maintenance request may include a repair request and/or an inspection request. The repair request (or the inspection request) may be associated with one or more items of the accommodation, such as the home. Examples, of the one or more items may include, electrical/electronic appliances, HAVC, heater, air conditioner, electrical chimney, refrigerator, ice maker, dishwasher, washing machine, dryer, Insinkerator™ and so on.

Figure 12:
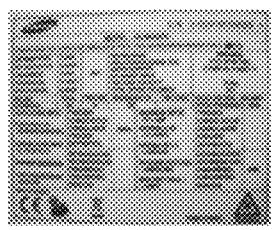
FIG. 12 illustrates a screenshot of an appliance details page 1200 of the software application (e.g. mobile app) for facilitating maintenance of the accommodation, in accordance with some embodiments.
Figure 15:
FIG. 15 illustrates a screenshot of a maintenance status page 1500 of the software application (e.g. mobile app) for facilitating maintenance of the accommodation, in accordance with some embodiments.
Figure 19A:
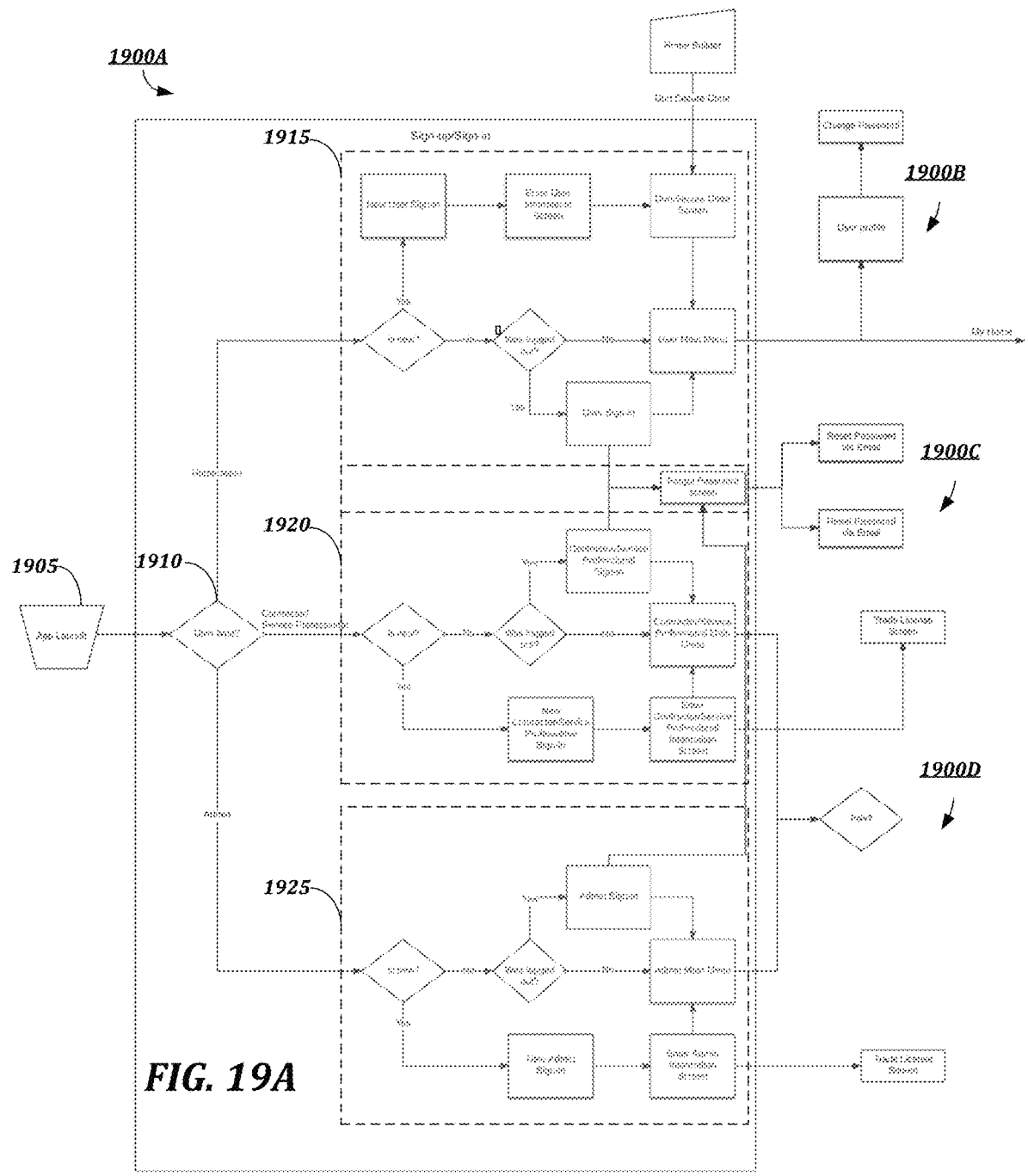
FIG. 19A illustrates a flow diagram of a software application (e.g., mobile app) for facilitating maintenance of the accommodation, in accordance with some embodiments.
Figure 19B:
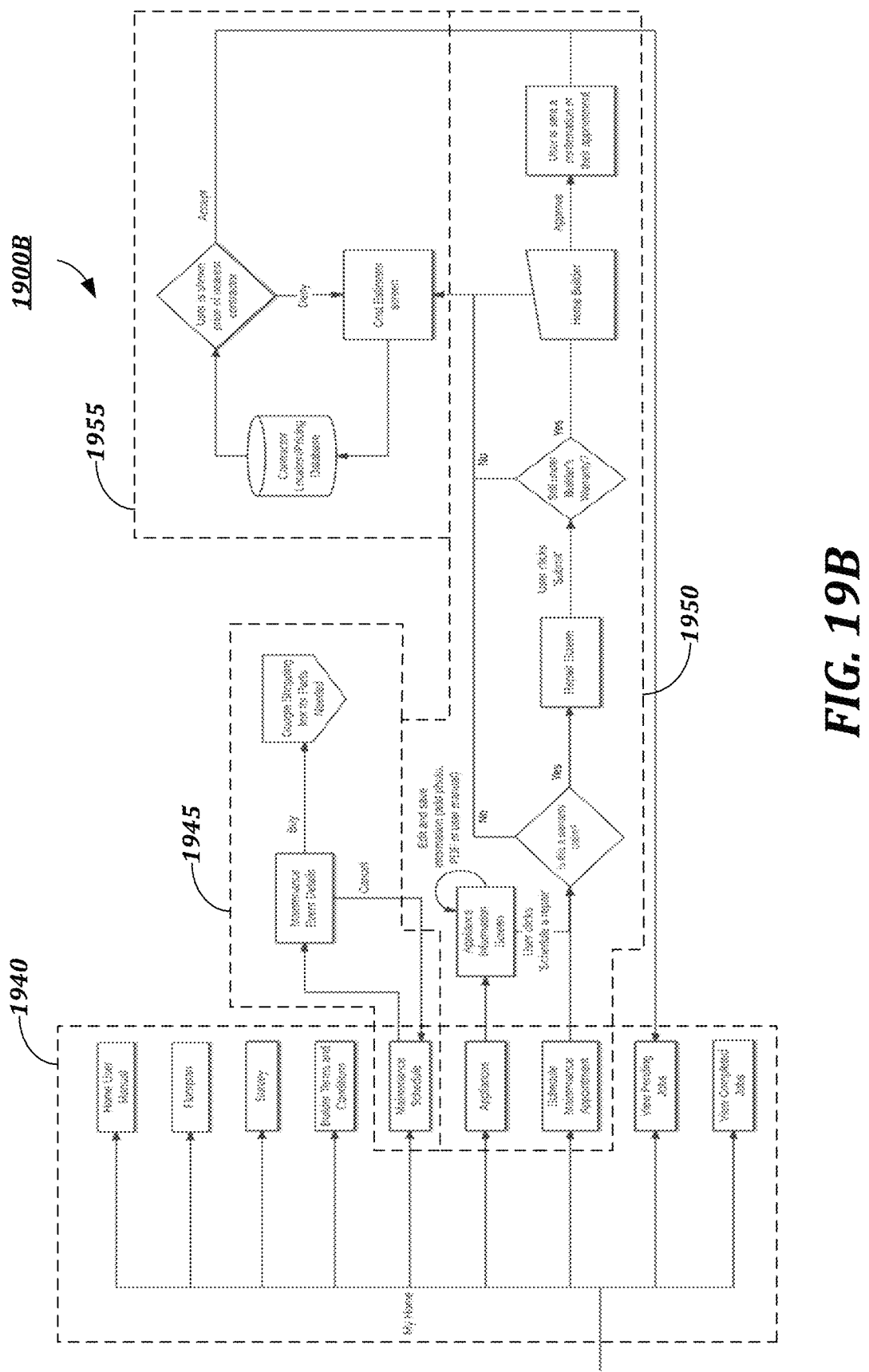
FIG. 19B illustrates a flow diagram of a software application (e.g., mobile app) for facilitating the homeowner user experience in accordance with some embodiments.
Figure 19C:
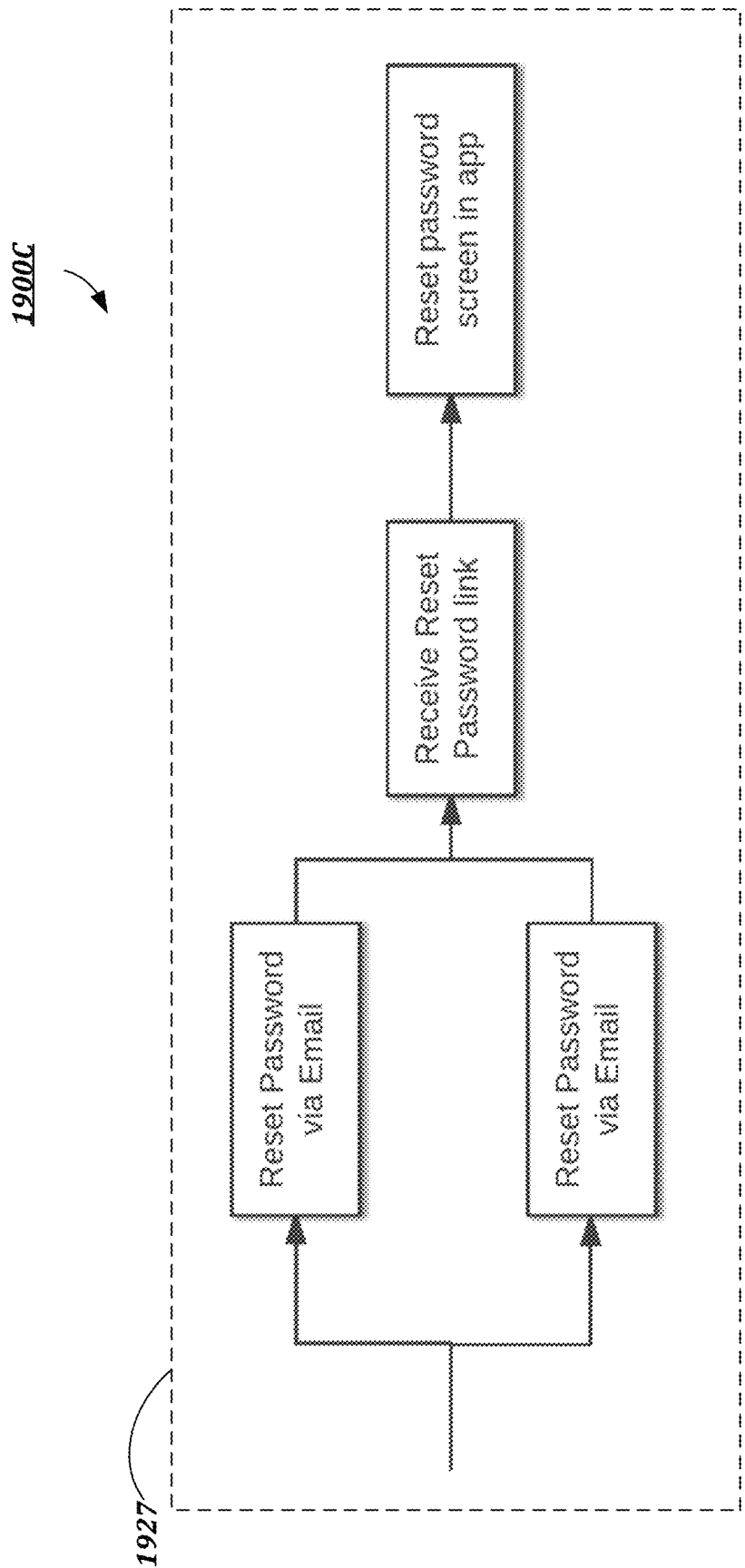
FIG. 19C illustrates a flow diagram of a software application (e.g., mobile app) for facilitating the reset of a password in accordance with some embodiments.
Figure 19D:
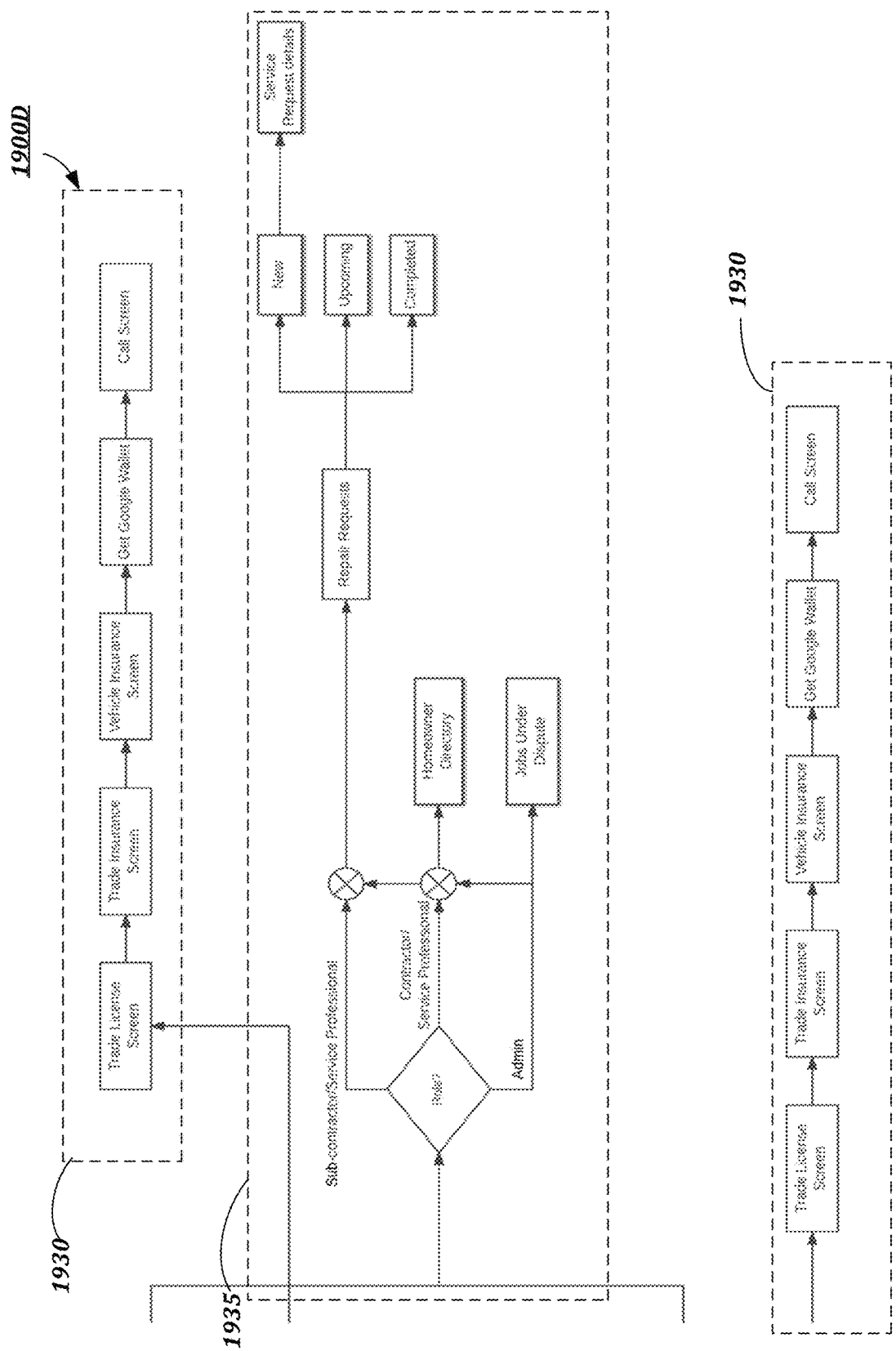
FIG. 19D illustrates a flow diagram of a software application (e.g., mobile app) for providing the homeowner with pre-selected options or input new professional credentials user with pre-selected options, in accordance with some embodiments.

Accordingly, in order to select an item associated with the repair request (or the inspection request), the electronic device 102 may be configured to present a user interface such as the appliance page 1100 illustrated in FIG. 11 and the amenities page 1300 illustrated in FIG. 13. Accordingly, when the user 104 selects an item, for example a refrigerator, the appliance details page 1200 as illustrated in FIG. 12 may be presented on the electronic device 102. Subsequently, the user 102 may enter product information such as, brand, model number, serial number and so on. Additionally, the user 102 may also be enabled to provide an image of the item. The image may include, for example, the product information and/or an optical code (bar code, QR code etc.) encoded with the product information.

Figure 8:
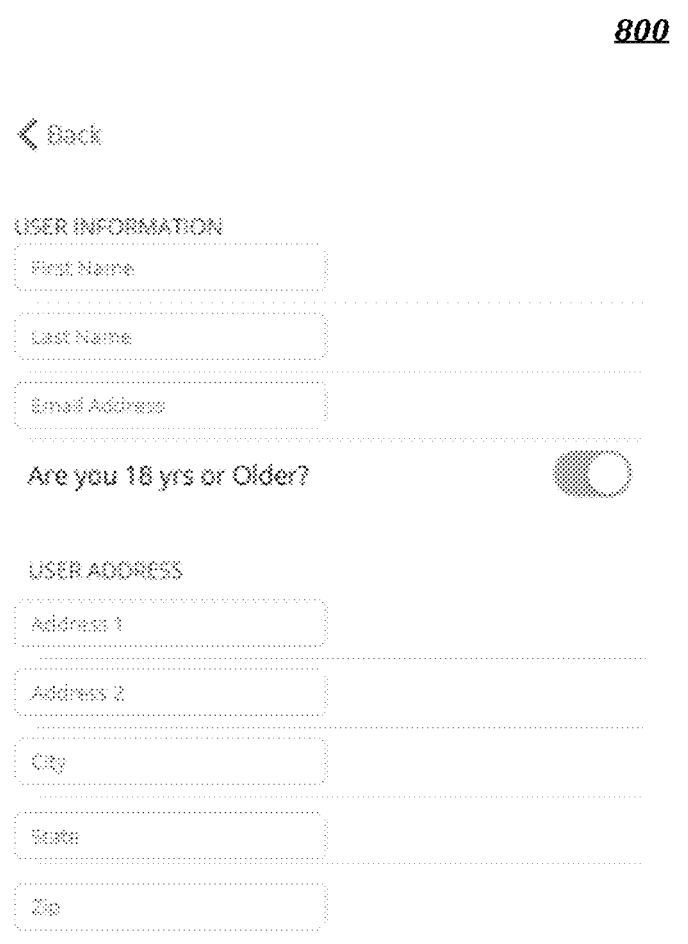

Additionally, the user 104 may also be enabled to provide personal information (name, age, contact details etc.) and data associated with the accommodation, such as an address. Accordingly, the electronic device 102 may be configured to display the personal information page 800 as illustrated in FIG. 8.

Figure 14:
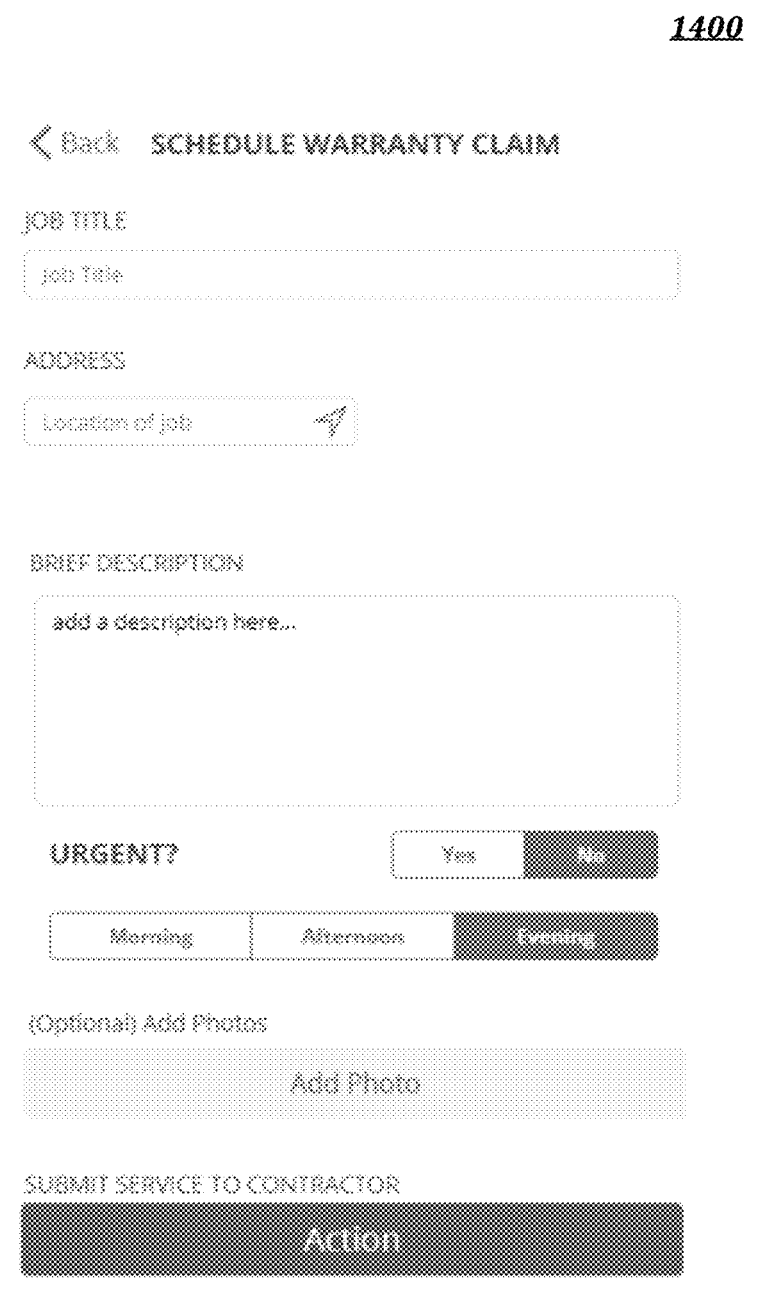

In some embodiments, the user 102 may make the maintenance request in the form of a warranty claim. Accordingly, the user 102 may be presented with warranty claim page 1400 as illustrated in FIG. 14. Subsequently, the user 102 may be enabled to provide information such as a job title, an address of the job, a description of the job, a level of urgency of the job, a preferred time when the job is to be performed (e.g. morning, afternoon, evening) and one or more images capturing one or more items related to the job (e.g. a damaged sink, a malfunctioning appliance etc.).

Once the user 102 performs a submit action (e.g. by clicking the Action button illustrated in FIG. 14), the maintenance request may be transmitted to the online platform (e.g. server 110), at step 404. Thereafter, the server 110 may analyze the maintenance request in order to determine the builder 112 (or a general contractor) associated with the maintenance request. For instance, the server 110 may access a database such as building database 114 in order to identify the builder 112 of the accommodation. For example, an accommodation identifier in the maintenance request may be compared with a plurality of accommodation identifiers in the database 114 and a matching builder's contact details (e.g. email, server IP address, telephone number, etc.) may be retrieved.

Subsequently, at step 406, the server 110 may transmit the warranty claim comprised in the maintenance request to the electronic device 108 associated with the builder 112 (or a general contractor). Therefore, the builder 112 may review the warranty claim and provide one of an approval and a rejection at step 408. Subsequently, one of the approval and the rejection may be transmitted to the server 110 at step 410. In case the builder 112 provides an approval, the server 110 may transmit the maintenance request comprising a maintenance schedule to an electronic device 420 associated with one or more contractors or service providers. Thereafter, the server 110 may transmit an acknowledgement to the electronic device 102 of the user 104. The acknowledgement may indicate a successful scheduling of the maintenance request and optionally may include details (name, contact details etc.) about the contractor or the service provider assigned to resolve the maintenance request.

FIG. 5 illustrates a flowchart of a method 500 of facilitating maintenance of an accommodation based on image analysis, in accordance with some embodiments. The method 500 may include a stage 502 of receiving, using the communication device, a warranty claim comprising an image and a location associated with an accommodation.

Further, the image may represent at least one item in the accommodation. For example, when a microwave oven is faulty, the user 104 may take a photograph of the microwave oven (preferably from a view (e.g. frontal view) that facilitates the microwave oven to be recognized). The photograph may be obtained, for example, by using the electronic device 102 (such as a smartphone, tablet computer etc.). Additionally, in some embodiments, the location may be automatically determined using a location sensor (E.g. GPS receiver) comprised in the electronic device 102. Alternatively, in some embodiments, the user may manually specify the location in the form of a postal address or a unique accommodation identifier (e.g. building name) that is associated with the location.

Further, the method 500 may include a stage 504 of analyzing, using the processing device, the image to identify the at least one item in the image. For example, object recognition algorithms may be used to process the image and compare with pre-existing images of appliances in building database 114. Accordingly, in some instances, the building database 114 may store, for each accommodation, one or more images corresponding to the one or more items installed in the accommodation.

Furthermore, the method 500 may include a stage 506 of identifying, using the processing device, at least one of a builder and a contractor associated with at least one of the accommodation and the at least one item based on each of the location and identification of the at least one item. For example, based on the location received, the builder may be identified by querying the database 114. Further, based on the at least one item identified, the at least one contractor may be identified (in cases where different items in the accommodation correspond to different contractors). For example, the builder 112 may be identified and a contractor associated with the microwave oven may also be identified at stage 506. In some embodiments, the platform may store information associated with building materials and underlying building infrastructure layout. In this instance, the platform may associate contractors associated with the underlying structure, qualified to maintain and repair various aspects therein (e.g., plumbing, drywall, etc.).

Additionally, the method 500 may include a stage 508 of analyzing, using the processing device, warranty data associated with the at least one item. Accordingly, the warranty data may be retrieved based on identifying the builder 112 and the at least one item. The warranty data may include for example, a date on which the one or more items were installed, a period of warranty corresponding to the one or more items, and any exceptions associated with the warranty. Accordingly, in some embodiments, the validity of the warranty claim may be automatically verified based on analysis at stage 508.

However, in some embodiments, the method 500 may include a stage 510 of transmitting, using the communication device, the warranty claim to an electronic device associated with at least one of the builder and a general contractor.

Further, the method 500 may include a stage 512 of receiving, using the communication device, one of an approval and a rejection of the warranty claim from the electronic device. Accordingly, the method may further include a stage 514 of transmitting, using the communication device, a maintenance request to at least one of a contractor and a service provider based on receipt of the approval. Thereafter, the contractor and/or the service provider may attend to the warranty claim and resolve any issues (e.g. repair, inspect or replace) with the at least one item.

FIGS. 19A-19D illustrates non-limiting methods that may be performed by various embodiments of platform 100. Although methods 1900A to 1900D have been described to be performed by platform 100, it should be understood that computing device 600 may be used to perform the various stages of methods 1900A to 1900D. Furthermore, in some embodiments, different operations may be performed by different networked elements in operative communication with computing device 600. For example, server 110 may be employed in the performance of some or all of the stages in methods 1900A to 1900D. Moreover, server 110 may be configured much like computing device 600.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 1900A to 1900D will be described in greater detail below.

Method 1900A may begin at stage 1905, where an application (e.g., mobile device application or web application) may be triggered to launch an operation. Method 1900A may proceed to stage 1910 where a user type is determined. The user types may include, but not be limited to, for example, a Homeowner, a Contractor or Service Professional, or an Administrative user (e.g., a builder or sub-contractor). The user type may be determined by, for example, an input received from a user of platform 100, either currently or previously selected.

Next, the user may be prompted to sign-in or register with platform 100 if they are not already a user. Although many registration and sign-in methods may apply, examples of authentication processes are as follows. When the user type is determined to be a homeowner, method 1900A may proceed to stage 1915. When the user type is determined to be a Contractor or Service Professional, method 1900A may proceed to stage 1920. When the user type is determined to be an Administrative user, method 1900A may proceed to stage 1925. Initially, platform 100 may be configured to enable a registration process for new users requiring the provision of credentials. A password reset process may be provided as detailed with regard to method 1900C, stage 1927.

During registration, for certain user types, additional security and license verification measures may be implemented. In this instances, where a user is registered as a Contractor or Service Professional in stage 1920, method 1900A may proceed to method 1900D, stage 1930, wherein the user's licenses are received. Platform 100, however, may not only receive the licenses of the user. Rather, platform 100, in some embodiments, may be configured to receive other parameters, such as, for example, but not limited to, a Trade License, Trade Insurance, Vehicle Insurance, and various other parameters (e.g., liability insurance). Further still, in certain embodiments, platform 100 may be configured to review or validate the licenses/insurances through API's or other access to databases comprises data points that may be cross-referenced for validation. Once the trade licenses are registered, platform 100 may be configured to properly list the service types that the professional is permitted to perform, which will become relevant with reference to stage 1935.

In some embodiments, a professional user may connect a wallet or other form of payment acceptance means. In this way, the platform may facilitate a direct payment to the professional user in association with a service request. Furthermore, the professional user may be provided with a call screen through which the professional user may communicate and/or obtain contact information associated with a user who affiliated with the service request.

Still consistent with embodiments of the present disclosure, once signed in to platform 100, method 1900A may transition, from any relevant or applicable previous stage, to stage 1935 of method 1900D. Here, certain user interfaces and functions may be provided to the user based on the user's role.

Referring first to the Homeowner user type. Method 1900B discloses one method of providing a user experience for the homeowner user type. Method 1900B may begin at stage 1940, wherein a plurality of modules may be provided to the homeowner. The processes and systems behind the modules are detailed with reference to FIGS. 1-18 above, although variations are anticipated to be within the scope of the present disclosure. The modules may include, but not be limited to, for example, home user manuals, floor plans, surveys, builder terms and conditions, maintenance schedules and appointments, appliances and details associated therewith. In addition, and as will be detailed below, a tracking module to view pending and completed services may also be provided.

In stage 1945, a maintenance schedule may be defined by the user. In some instances, the recommended maintenance schedules may be retrieved from the builder and/or a supplier/manufacturer of certain components. Platform 100 may then adopt the recommended maintenance schedule. Further still, an Administrator may facilitate the provision of recurring maintenance events for homeowners based on a review of their home profile. In some embodiments, platform 100 may facilitate the order components necessary for scheduled maintenance (e.g., air filters, water filters, etc.) in advance of the scheduled maintenance. Homeowners, administrators, and professionals may all be enabled to select which parts should be ordered. The specification may occur, for example, at the setting of date of the recurring maintenance event. Still consistent with embodiments of the present disclosure, the components may be delivered to the home or to a professional scheduled to perform the repair. In this way, a professional may arrive to perform the maintenance with all the necessary parts.

In stage 1950, a repair request may be initiated. The repair request may, at times, be associated with a component in need for repair. Platform 100 may first determine if that component is covered under warranty. If so, platform 100 may facilitate a warranty claim to be submitted to a provider of the warranty (e.g., home builder). The warranty provider may then, via platform 100, approve or decline the warranty request. Although platform 100 need not be configured to serve as a platform to approve warranty requests, it may still provide notifications to relevant party regarding the request, and enable various user types to track the request. In stage 1955, and as will be detailed below, platform 100 may facilitate an estimate and subsequent payment for the maintenance.

Referring now to method 1900D at stage 1935, the homeowner may be provided with pre-selected options (e.g., professional already registered on the platform, associated with the repair type), or input new profession credentials (in this instance, the contractor may receive an invitation to register to platform 100, although not required). In some embodiments, registered professionals may bid to be promoted or listed with a hire ranking/rating than other professionals, making their selection more likely than other listed professionals. The contractors may be provided to the homeowner for selection based on, for example, but not limited to, their previous inputs to the platform.

Referring back to the Contractor or Service Professional user, this user-type may be provided with an interface to view of repair requests. The view may be segmented into, for example, new, upcoming, and completed, with details available for each. Warranty claims for review and approval may also be provided where the professional is a warranty provider. In various embodiments, the repair requests would be paired with the professional user based on, for example, a home-owner's selection of an appropriate professional. Upon receiving a paired request, the professional may be notified via platform 100. The notification may comprise, but is not limited to, an in-platform notification or an external notification (e.g., email, call, text). Moreover, in some embodiments, the professional may be prompted to accept or decline the request. The acceptance or declination, in turn, may be communicated to the requesting homeowner. Further still, in some embodiments, platform 100 may facilitate an e-commerce element in which a price for the services can be agreed upon and paid through platform 100.

An Administrative user may be provided with an interface to manage homeowner and professional interactions. For example, the Administrative user may be enabled to set maintenance schedules for homeowners and track repair requests and to resolve inquiries and disputes regarding repair requests. In some embodiments, the Administrative user may be enabled to receive requests made by homeowners and subsequently dispatch the appropriate professionals. In these instances, the Administrative user may further facilitate payment between the two contracting parties. Further still, the Administrative user may regulate the licenses and verifications for professionals seeking to register to platform 100. In general, platform 100 may provide the Administrative user with the proper privileges to perform any function available to any user-type, on behalf of any user.

Figure 20:
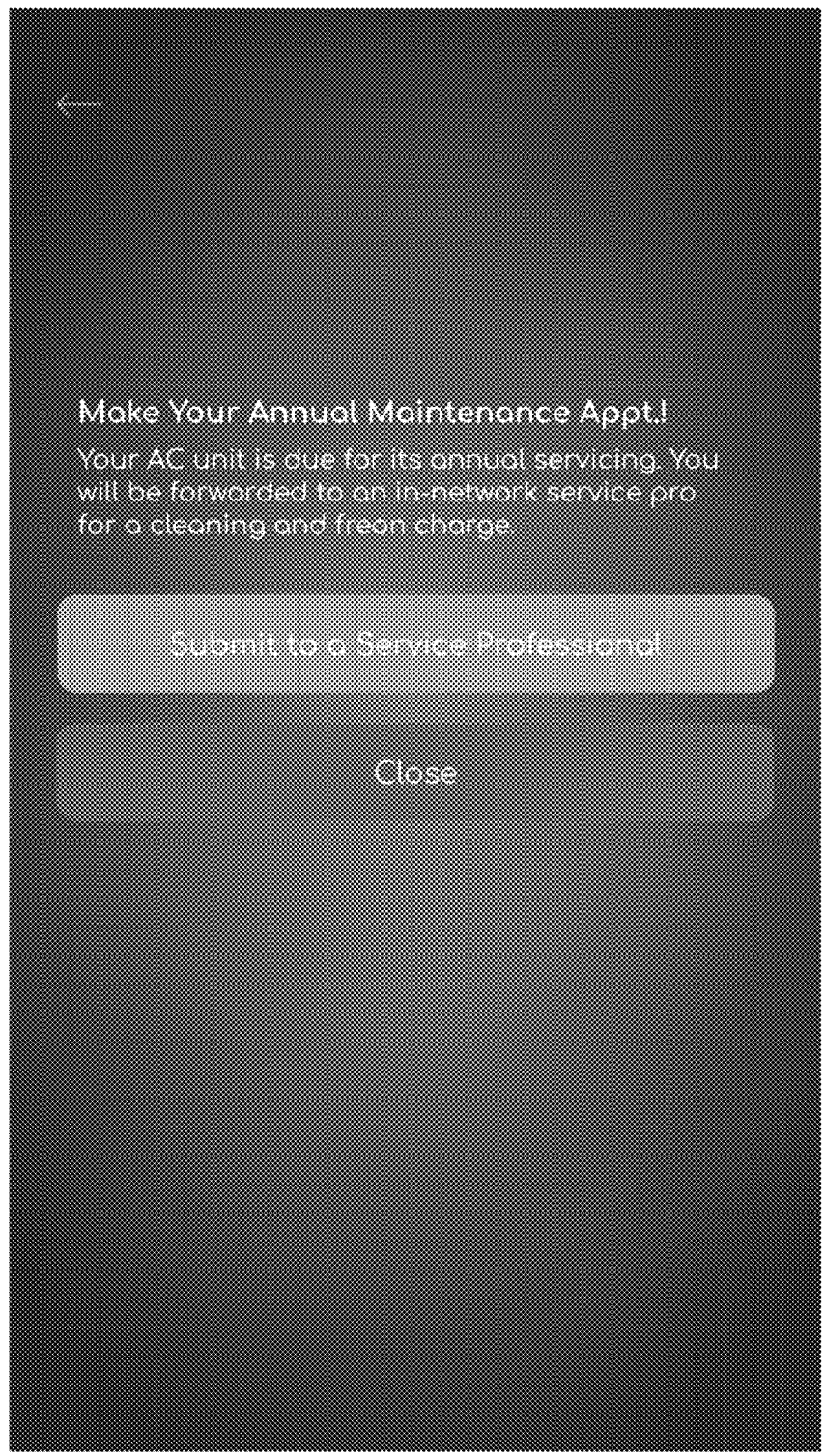
FIG. 20 depict an interface homeowner's notification for an annual maintenance appointment in accordance with some embodiments.
Figure 21:
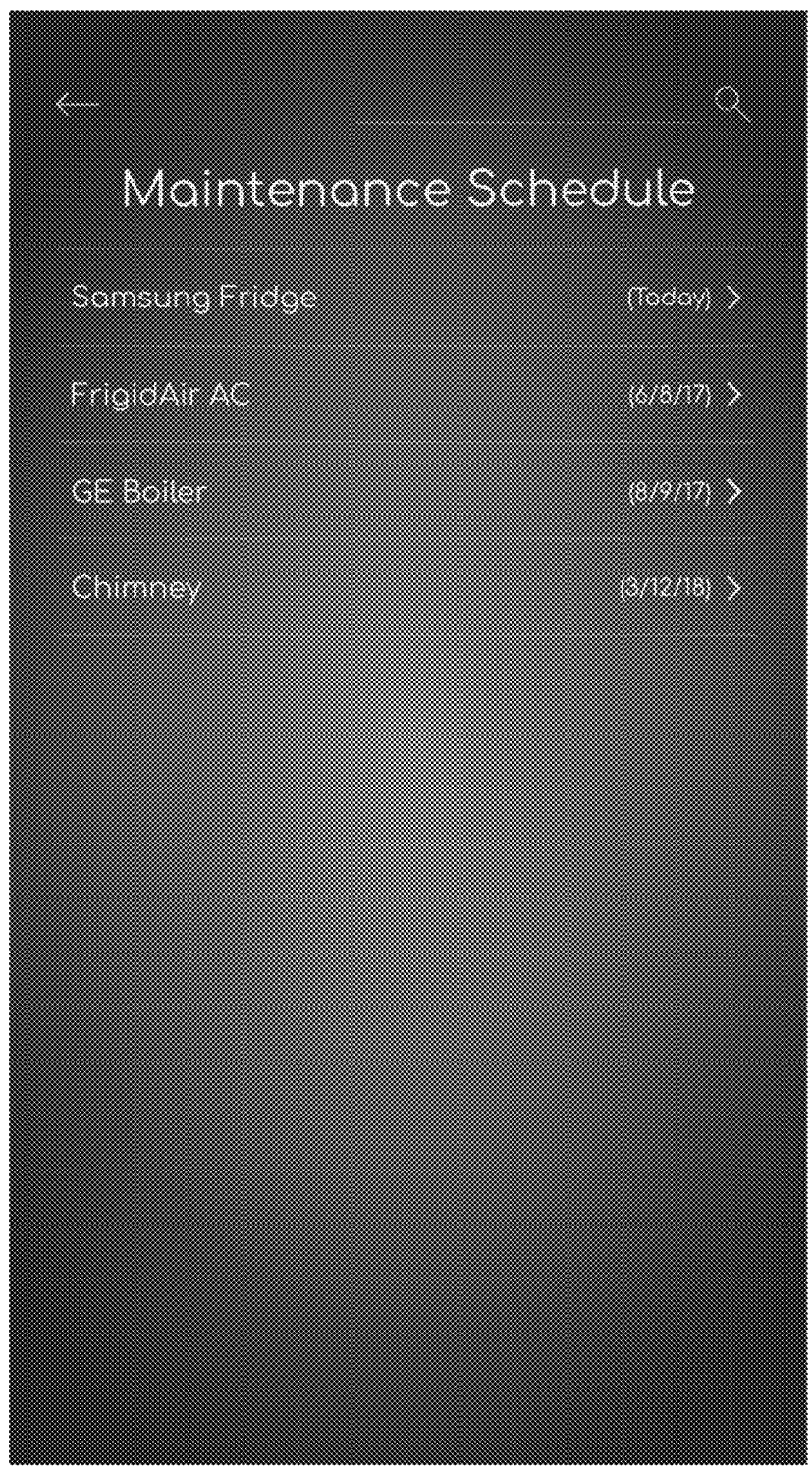
FIG. 21 depict a homeowner's maintenance schedule for different appliances in accordance with some embodiments.

FIG. 20 illustrates one user interface that may be provided to a homeowner user. The platform may analysis the database of assets associated with the homeowner accommodation, which may include a maintenance schedule retrieved from, for example, a builder or manufacturer associated with the asset. The homeowner may be prompted to perform maintenance on the asset. A maintenance schedule for each asset may also be provided, as shown in FIG. 21.

Figure 22:
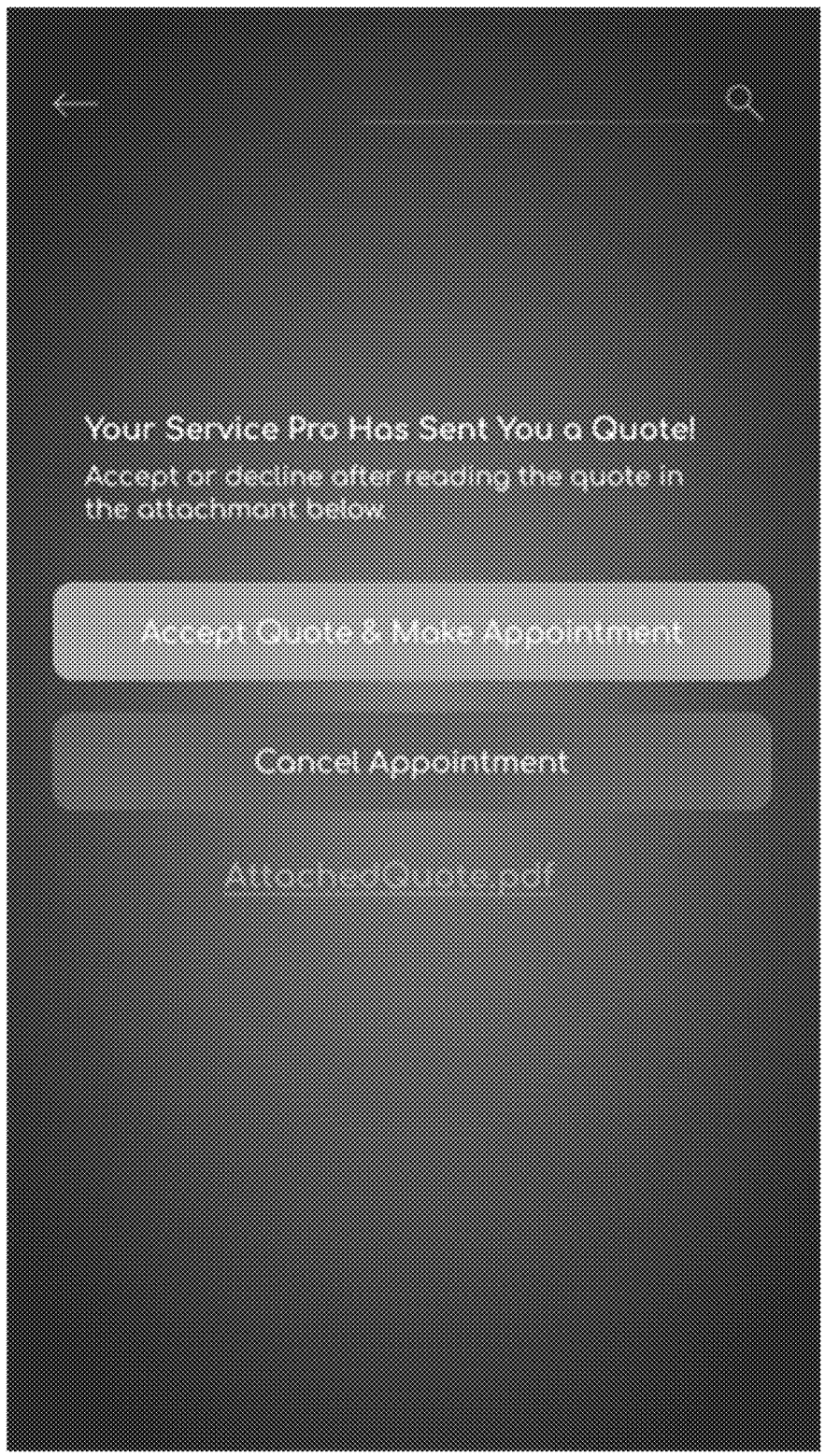
FIG. 22 illustrates a service professional bidding on the service requirement, and a homeowner being enabled to accept, decline, schedule, or reschedule in accordance with some embodiments.

Through various embodiments disclosed herein, the homeowner may request a quote for service. In some embodiments, quotes may be submitted to the homeowner by the builder or contractors associated with the accommodation. In some embodiments, a builder may also be aware and following the homeowner's maintenance schedule. In some embodiments, the contractor may be notified of the maintenance requirements of an accommodation and be enabled to bid on the work. FIG. 22 illustrates a service professional bidding on the service requirement, and a homeowner being enabled to accept, decline, schedule, or reschedule.

Figure 23:
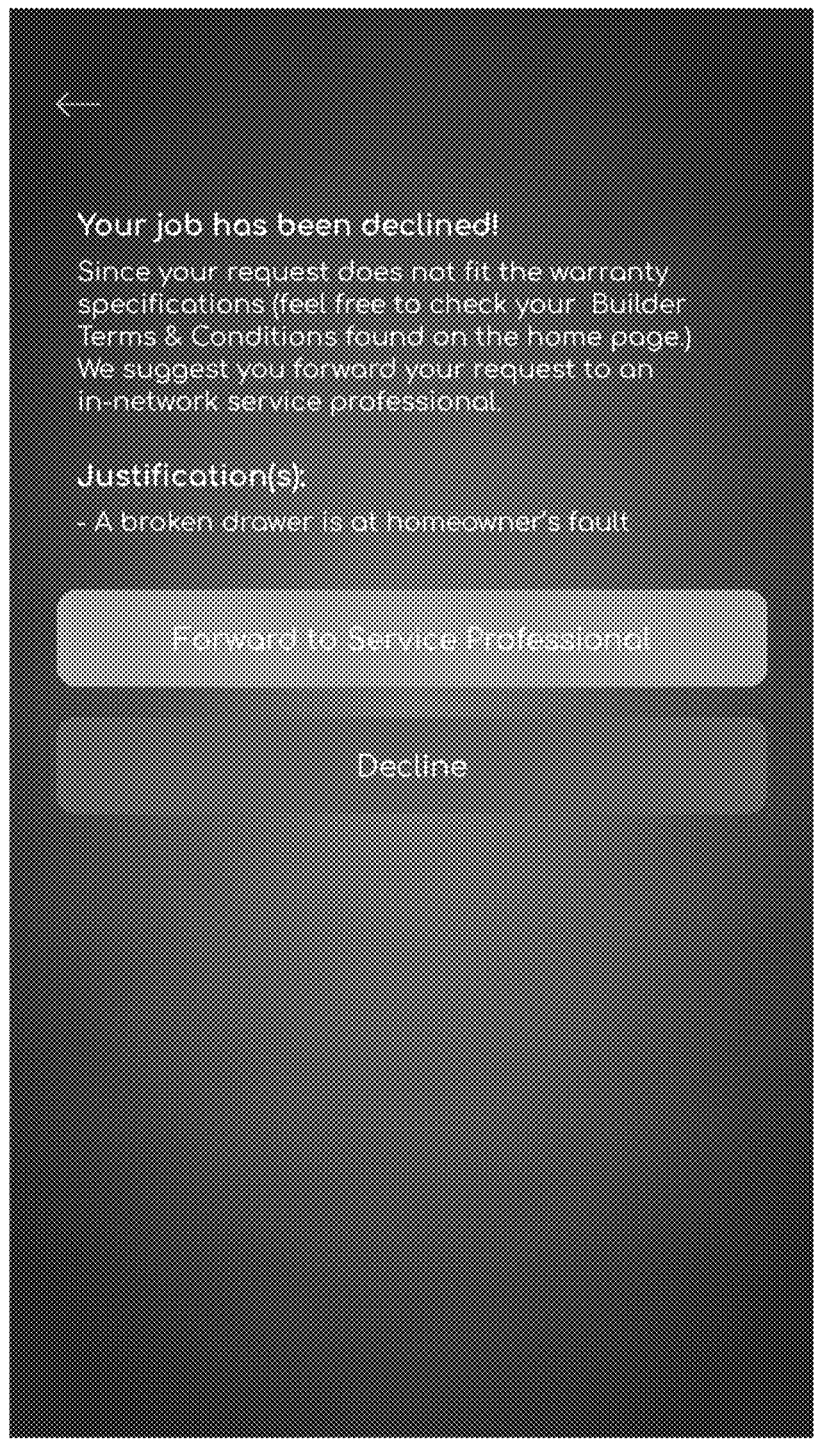
FIG. 23 illustrates this scenario and enables the homeowner to manage the claim directly with a sub-contractor in accordance with some embodiments.
Figure 24:
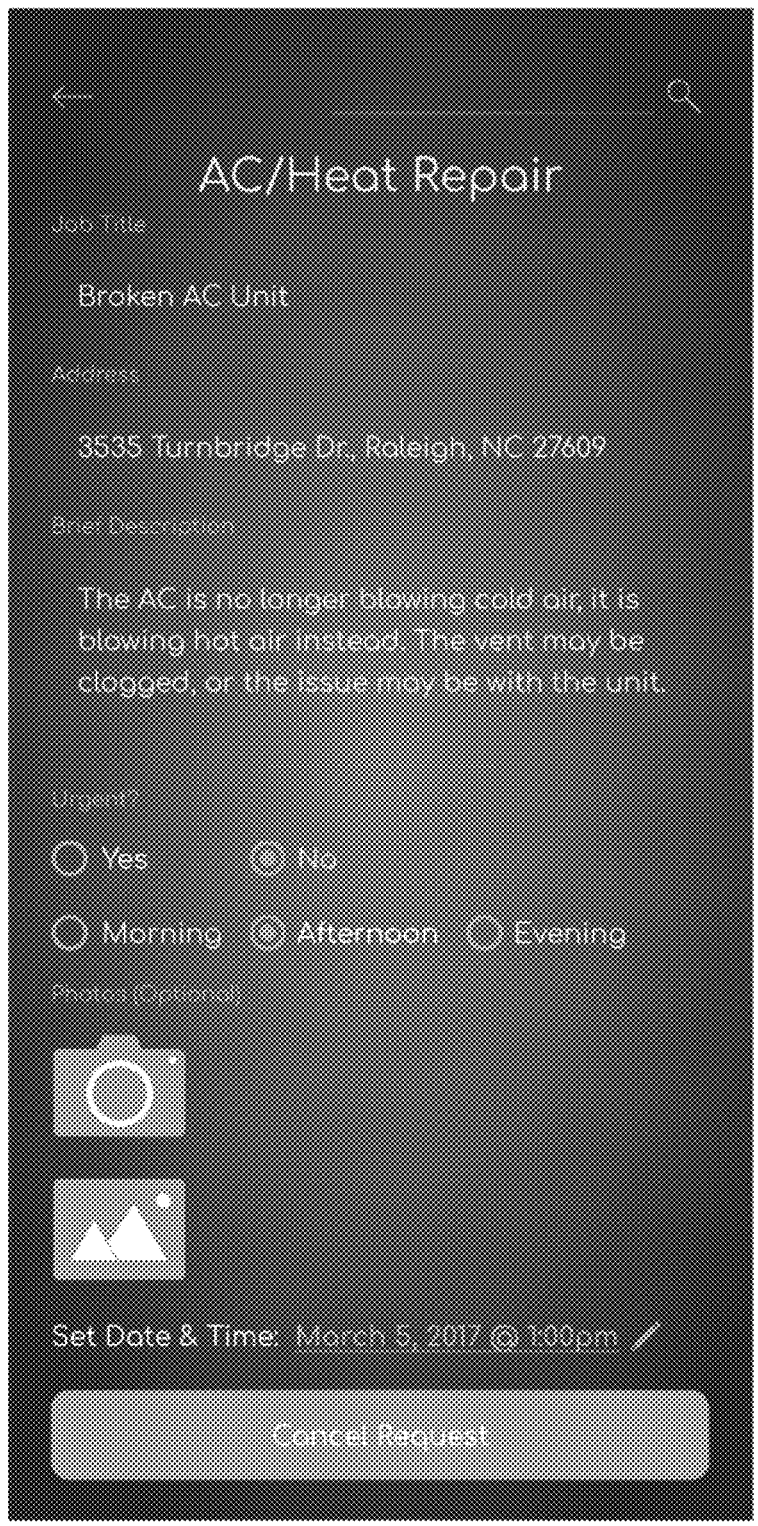
FIG. 24 illustrates an example of a job request that may be provided by a homeowner through the platform in accordance with some embodiments.
Figure 25:
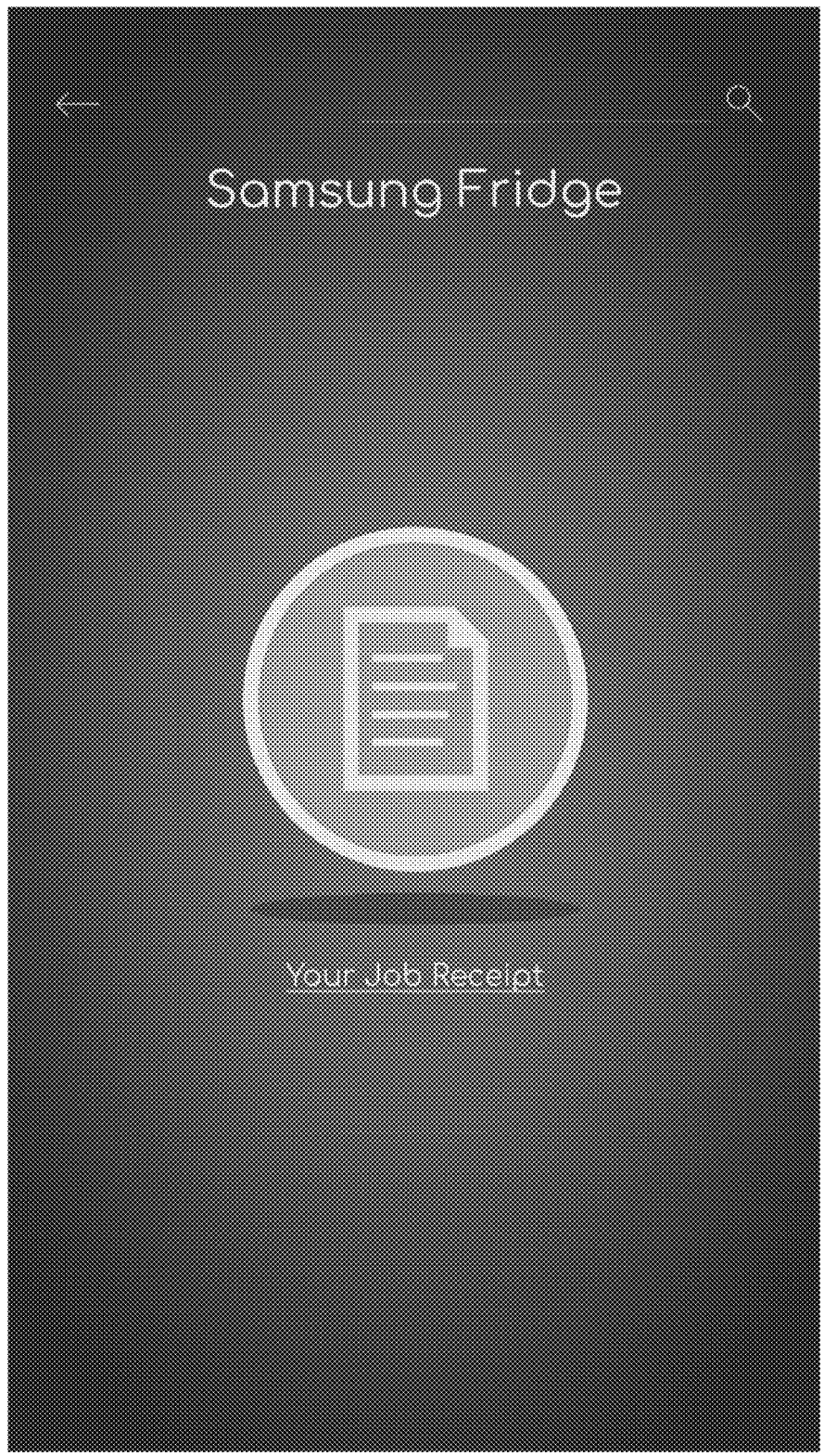
FIG. 25 illustrates a receipt that may be provided to a user once maintenance is performed in accordance with some embodiments.

Often times, the service requirement may be covered by a warranty claim. In which case, the platform may be enabled to forward the warranty claim to, for example, a builder or manufacturer, that may render a decision on the warranty and assign a contractor, through their respective user interface with the platform. Sometimes, however, the warranty claim may be declined and a reason may be provided to a homeowner. FIG. 23 illustrates this scenario and enables the homeowner to manage the claim directly with a sub-contractor. FIG. 24 illustrates an example of a job request that may be provided by a homeowner through the platform. Once maintenance is performed, a receipt may be provided to a user, as illustrated in FIG. 25.

Figure 26:
FIG. 26 illustrates appliance data that may be associated with the homeowner's accommodation in accordance with some embodiments.
Figure 27:
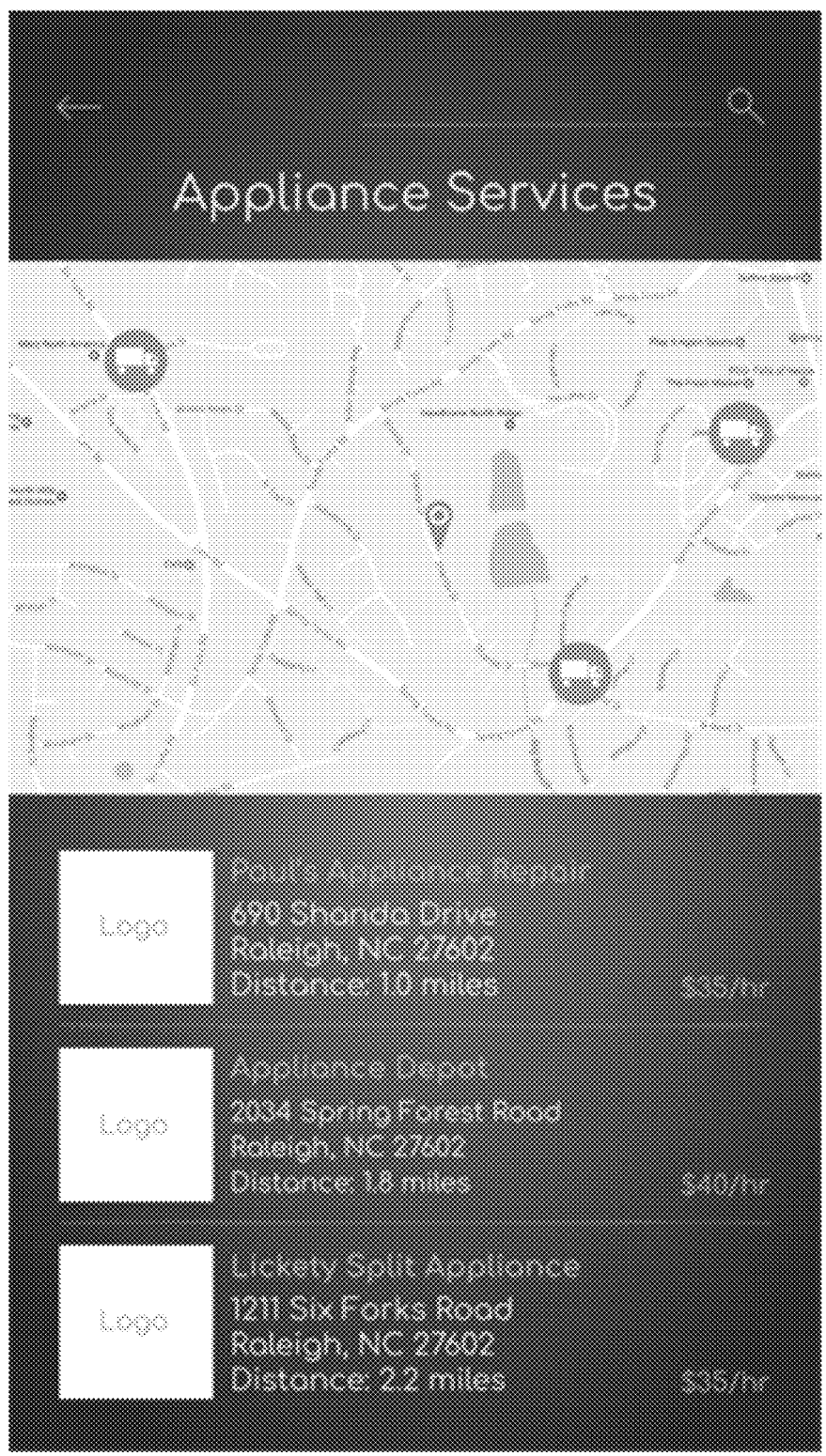
FIG. 27 illustrates a listing of service professionals that may be qualified to work on the appliance type in accordance with some embodiments.

The platform may further be configured to store asset data associated with the homeowner's accommodation. The data may comprise, but not be limited to, for example, Appliance data, as shown in FIG. 26. For each appliance type, the platform may provide a listing of service professionals that may be qualified to work on the appliance type, as shown in FIG. 27. Such service professionals may be listed based on, for example, but not limited to, certain licenses and certifications associated with working with the various assets tracked on the platform.

Figure 28:
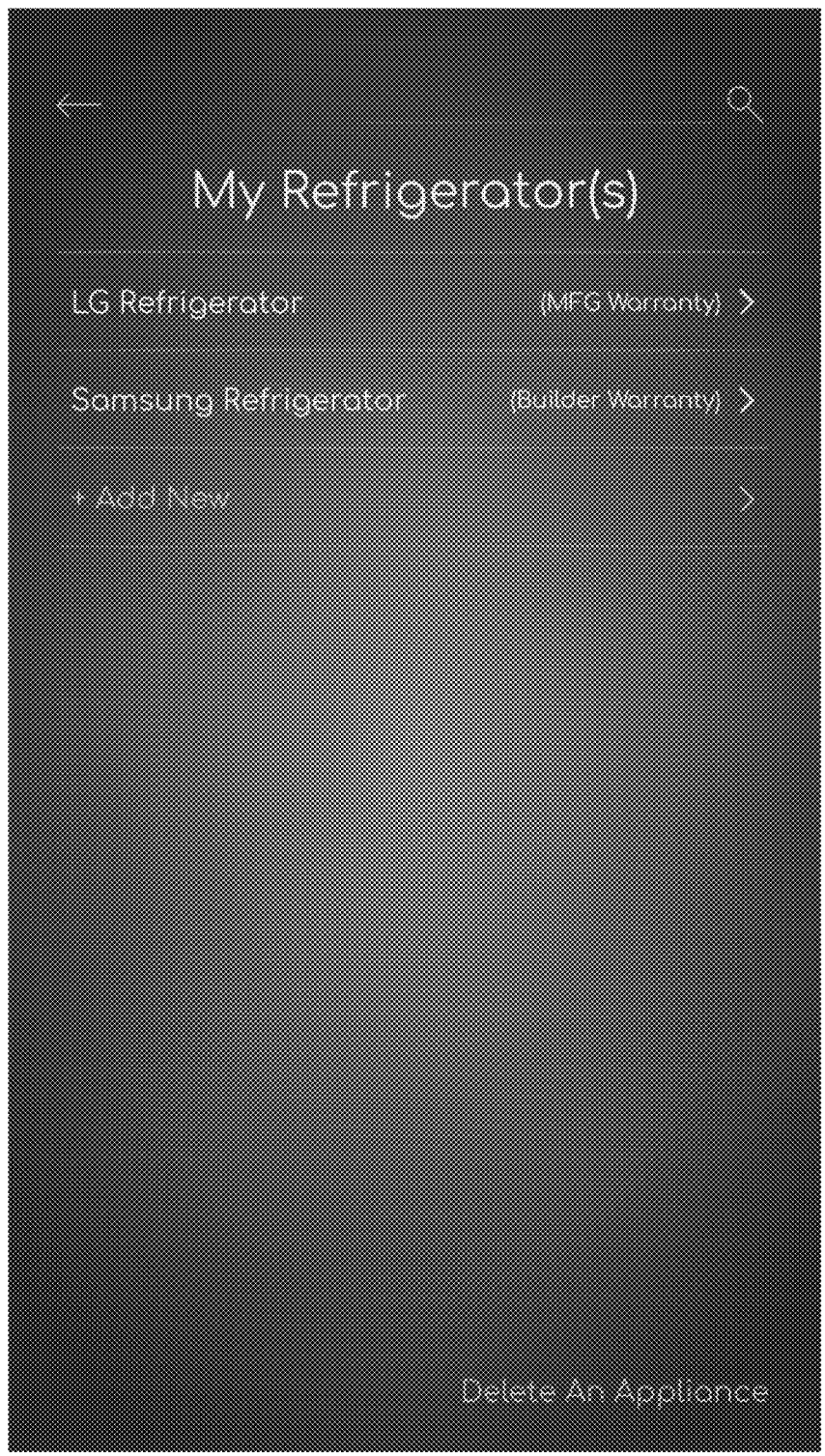
FIG. 28 illustrates one type of appliance data for a refrigerator in accordance with some embodiments.
Figure 29:
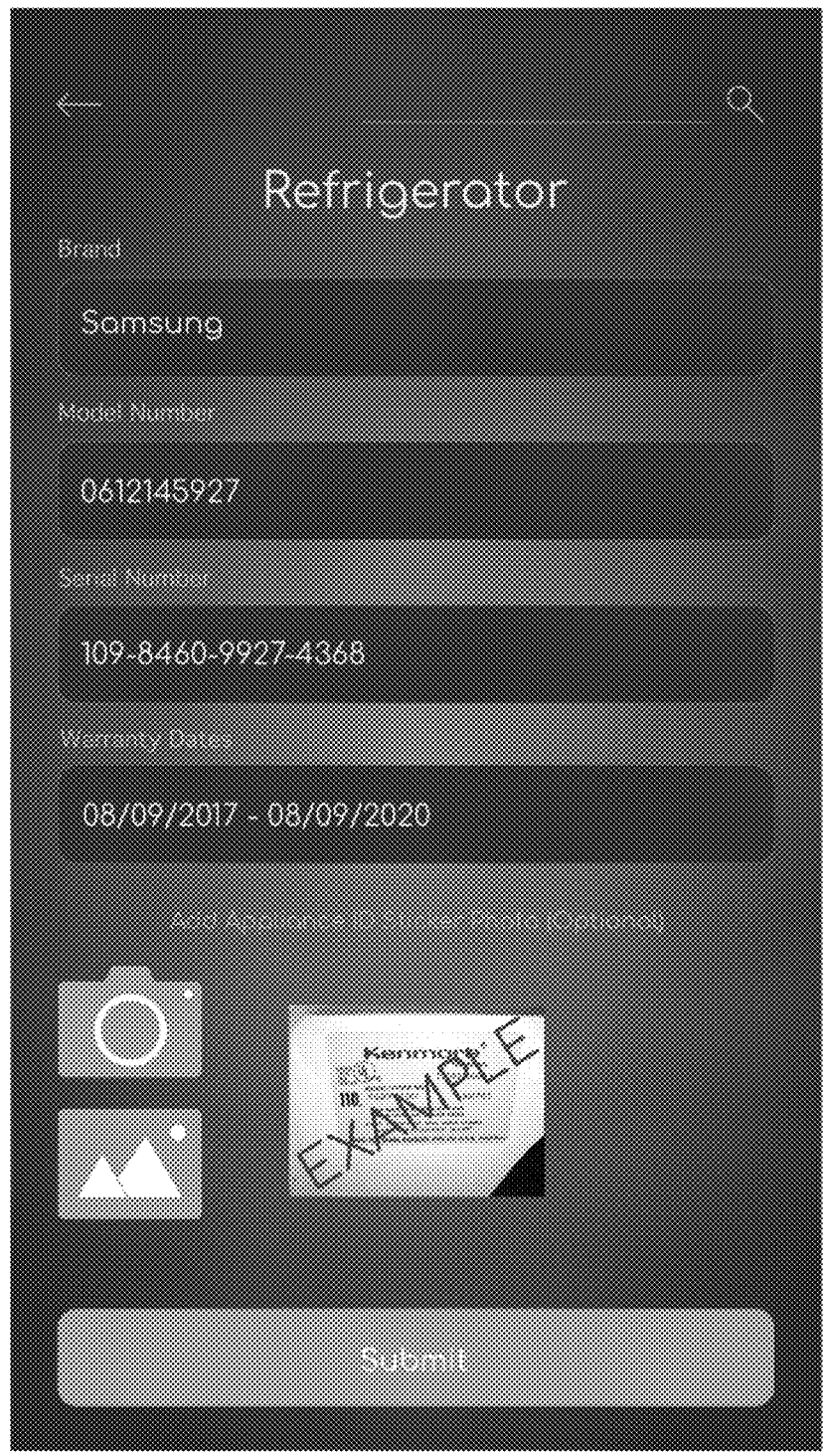
FIG. 29 illustrates further details associated with the appliance in accordance with some embodiments.
Figure 30:
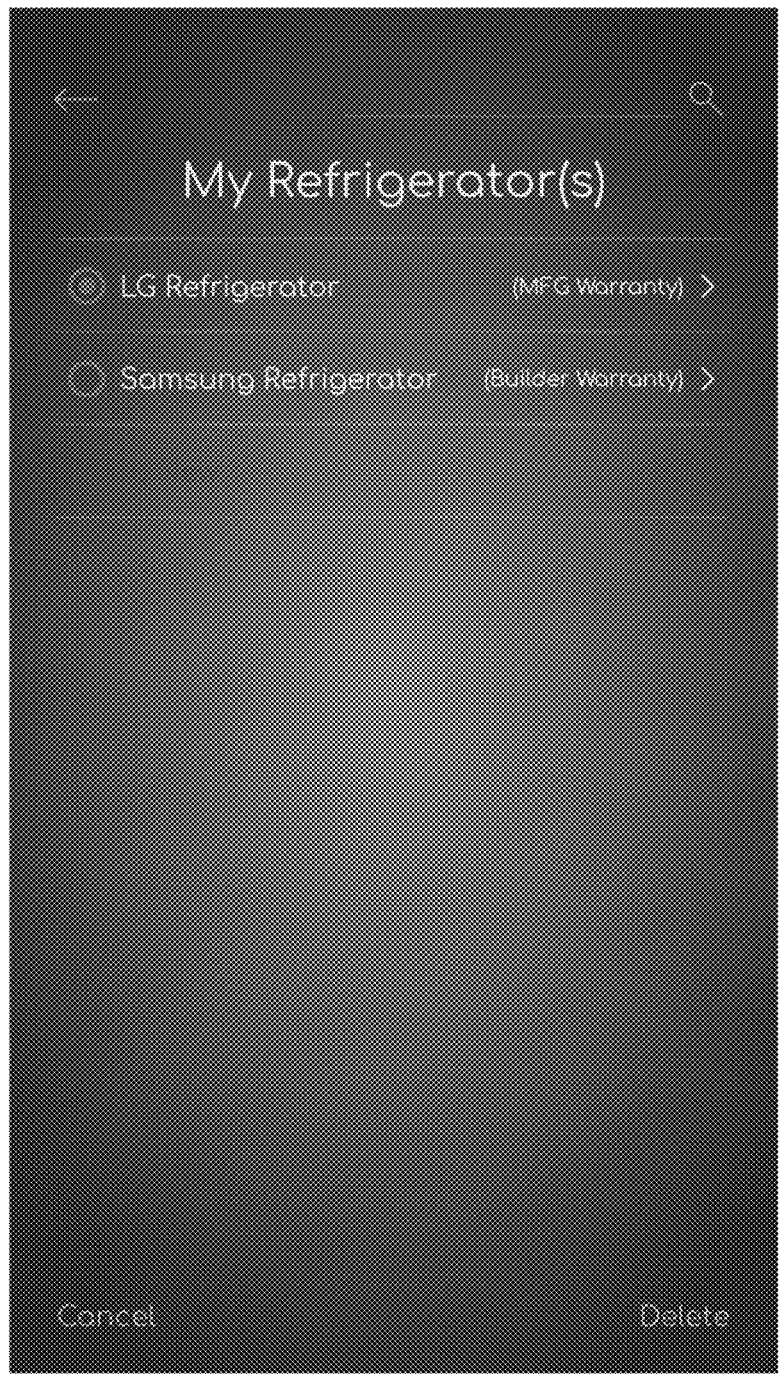
FIG. 30 illustrates adding or removing details associated with an appliance in accordance with some embodiments.
Figure 31:
FIG. 31 illustrates modifying details associated with an appliance in accordance with some embodiments.

Appliance data may include, for example, refrigerator data, as illustrated in FIG. 28, and details associated with the appliance, as illustrated in FIG. 29. The user may add asset data or modify existing asset data, as illustrated in FIGS. 30-31. The user may select an asset and request service for an asset. In turn, the request may be forwarded to, for example, a builder, a plurality of sub-contractors that may bid on the service, or a listing of qualified professionals.

Figure 32:
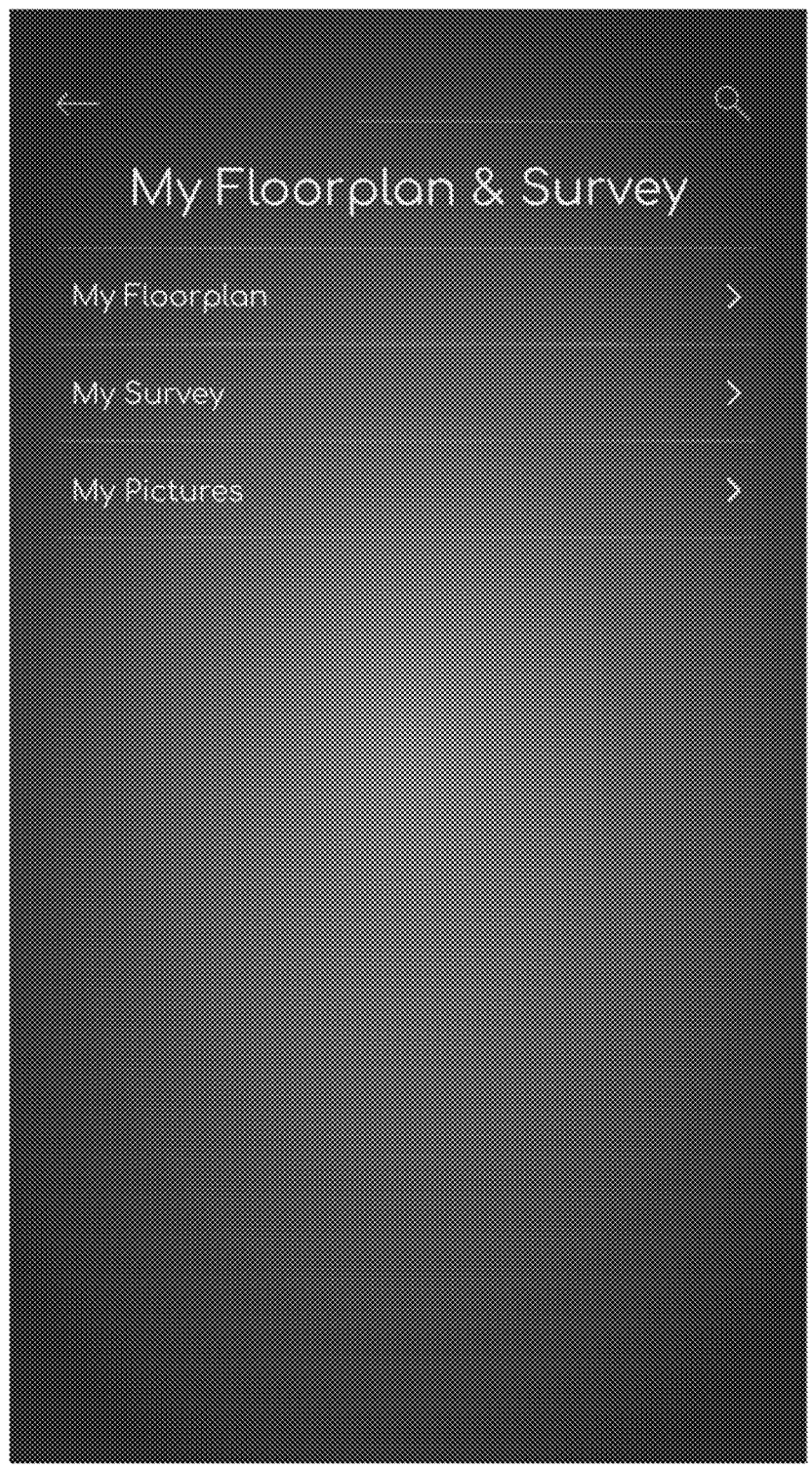
FIG. 32 illustrates certain homeowner options consistent with embodiments of the present disclosure in accordance with some embodiments.
Figure 33:
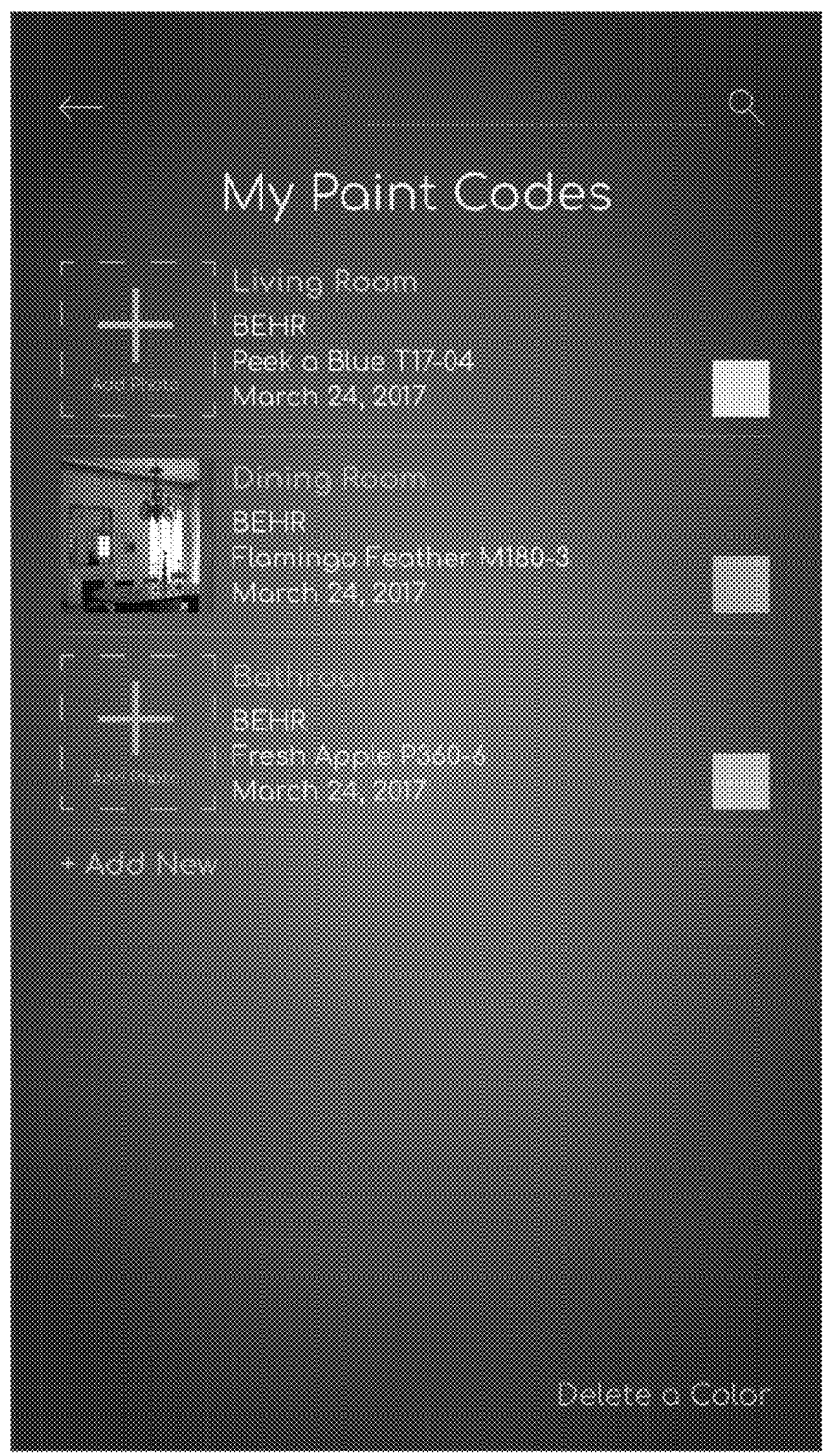
FIG. 33 illustrates paint codes for different assets in accordance with some embodiments.
Figure 34:
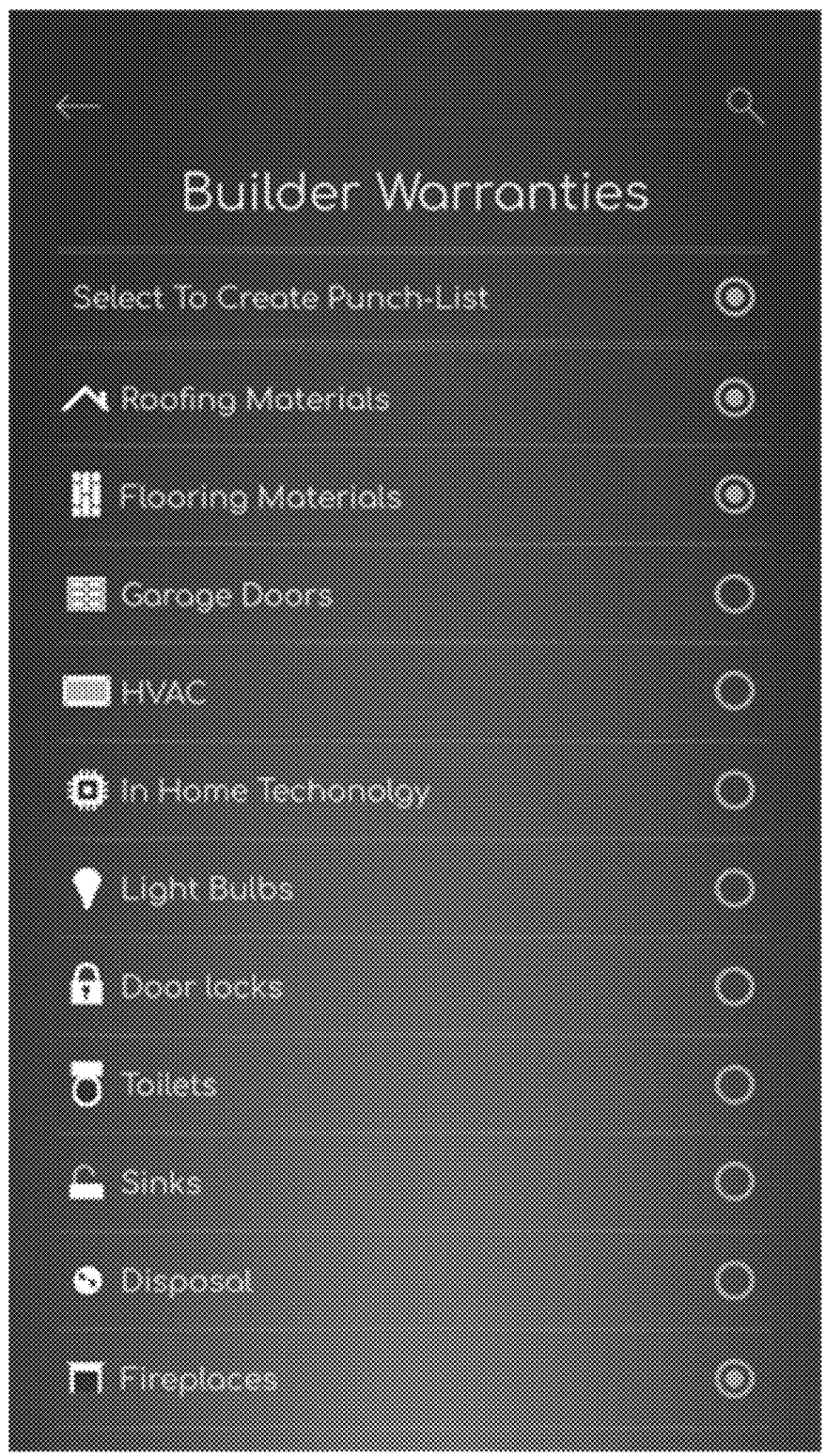
FIG. 34 illustrates the platform enabling a user to create a punch list of items for when a list of multiple service requests needs to be submitted at one time in accordance with some embodiments.

FIG. 32 illustrates certain homeowner options consistent with embodiments of the present disclosure. For example, the homeowner may be enabled to keep floorplans, surveys, pictures, and another data associated with their accommodation. Asset data may further include, for example, paint codes as illustrated in FIG. 33. As illustrated in FIG. 34, the platform may also enable a user to create a punch list of items for when a list of multiple service requests needs to be submitted at one time. Then they can be acted upon and scheduled inside the platform in accordance to the embodiments disclosed herein.

In some embodiments, asset data may be inputted by, for example, a builder associated with the accommodation during, for example, construction of the accommodation. The data may, in turn, be provided to relevant sub-contractors associated with requests made by the homeowner through the platform.

Figure 35:
FIG. 35 illustrates one example of how the user may track homes in accordance with some embodiments.
Figure 36:
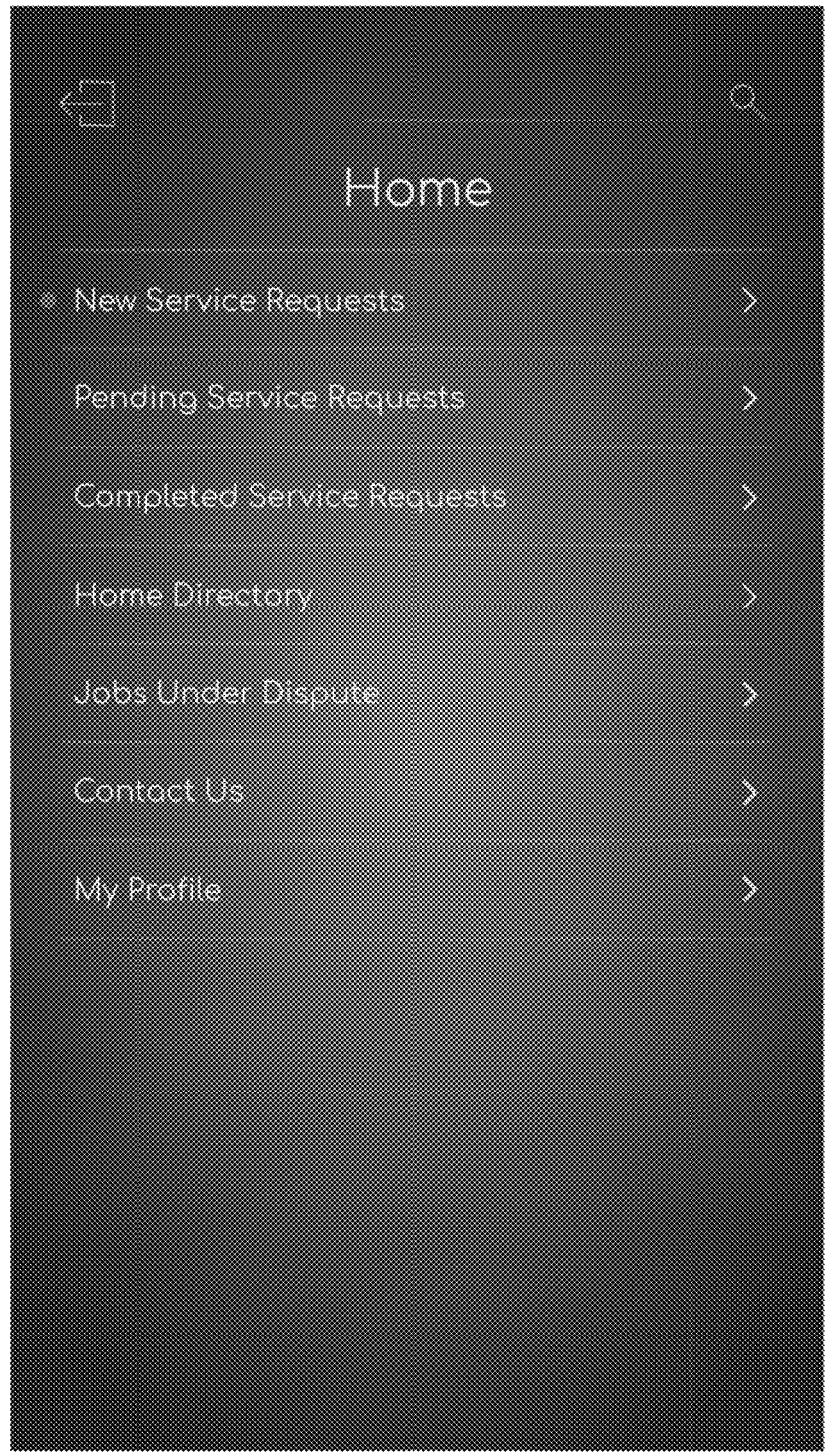
FIG. 36 illustrates an interface for managing each property in accordance with some embodiments.
Figure 37:
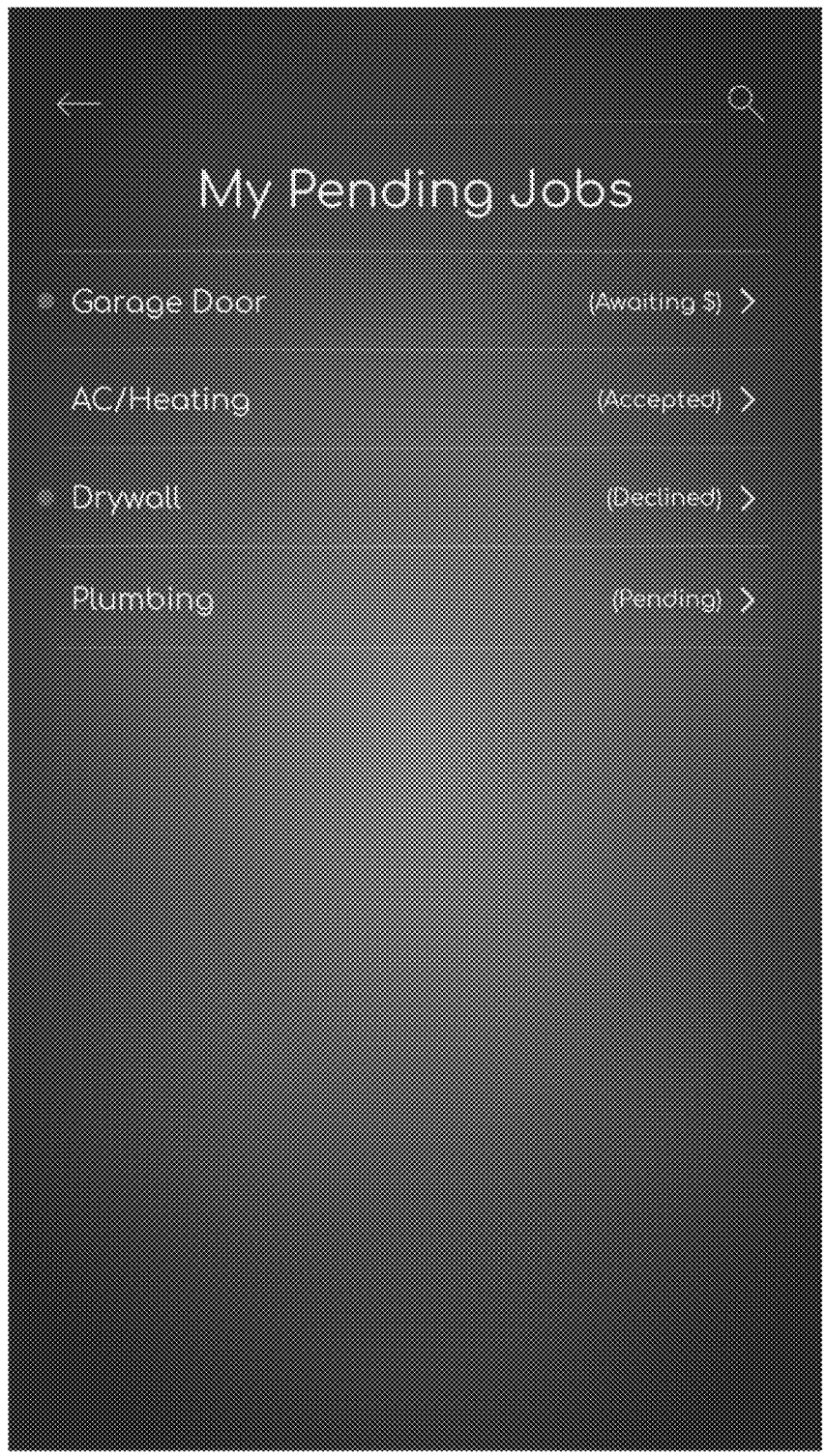
FIG. 37 illustrates an interface for the user to track pending jobs for each home in accordance with some embodiments.

The platform may enable a user to manage a plurality of premises/accommodations associated with the user. FIG. 35 shows one example of how the user may track homes, and an interface such as, but not limited to, the illustrative interface in FIG. 36 for managing each property may be provided. In turn, the platform may enable the user to track pending jobs for each home, as shown in FIG. 37.

Figure 38:
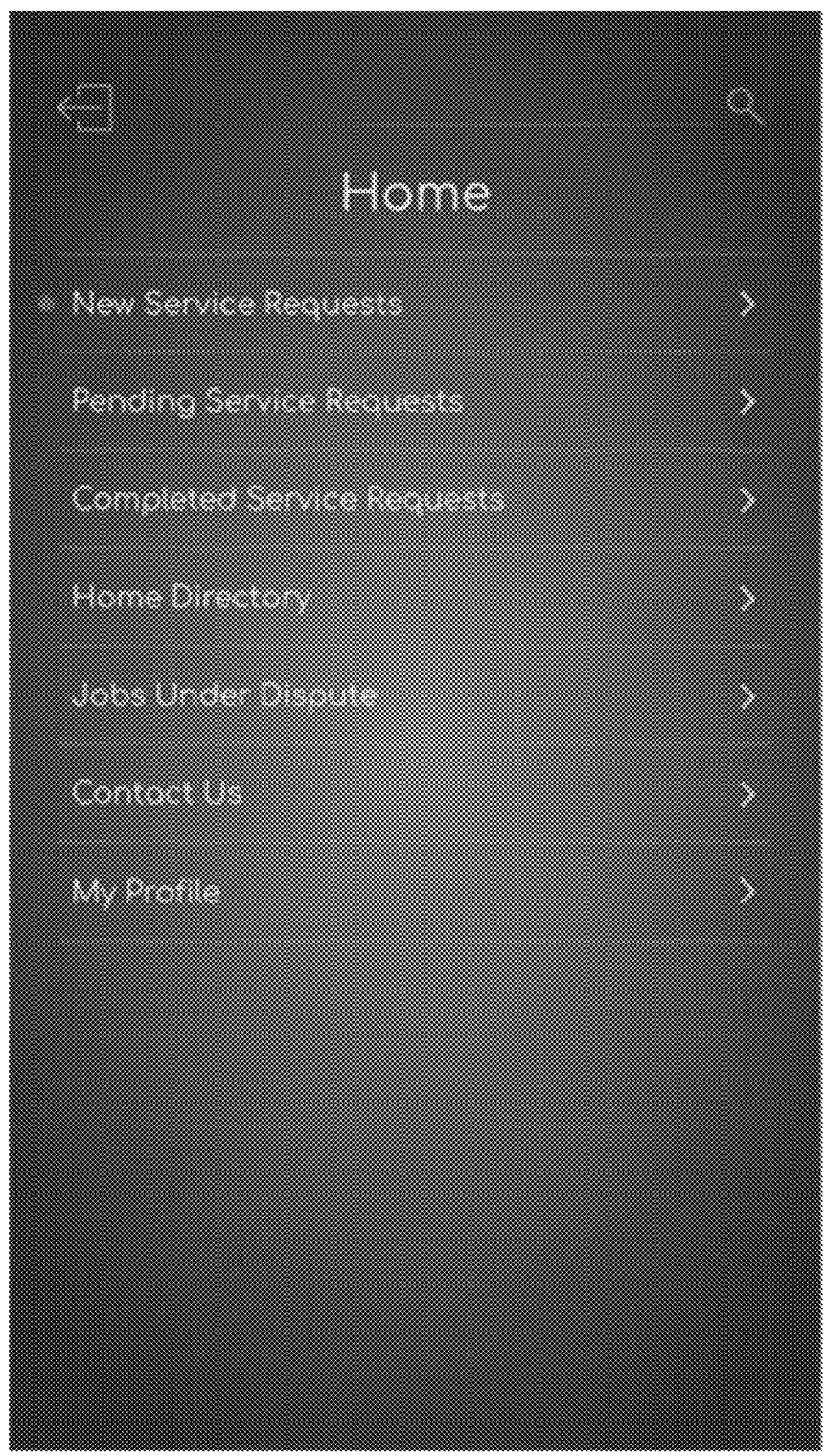
FIG. 38 depict an interface for a service professional or contractor in accordance with some embodiments.
Figure 39:
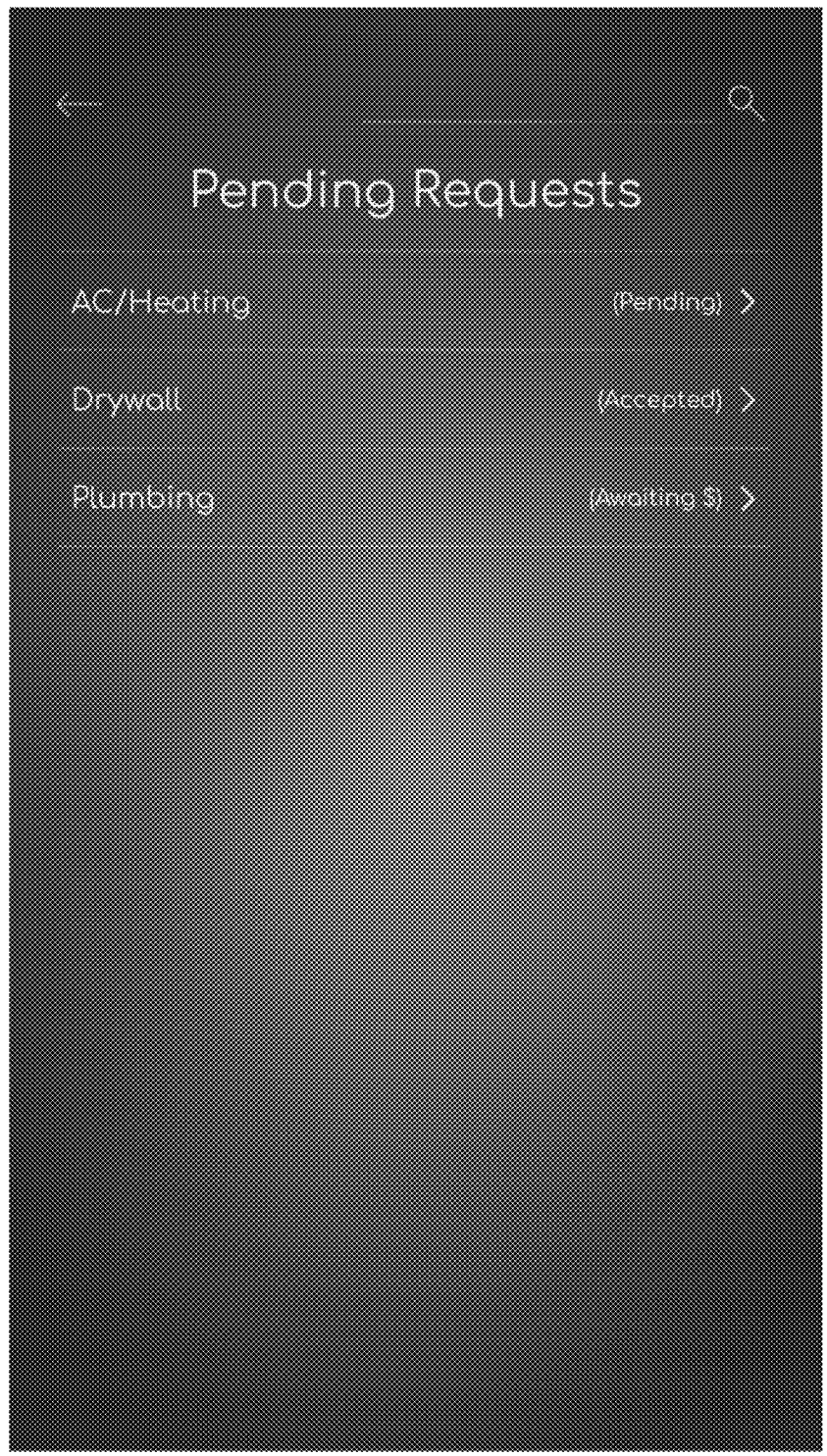
FIG. 39 illustrates an interface for the user to track pending requests for a service professional or contractor in accordance with some embodiments.
Figure 40:
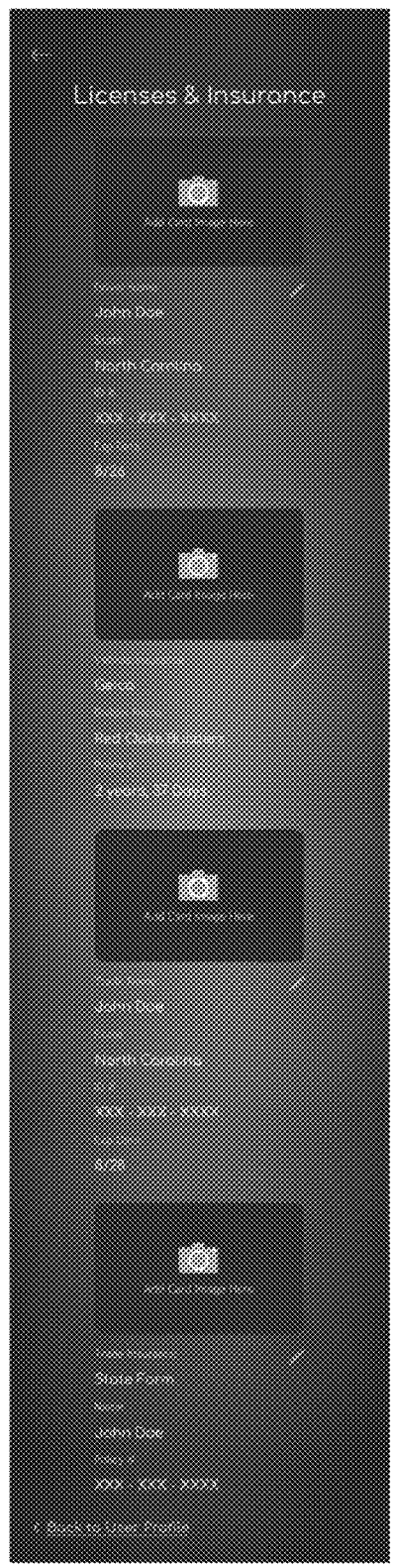
FIG. 40 illustrates an interface for the user to track pending requests for a service professional or contractor in accordance with some embodiments.
Figure 41:
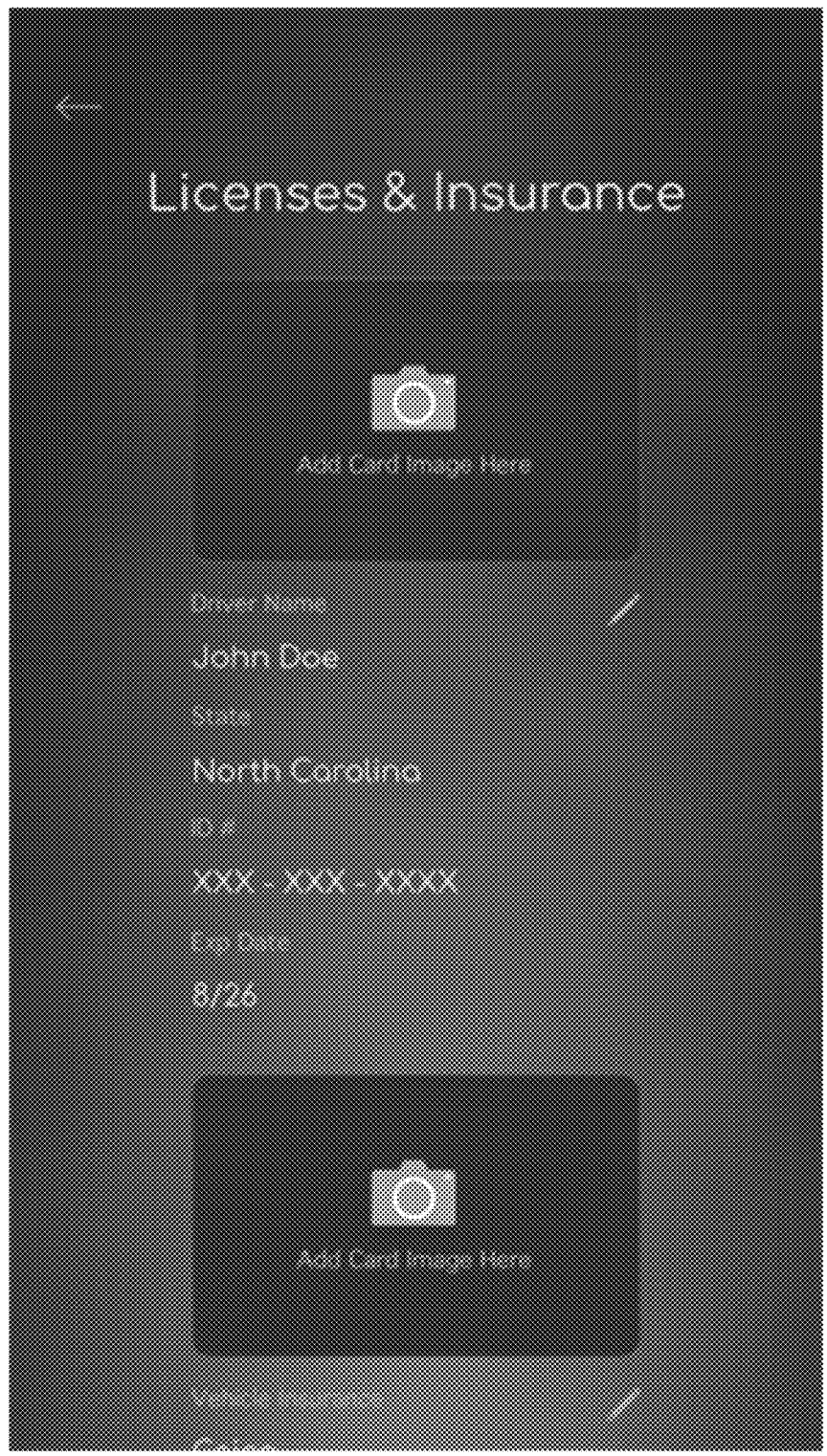
FIG. 41 illustrates an interface for service professionals to add their licenses and insurance credentials to track their professional credentials on the platform in accordance with some embodiments.
Figure 42:
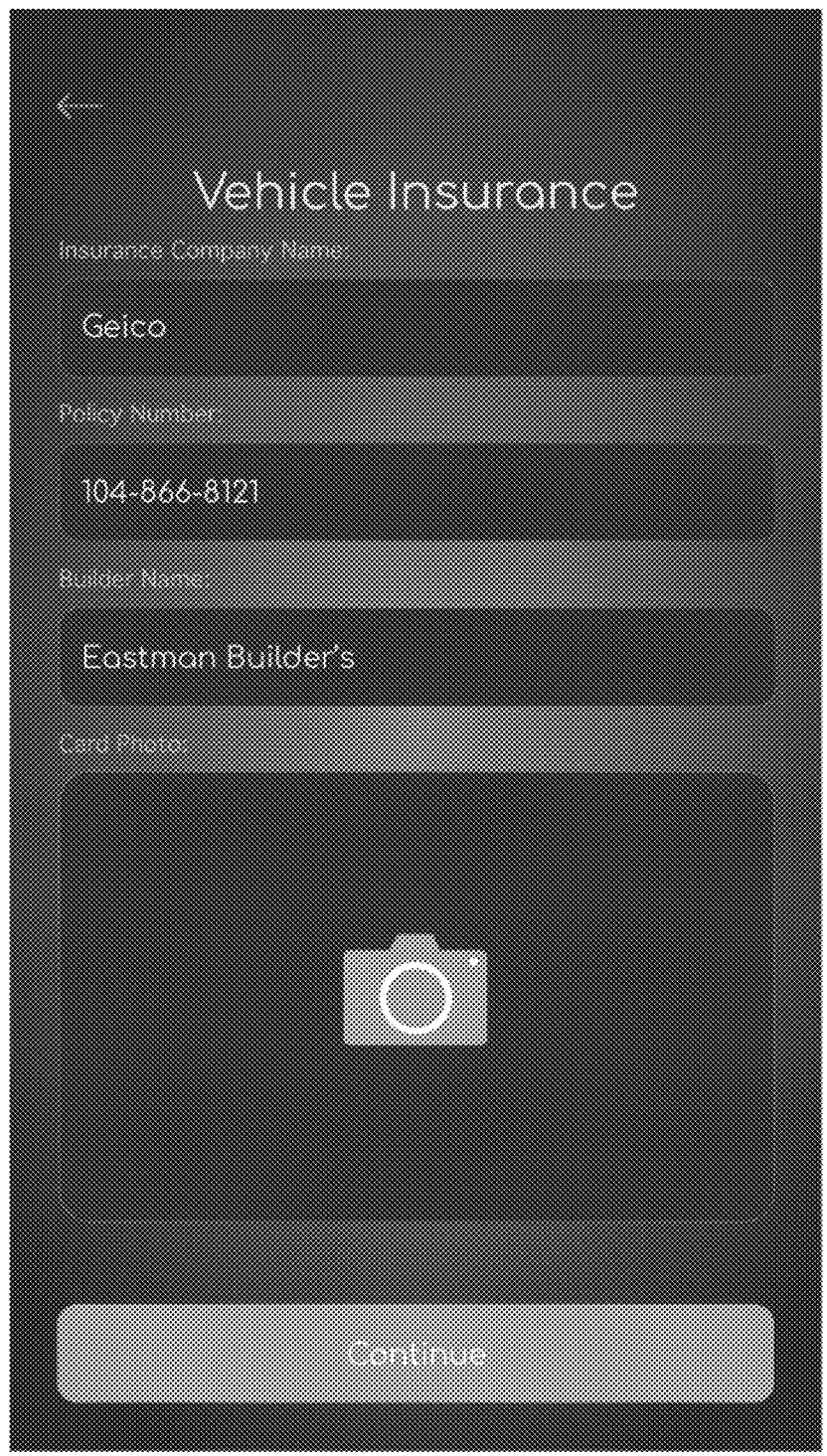
FIG. 42 illustrates an interface for service professionals to add their vehicle insurance to track their professional credentials on the platform in accordance with some embodiments.

A service professional or contractor may be provided with a similar interface for managing service requests as shown in FIGS. 38-39. In addition, as shown in FIGS. 40-42, the service professional may be provided with an interface to track their professional credentials, such as licenses, insurances, and registrations. The expiration dates and validated of the licenses may be tracked by the platform, with reminders to update when required. In some embodiments, back-end connections to various official databases for validation and authentication may be provided. Other users of the platform, such as general contractors and homeowners, may view and verify the service professionals ID and licenses before engaging in activities with the service professional.

Figure 43:
FIG. 43 illustrates an interface that may be provided to a service professional when electing to accept a job in accordance with some embodiments.
Figure 44:
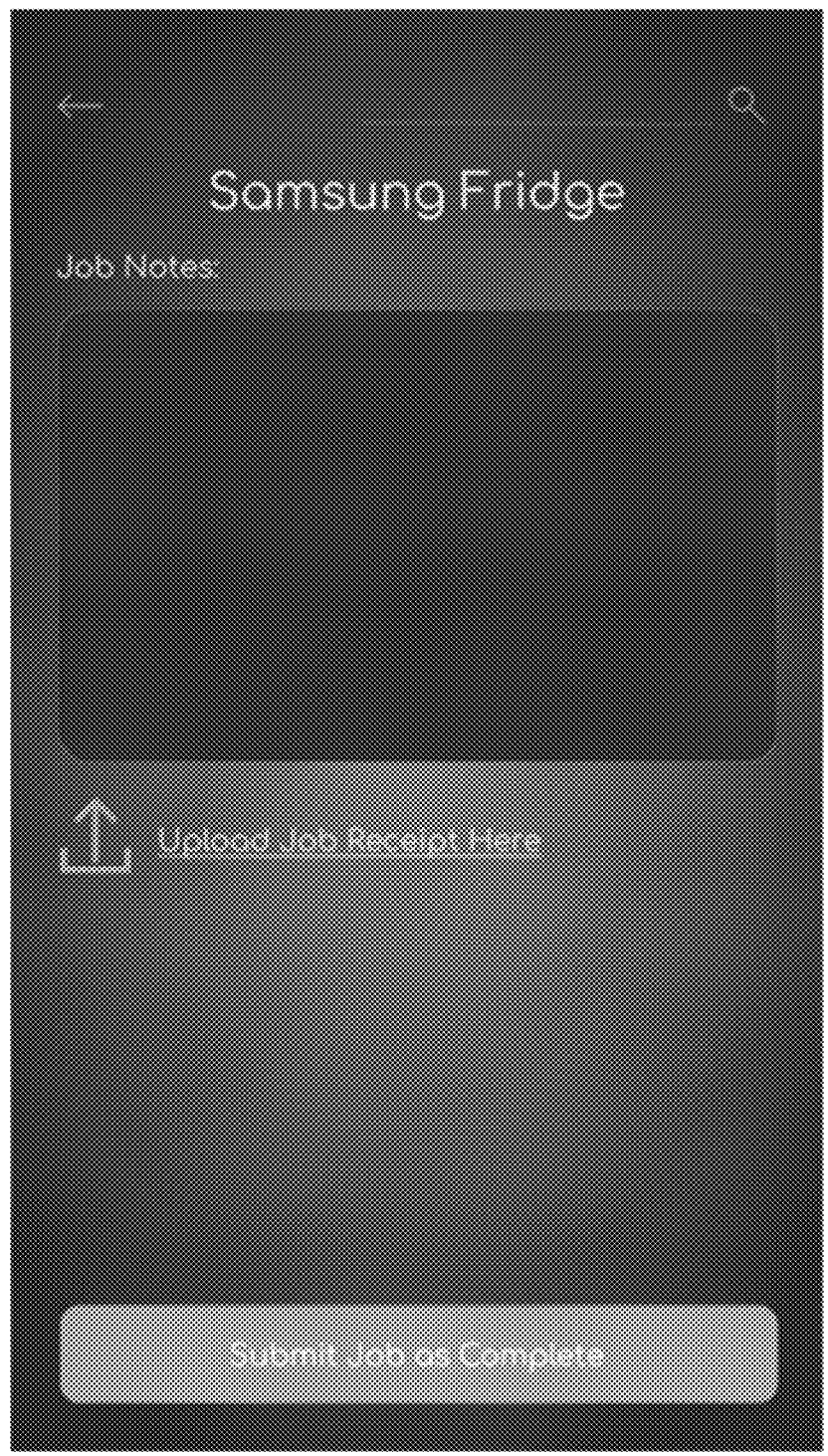
FIG. 44 illustrates an interface for a service professional to track notes associated with the assets they are working on in accordance with some embodiments.
Figure 45:
FIG. 45 illustrates an interface for a service professional to add appliance data to a homeowner's accommodation profile in accordance with some embodiments.
Figure 52:
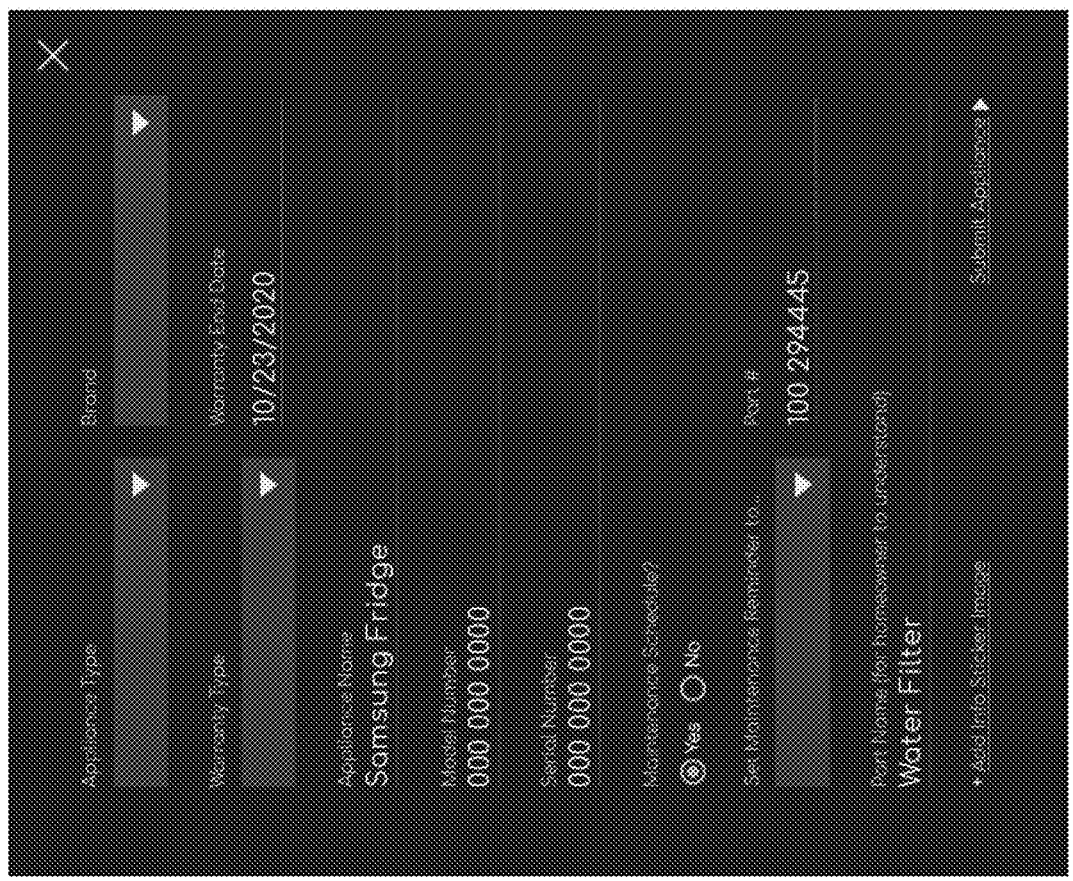
FIG. 52 depicts a job input interface for a platform administrator inspect asset data for each job in accordance with some embodiments.

FIG. 43 illustrates an interface that may be provided to a service professional when electing to accept a job. As the service professional works on a job, they may track notes associated with the assets they are working on, as illustrated in FIG. 44. These notes may in turn be tracked and stored along with the asset data in the homeowner's profile, available for review by the homeowner, builder, and subsequent contractors. In some embodiments the service profession (or builder) may be enabled to add appliance data to a homeowner's accommodation profile as shown in FIG. 45 and FIG. 52. Through here, the platform may enable the setting or retrieving of a recommended maintenance schedule, ordering of parts, and in some embodiments, communicate with smart home appliances that may be enabled to connect to the platform.

Figure 46:
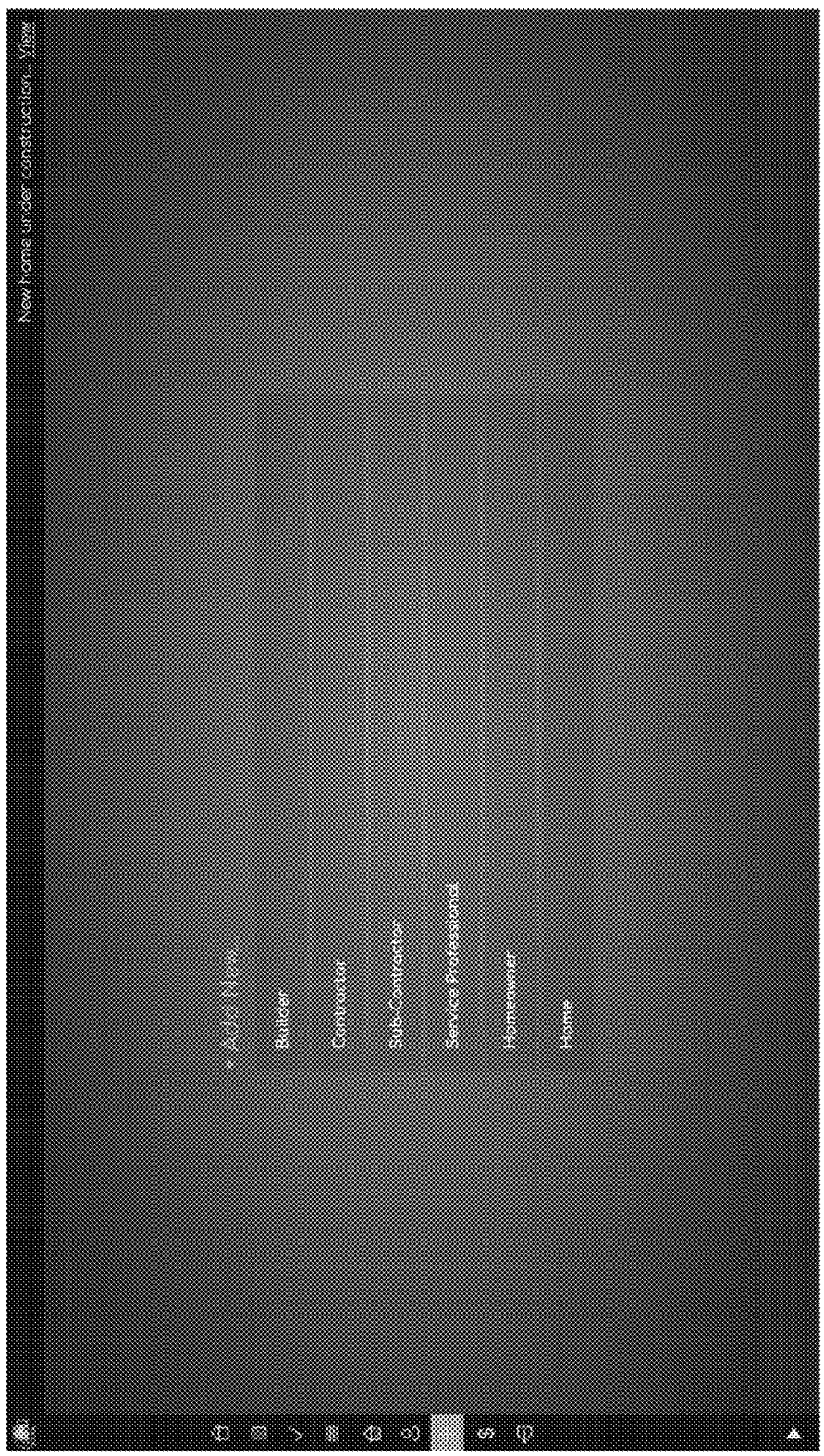
FIG. 46 illustrates an interface that may enable an administrative platform user to perform such actions and the administrative user may track each user in accordance with some embodiments.
Figure 47:
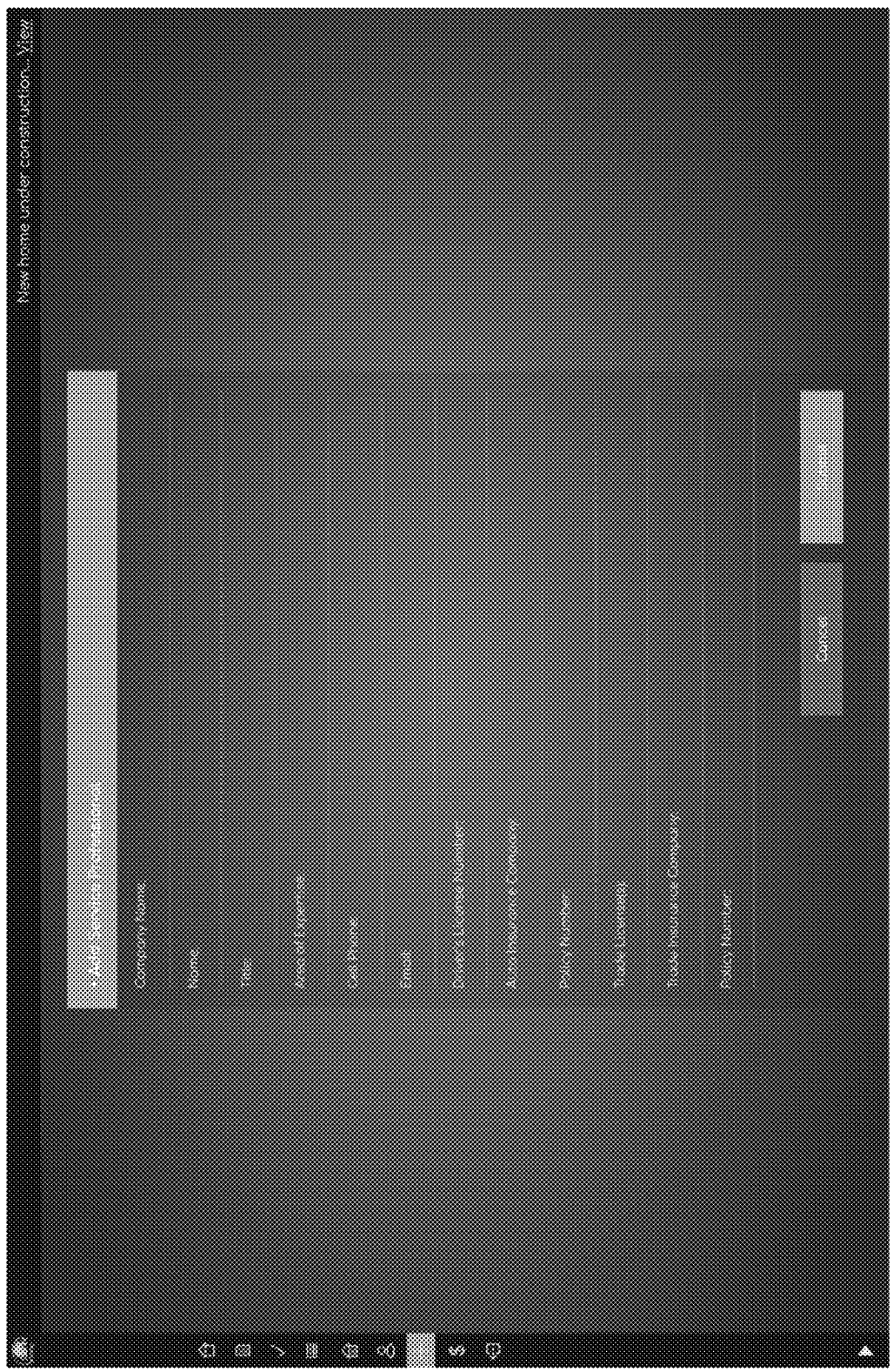
FIG. 47 depicts an interface for a builder to add contact information to the platform for service providers in accordance with some embodiments.
Figure 48:
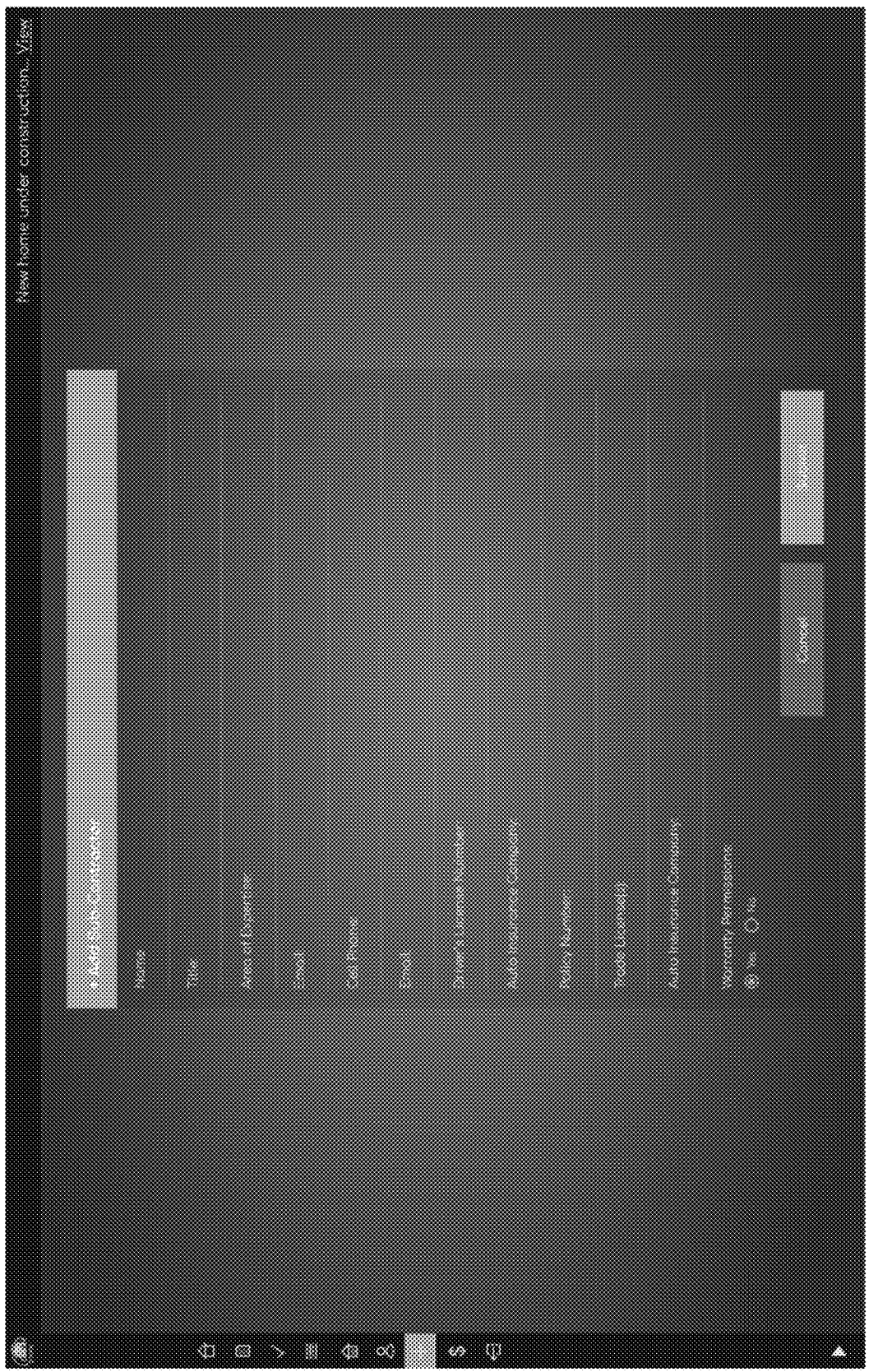
FIG. 48 depicts an interface for a builder to add contact information to the platform for Sub-Contractors in accordance with some embodiments.
Figure 49:
FIG. 49 depicts a directory for a builder to look up contact information on the platform in accordance with some embodiments.
Figure 50:
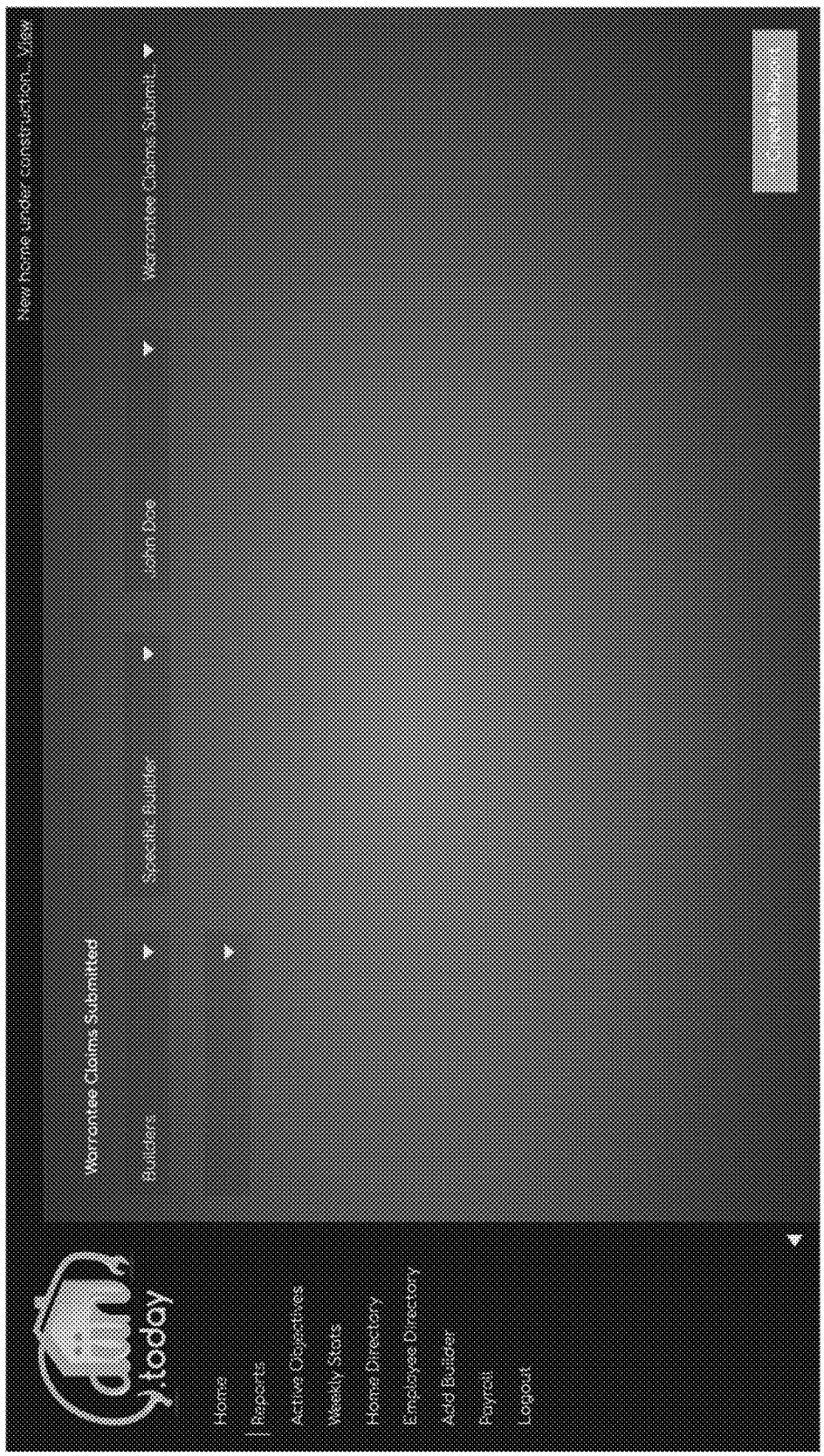
FIG. 50 depicts an interface wherein each user type may be provisioned with a permissioned access to the platform to enable and facilitate interaction over, for example, service requests and warranty claims in accordance with some embodiments.
Figure 51:
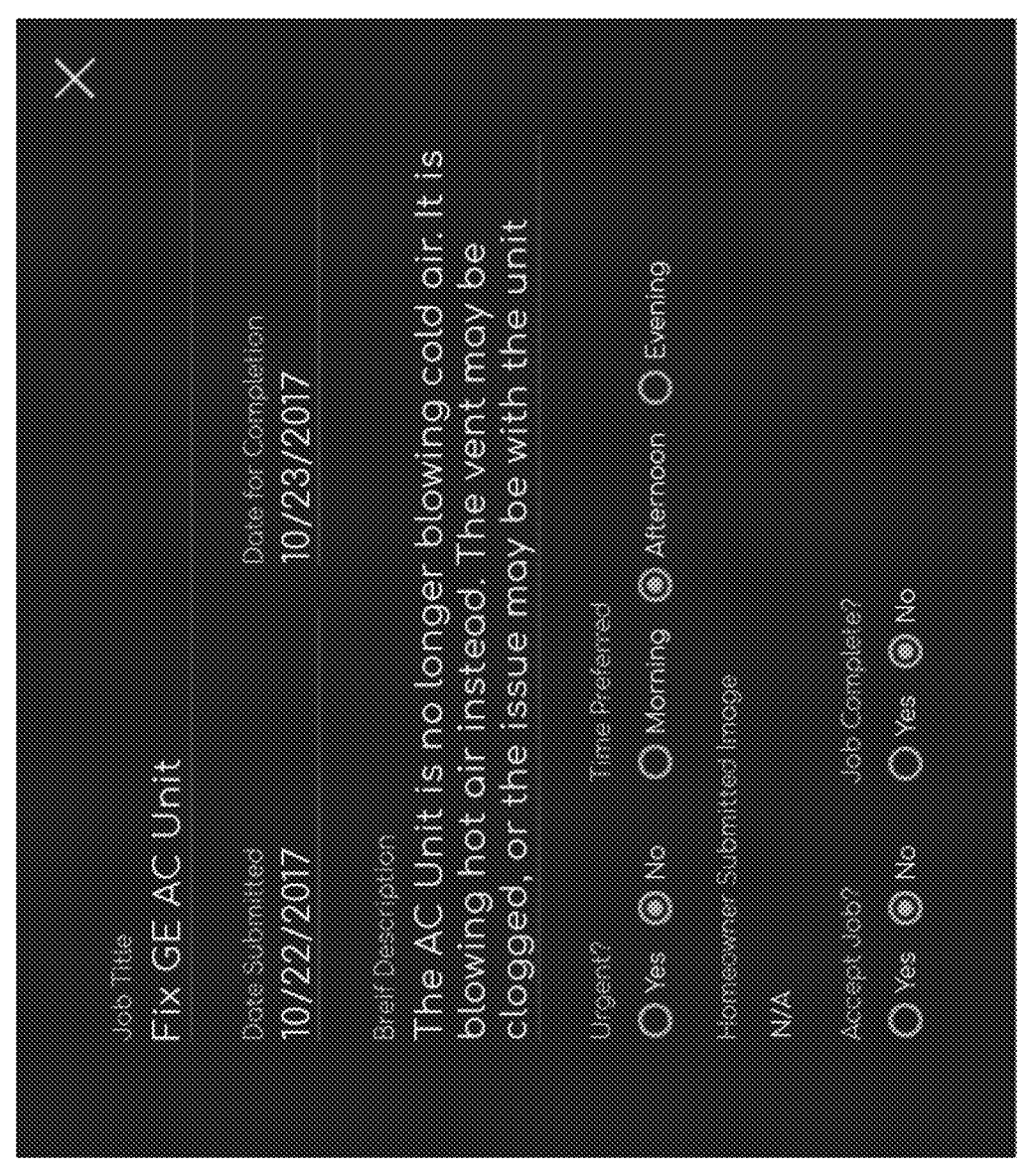

The platform may enable the specification and coordination of several actors, such as, for example, a builder, contractor, sub-contractor, service professional, homeowner, or a property. FIG. 46-48 illustrates an interface that may enable an administrative platform user to perform such actions and the admirative user may track each user as shown in FIG. 49. Each user type may be provisioned with a permissioned access to the platform to enable and facilitate interaction over, for example, service requests and warranty claims, as shown in FIG. 50. Moreover, the platform administrator may have detailed insight into each job and asset associated with the various accommodations, as shown in FIGS. 51-52. The insights may be further broken into active homes, and active builders that are currently active on a job.

Figure 53:
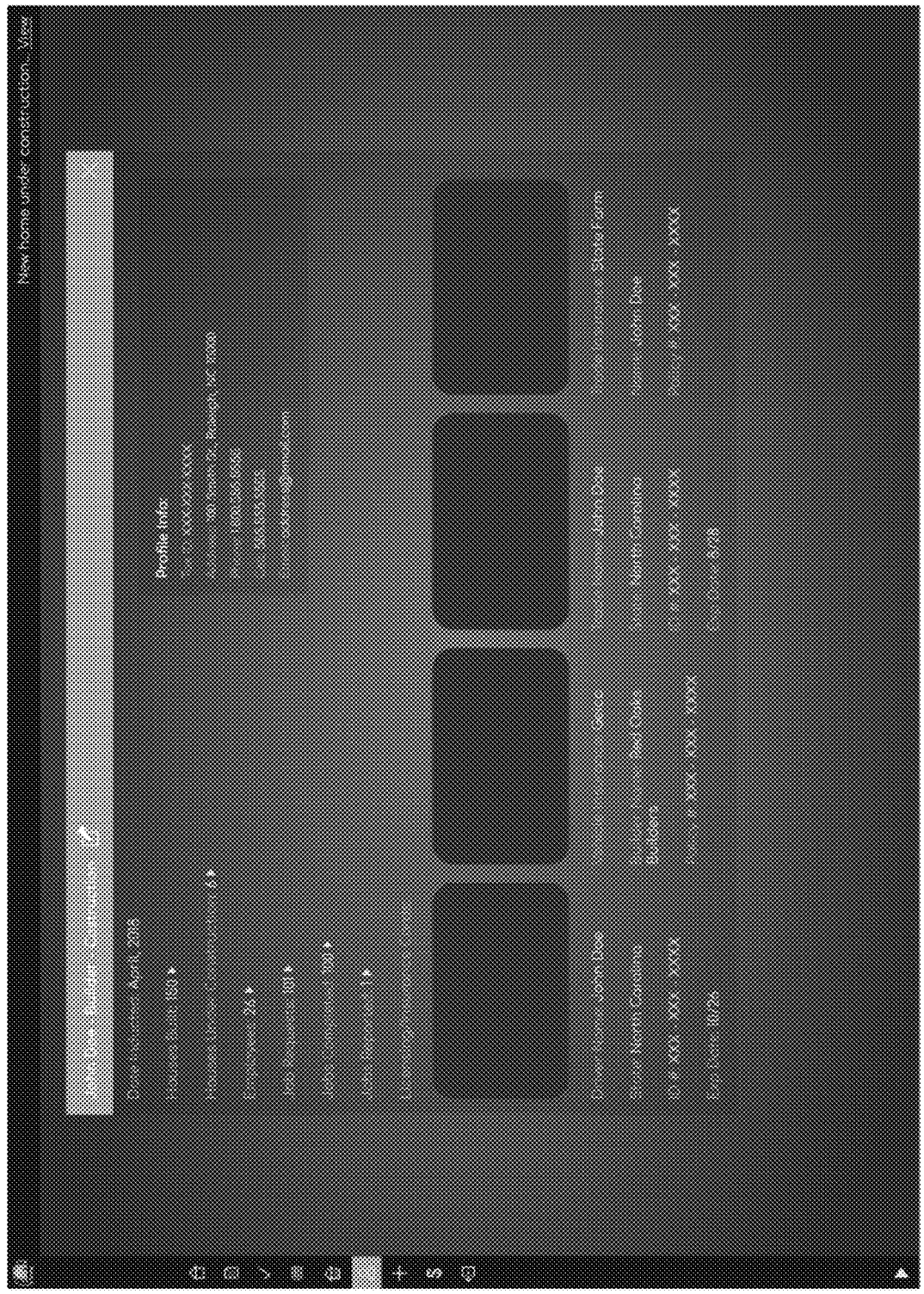
FIG. 53 depict an interface displaying insights further broken into active homes, and active builders that are currently active on a job in accordance with some embodiments.
Figure 54:
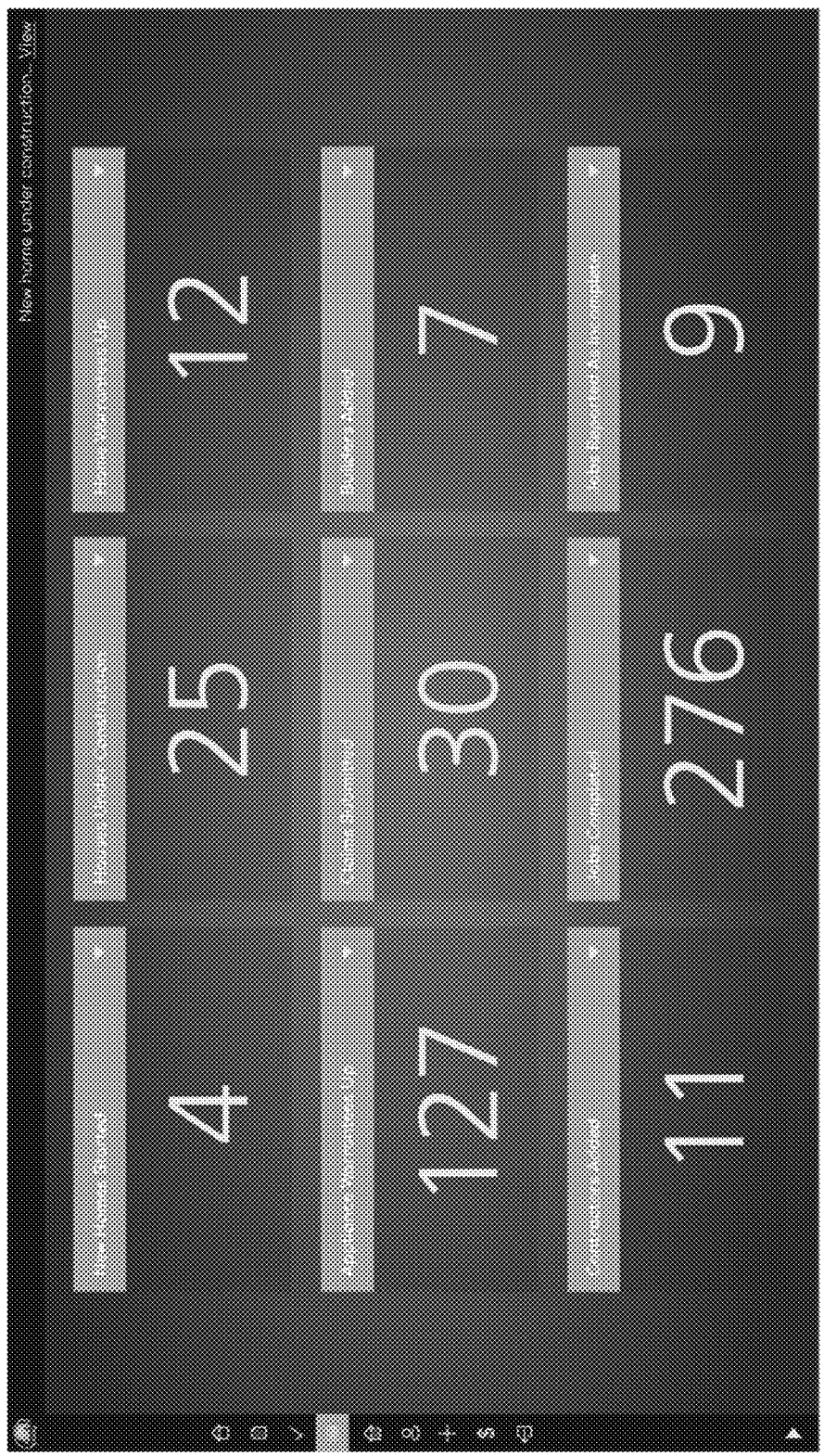
FIG. 54 depict a platform overview interface for a builder to see all information about a specific project on the platform in accordance with some embodiments.
Figure 55:
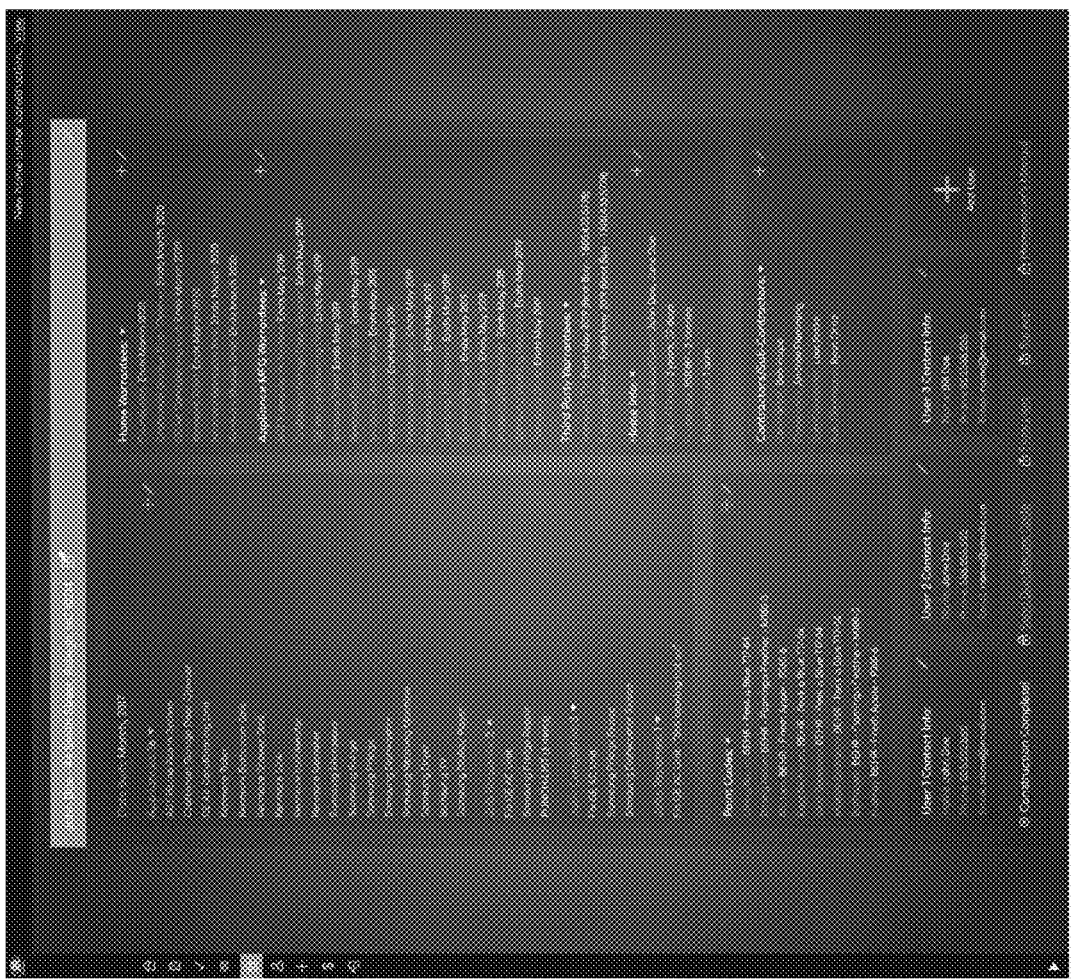
Figure 56:
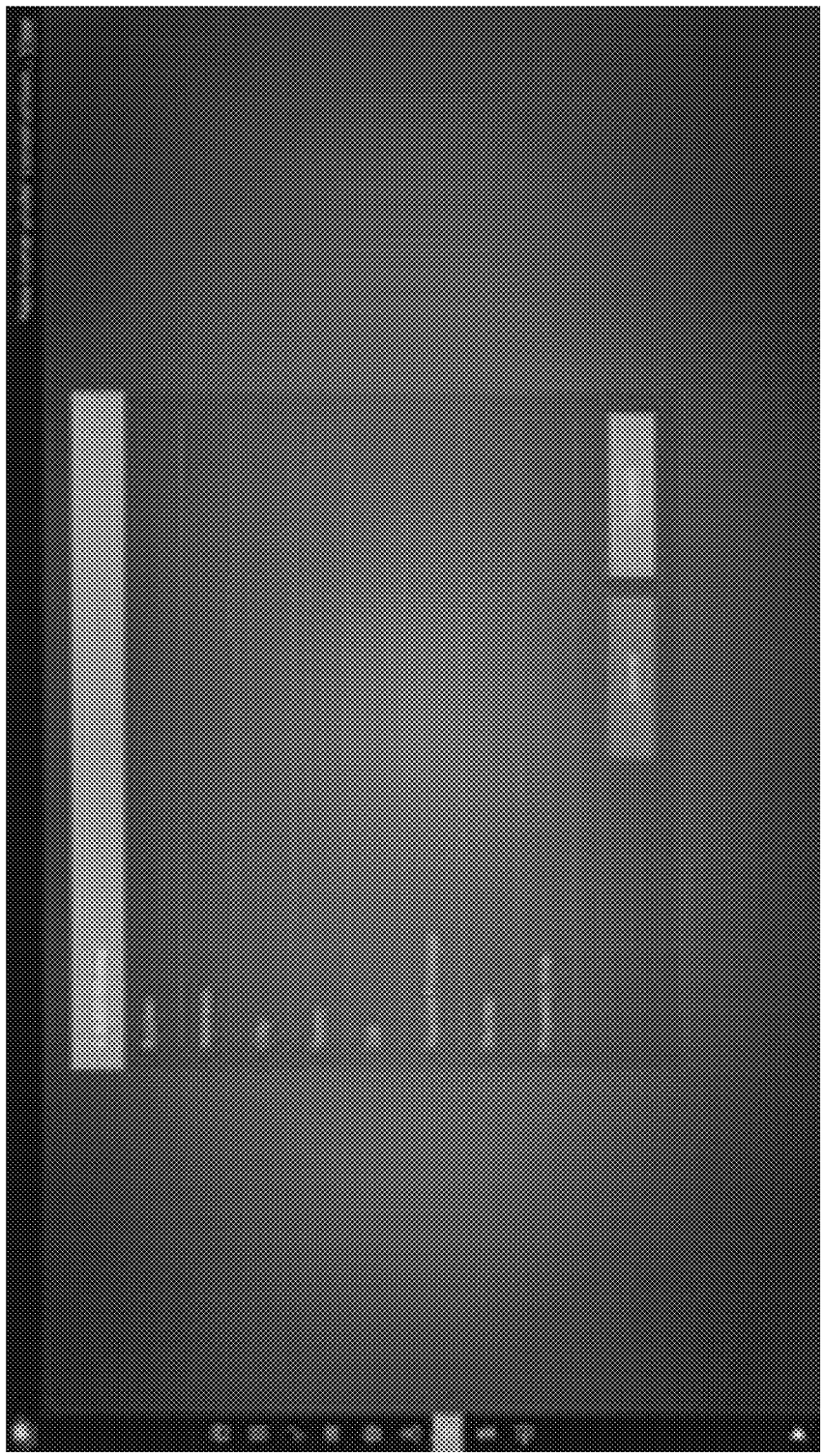
Figure 57:
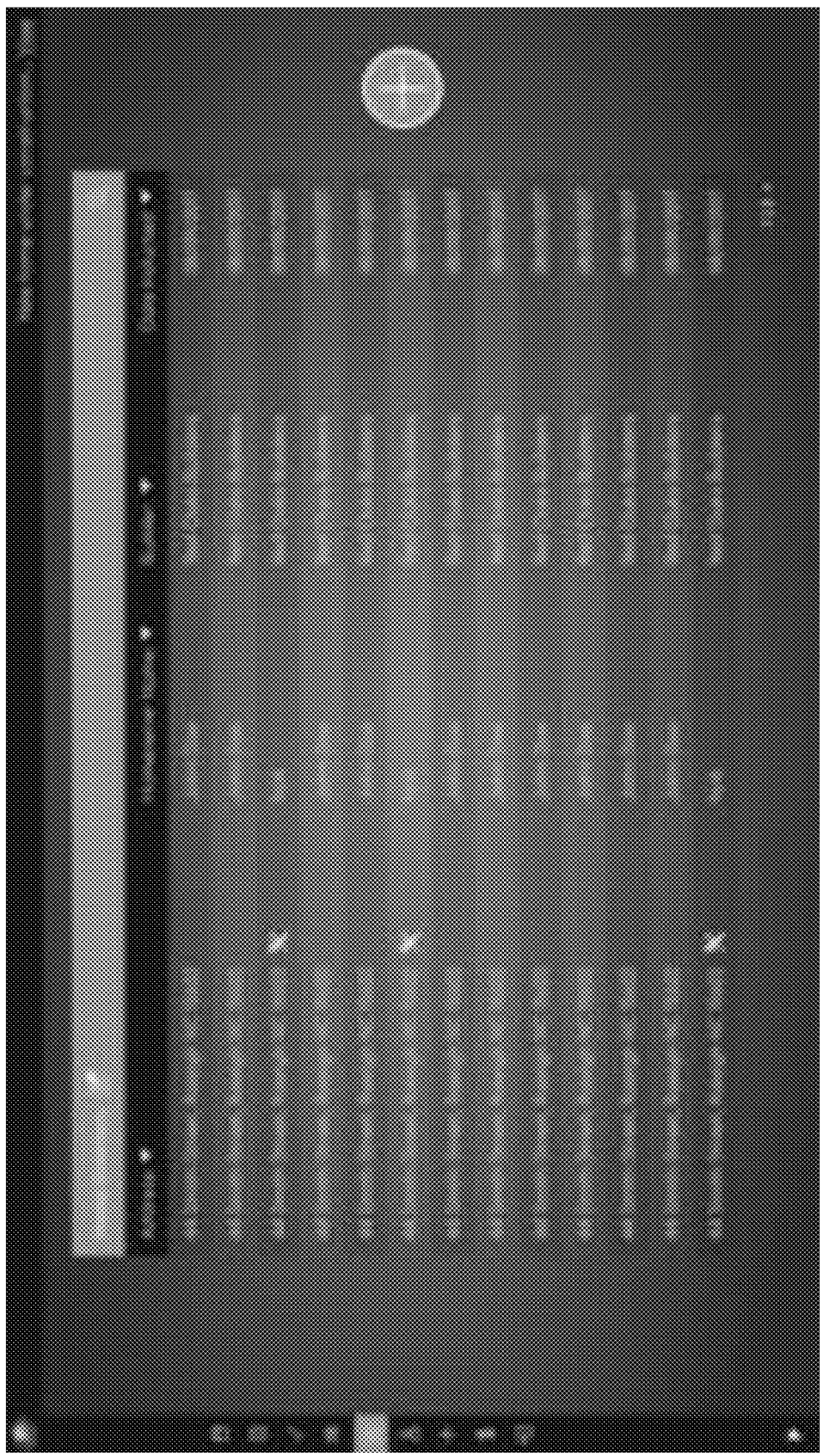
Figure 58:
Figure 59:
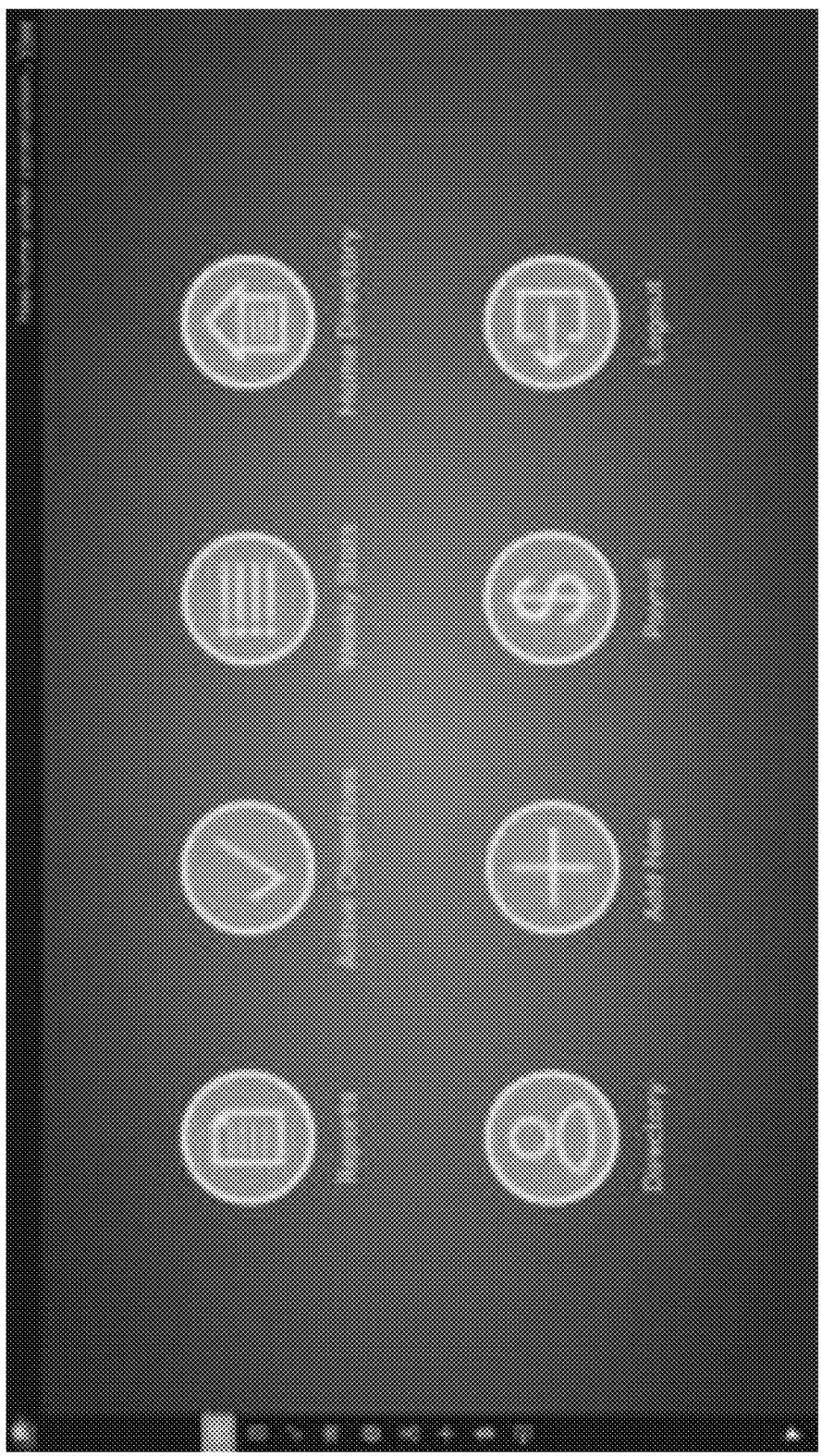
Figure 60:
Figure 61:
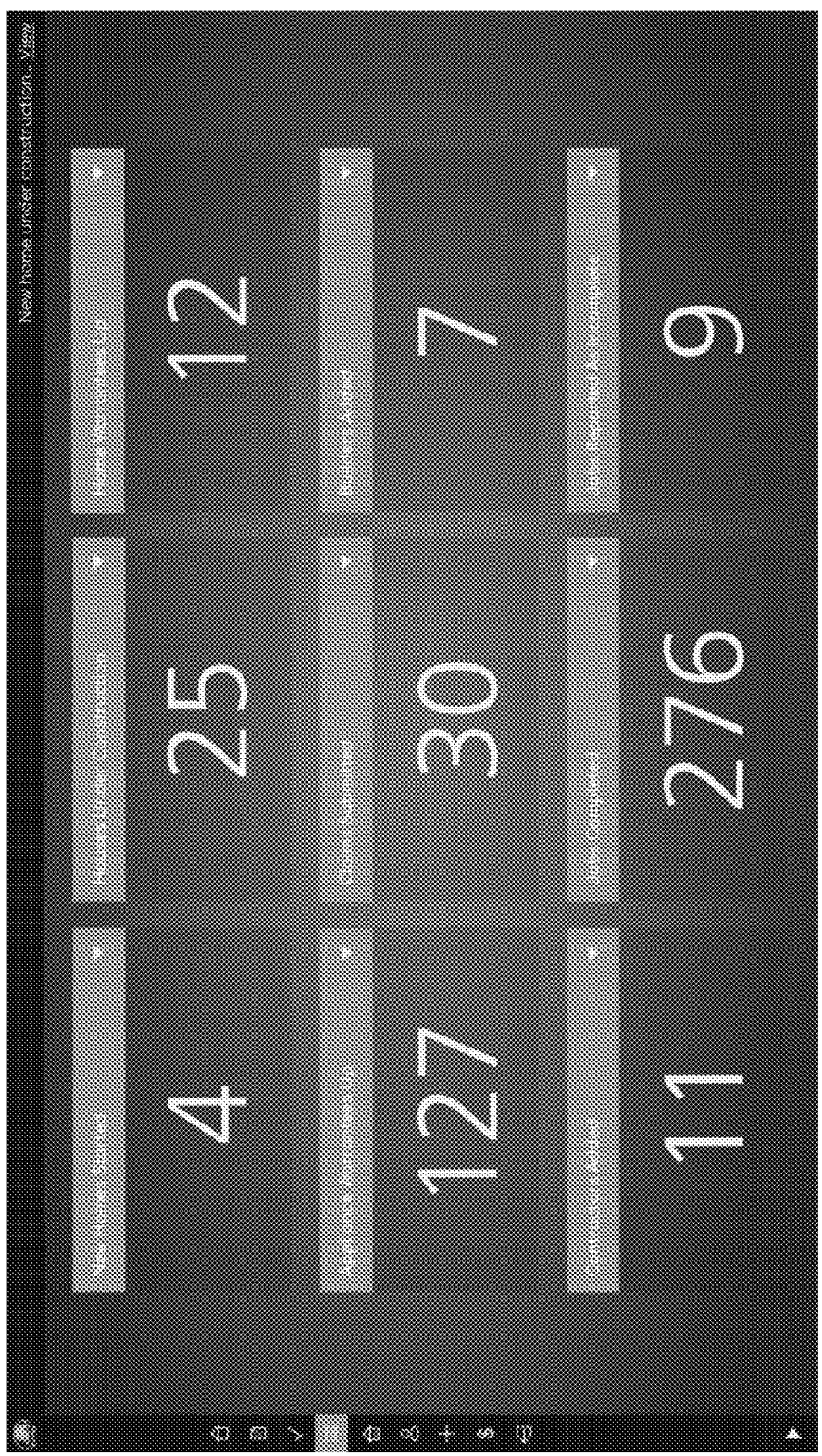

The administrative user may further be enabled to verify the credentials of each actor on the platform. For example, as shown in FIG. 53, the administrative user may verify the credentials and jobs of various builders and subcontractors, and view homeowner accommodation and asset data. The user may also be enabled to track the claim history and success of each service professional. Such metric analytics may enable for a higher standard of service provision, ensuring only the best professionals are assigned to the jobs. Analytics for the performance of duties across platform actors and claims may be provided, as illustrated in one example, FIG. 54.

It should be understood that the aforementioned illustrative figures depicting platform screenshots are non-limiting representations of functions and features that may be provided by the platform. They are not to be construed as limitations upon the design of the platform, nor limitations upon the functions and features themselves. Rather, they are just one, non-limiting example of how the design, functions, and features may be provided by the platform.

IV. Platform Architecture

The platform 600 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 200 to 500 have been described to be performed by a computing device 600, it should be understood that, in some embodiments, different operations may be performed by different networked elements in operative communication with computing device 600.

Embodiments of the present disclosure may comprise a system having a memory storage and a processing unit. The processing unit coupled to the memory storage, wherein the processing unit is configured to perform the stages of methods 200 to 500.

Figure 6:
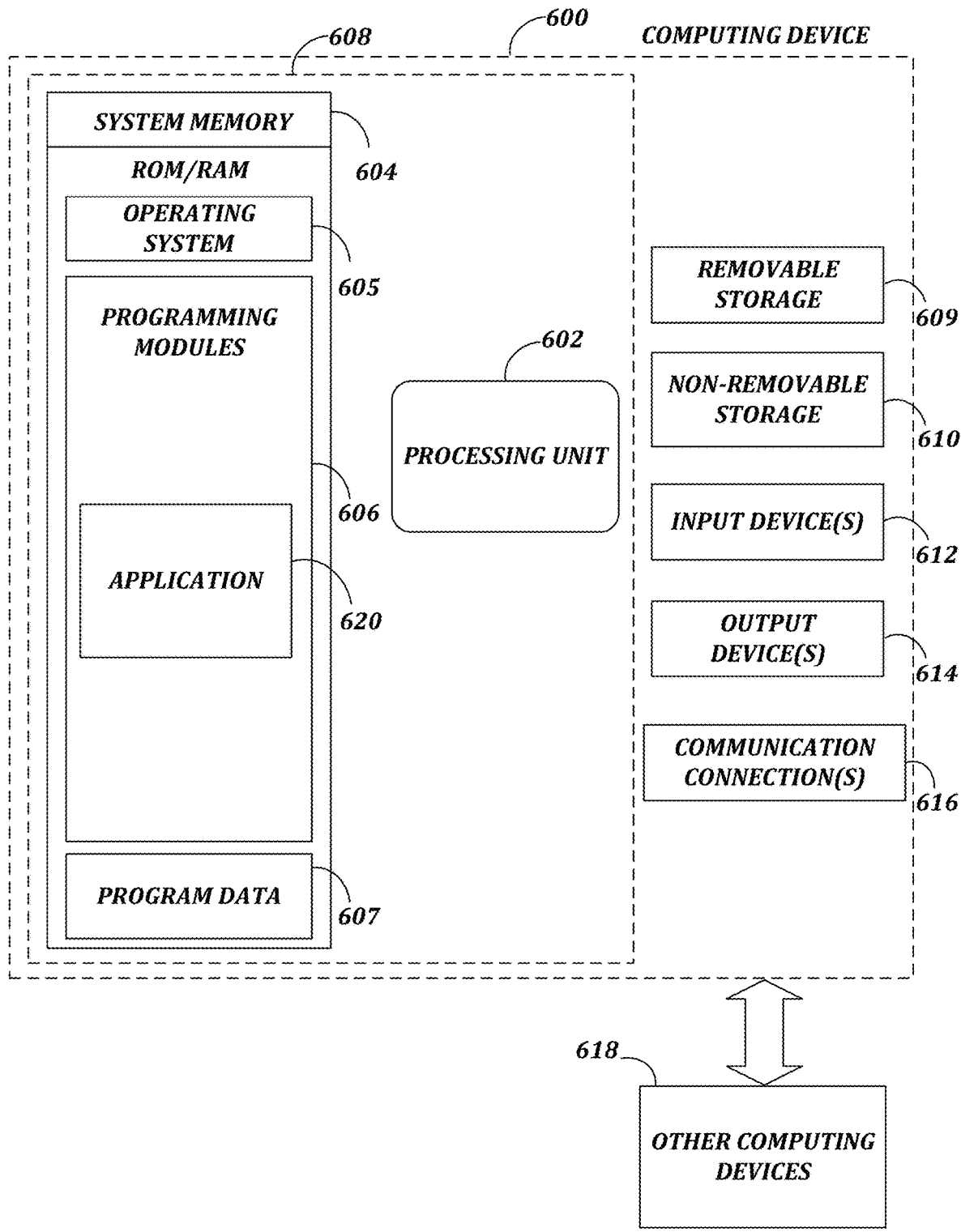
FIG. 6 illustrates a block diagram of a system 600 for facilitating maintenance of an accommodation, in accordance with some embodiment.
Figure 7:
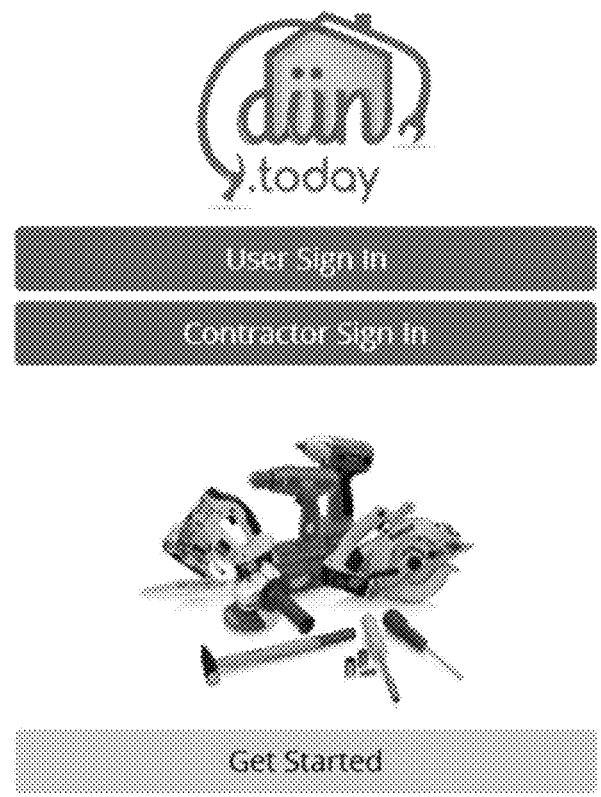
FIG. 7 illustrates a screenshot of a landing page 700 of a software application (e.g. mobile app) for facilitating a user of an accommodation and/or a contractor for maintenance of the accommodation, in accordance with some embodiments.
Figure 9:
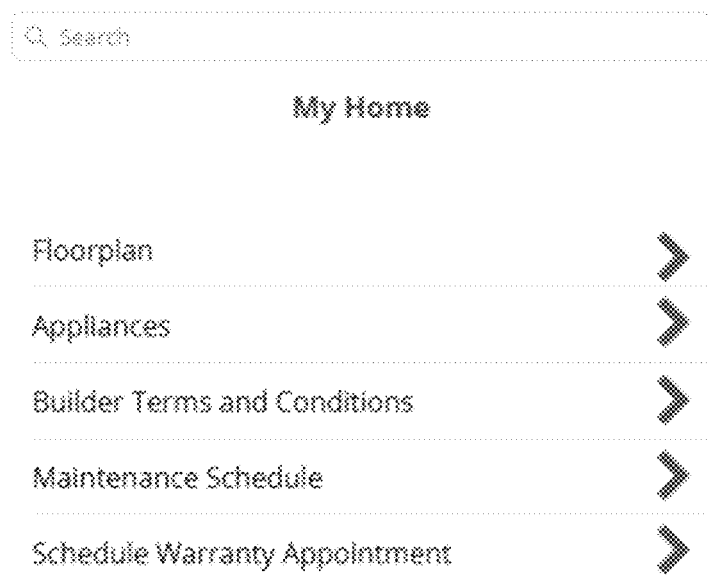
FIG. 9 illustrates a screenshot of a home page 900 of the software application (e.g. mobile app) for facilitating the user in carrying out maintenance of the accommodation, in accordance with some embodiments.
Figure 10:
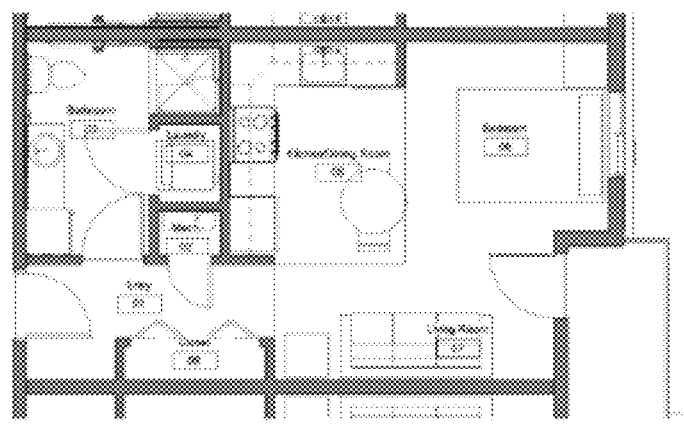
FIG. 10 illustrates a screenshot of a floor-plan page 1000 of the software application (e.g. mobile app) for facilitating maintenance of the accommodation, in accordance with some embodiments.

FIG. 6 is a block diagram of a system including computing device 600. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include image encoding module, machine learning module and image classifying module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., application 620) may perform processes including, for example, stages of one or more of methods 200 to 500 as described above. The aforementioned process is an example, and processing unit 602 may perform other processes. Other programming modules that may be used in accordance with embodiments of the present disclosure may include image encoding applications, machine learning application, image classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method of facilitating warranty claim and/or maintenance of an accommodation, the method comprising:
    receiving an accommodation identifier associated with the accommodation from an electronic device;
    transmitting a query comprising the accommodation identifier to at least one builder database;
    receiving a response to the query, wherein the response comprises warranty data associated with the accommodation;

generating at least one maintenance schedule based on the warranty data, wherein the at least one maintenance schedule corresponds to at least one of the following: a user of the accommodation, a builder associated with the accommodation, and at least one contractor associated with the accommodation;

transmitting the at least one maintenance schedule, via a push notification, to at least one electronic device associated with at least one of the user, the builder and the at least one contractor;

receiving at least one maintenance request from an electronic device associated with the user of the accommodation;

transmitting the at least one maintenance schedule to at least one electronic device associated with at least one of the following: the builder and the at least one contractor based on the at least one maintenance request;

analyzing, each of the following: the warranty data and the at least one maintenance request;

generating, one of the following: an approval and a rejection of the at least one maintenance request based on the analysis, transmitting the at least one maintenance schedule to the at least one contractor based on the following: generation of the approval, the builder's predetermined selection of a plurality of contractors capable of resolving the at least one maintenance request, a contractor originally associated with the accommodation, and type of the at least one maintenance request; and generating, based on the rejection, at least one of the following:
a list of a plurality of contractors qualified to perform the at least one maintenance request within a predetermined geolocation, and
a warranty product offer.

2. The method of claim 1, wherein transmitting the at least one maintenance schedule comprises indicating a maintenance activity performable by the user of the accommodation and a time associated with performing the maintenance activity, and transmitting the at least one maintenance schedule prior to expiration of a warranty period associated with the accommodation.

3. The method of claim 2, wherein indicating the time comprises providing a predetermined number of days the maintenance activity is required to be performed regularly after lapse of the predetermined number of days.

4. The method of claim 2, wherein transmitting the at least one maintenance schedule further comprises indicating at least one source of procuring at least one of the following: a consumable product and a recurring service associated with the maintenance activity.

5. The method of claim 1 further comprising:
transmitting the at least one maintenance request to an electronic device associated with at least one of the builder and a general contractor, wherein the electronic device is configured to receive one of the approval and the rejection of the at least one maintenance request from at least one of the builder and the general contractor; and
receiving one of the approval and the rejection, wherein the at least one maintenance schedule is transmitted to the at least one contractor based on receipt of the approval, wherein the at least one contractor is capable of resolving the at least one maintenance request.

6. The method of claim 1 further comprising:

determining a current mortgage rate associated with the accommodation; and
transmitting the current mortgage rate to the electronic device associated with the user.

7. The method of claim 6 further comprising transmitting indication of at least one mortgage broker to the electronic device in order to facilitate refinancing of a mortgage of the accommodation.

8. The method of claim 1 further comprising transmitting indication of at least one realtor network in order to facilitate listing the accommodation on the at least one realtor network.

9. A method of facilitating maintenance of an accommodation, the method comprising:
receiving accommodation data associated with the accommodation from an electronic device associated with at least one of a builder and a contractor of the accommodation, wherein the accommodation data comprises an accommodation identifier associated with the accommodation and at least one of a builder identifier of the builder and a contractor identifier of the contractor;
storing the accommodation data;
receiving at least one warranty claim from an electronic device associated with a user of the accommodation, wherein the at least one warranty claim comprises the accommodation identifier and a maintenance request;
identifying at least one of the builder and the contractor based on a comparison of the at least one warranty claim with the accommodation data;
transmitting the at least one warranty claim to the electronic device associated with at least one of the builder and the contractor;
receiving one of an approval and a rejection of the at least one warranty claim from the electronic device;
transmitting the maintenance request to at least one of the contractor and a service provider based on receipt of the approval;
generating a list of a plurality of contractors qualified to perform the maintenance request within a predetermined geolocation based on receipt of the rejection;
generating a plurality of analytics based on a plurality of warranty claims;
generating a report based on the plurality of analytics; and
transmitting the report to the electronic device associated with at least one of the builder and the contractor.

10. A system for facilitating warranty claim and/or maintenance of an accommodation, the system comprising:
a plurality of electronic devices comprising:
a first electronic device associated with a user of the accommodation,
a second electronic device associated with at least one builder associated with the accommodation, and
third electronic device associated with at least one contractor;
at least one builder database configured to:
receive an accommodation identifier associated with the accommodation from at least one of the plurality of electronic devices;
a processing device configured to:
transmit a query comprising the accommodation identifier to the at least one builder database,
receive a response to the query, wherein the response comprises warranty data associated with the accommodation, generate at least one maintenance schedule based on the warranty data, wherein the at least one maintenance schedule corresponds to at least one of the following:
- the user of the accommodation,
- the at least one builder associated with the accommodation, and
- the at least one contractor, transmit the at least one maintenance schedule, via a push notification, to at least one electronic device associated with at least one of the user, the at least one builder and the at least one contractor, receive at least one maintenance request from the electronic device associated with the user of the accommodation, wherein the at least one maintenance schedule is transmitted to the at least one electronic device associated with the at least one builder and the at least one electronic device associated with the at least one contractor based on the at least one maintenance request, analyze each of the warranty data and the at least one maintenance request, and generate one of the following: an approval and a rejection of the at least one maintenance request based on the analysis, wherein the at least one maintenance schedule is transmitted to the at least one contractor based on the following: generation of the approval, the at least one builder's predetermined selection of a plurality of contractors, a contractor originally associated with the accommodation, and type of the at least one maintenance request, wherein the at least one contractor is capable of resolving the at least one maintenance request, wherein, in response to the rejection, a list is generated of a plurality of contractors qualified to perform the at least one maintenance request within a predetermined geolocation.

* * * * *